(12) United States Patent
Hofmann et al.

(10) Patent No.: US 11,009,877 B2
(45) Date of Patent: May 18, 2021

(54) UNMANNED VEHICLE, SYSTEM, AND METHOD FOR INITIATING A FIRE EXTINGUISHING ACTION

(71) Applicant: MINIMAX GMBH & CO. KG, Bad Oldesloe (DE)

(72) Inventors: Klaus Hofmann, Bad Oldesloe (DE); Joachim Boeke, Düsseldorf (DE); Kurt Lenkeit, Suelfeld (DE); Ingo Kuhlenkamp, Bad Oldesloe (DE)

(73) Assignee: Minimax GmbH & Co. KG, Bad Oldesloe (DE)

( * ) Notice: Subject to any disclaimer, the term of this patent is extended or adjusted under 35 U.S.C. 154(b) by 176 days.

(21) Appl. No.: 16/316,584

(22) PCT Filed: Jul. 6, 2017

(86) PCT No.: PCT/EP2017/067042
§ 371 (c)(1),
(2) Date: Jan. 9, 2019

(87) PCT Pub. No.: WO2018/011066
PCT Pub. Date: Jan. 18, 2018

(65) Prior Publication Data
US 2019/0294165 A1    Sep. 26, 2019

(30) Foreign Application Priority Data
Jul. 12, 2016 (DE) .................. 10 2016 212 645.8

(51) Int. Cl.
*G05D 1/00* (2006.01)
*A62C 3/02* (2006.01)
(Continued)

(52) U.S. Cl.
CPC ........... *G05D 1/0088* (2013.01); *A62C 3/002* (2013.01); *A62C 3/0221* (2013.01);
(Continued)

(58) Field of Classification Search
CPC .... G05D 1/0088; G05D 1/0212; A62C 3/002; A62C 3/0221; A62C 3/0242;
(Continued)

(56) References Cited

U.S. PATENT DOCUMENTS 5,832,187 A    11/1998 Pedersen et al.
5,860,479 A    1/1999 LaFollette
(Continued)

FOREIGN PATENT DOCUMENTS

CN    101884830 A    11/2010
CN    102822877        12/2012
(Continued)

OTHER PUBLICATIONS

International Searching Authority, International Search Report in German & English translation in International Appln. No. PCT/EP2017/067042, dated Oct. 6, 2017, 5 pages.
(Continued)

*Primary Examiner* — Gertrude Arthur Jeanglaude
(74) *Attorney, Agent, or Firm* — Perkins Coie LLP

(57) ABSTRACT

An unmanned vehicle for initiating a fire extinguishing action, the vehicle having: a vehicle sensor unit for detecting a fire parameter $K_F$ of a vehicle monitoring region, a vehicle communication unit for receiving an instruction signal $S_I$ representing a detected fire, a target location and/or a target region, and a navigation control unit for navigating the vehicle to the target location based on the instruction signal $S_I$. The vehicle is: configured for detecting the fire parameter $K_F$ in the form of a verification fire parameter $K_V$ of the fire detector monitoring region at the target location by the vehicle sensor unit, configured for determining a verification fire status $Z_V$ by evaluating the verification fire parameter $K_V$, and designed and/or configured for initiating a fire extinguishing action if the verification fire status $Z_V$ was
(Continued)

determined. A system with such a vehicle and a corresponding method are also provided.

24 Claims, 18 Drawing Sheets

(51) Int. Cl.
*A62C 31/00* (2006.01)
*A62C 31/02* (2006.01)
*G05D 1/02* (2020.01)
*A62C 27/00* (2006.01)
*A62C 3/00* (2006.01)

(52) U.S. Cl.
CPC .......... *A62C 3/0242* (2013.01); *A62C 3/0292* (2013.01); *A62C 27/00* (2013.01); *A62C 31/005* (2013.01); *A62C 31/02* (2013.01); *G05D 1/0212* (2013.01)

(58) Field of Classification Search
CPC ..... A62C 3/0292; A62C 27/00; A62C 31/005; A62C 31/02
USPC .......................................................... 701/1
See application file for complete search history.

(56) References Cited

U.S. PATENT DOCUMENTS

| | | |
|---|---|---|
| 6,281,970 B1 | 8/2001 | Williams et al. |
| 6,364,026 B1 | 4/2002 | Doshay |
| 7,264,062 B1 | 9/2007 | Ham |
| 8,973,671 B2 | 3/2015 | Alsaif et al. |
| 9,345,914 B1 | 5/2016 | Ali |
| 9,373,014 B1 | 6/2016 | Mehranfar |
| 10,139,819 B2 | 11/2018 | Hollida et al. |
| 2005/0139363 A1 | 6/2005 | Thomas |
| 2006/0185858 A1 | 8/2006 | Katsuyuki et al. |
| 2007/0296570 A1 | 12/2007 | Barrieau et al. |
| 2009/0120653 A1* | 5/2009 | Thomas .................. A62C 3/02 169/61 |
| 2009/0252196 A1 | 10/2009 | Icove et al. |
| 2010/0071917 A1 | 3/2010 | Lalouz |
| 2012/0261144 A1 | 10/2012 | Vian et al. |
| 2012/0299751 A1 | 11/2012 | Verna et al. |
| 2013/0099048 A1 | 4/2013 | Fisher et al. |
| 2014/0027131 A1 | 1/2014 | Kawiecki |
| 2015/0254952 A1 | 9/2015 | Chao et al. |
| 2015/0343248 A1 | 12/2015 | Hee |
| 2016/0121148 A1 | 5/2016 | Al-Hebshi et al. |
| 2016/0272317 A1 | 9/2016 | Cho et al. |

FOREIGN PATENT DOCUMENTS

| | | |
|---|---|---|
| CN | 204288415 U | 4/2015 |
| CN | 104815407 A | 8/2015 |
| DE | 199 50 848 A1 | 5/2001 |
| JP | Hei 11-276619 A | 10/1999 |
| KR | 2013-0098592 A | 9/2013 |
| KR | 2014-0127574 A | 11/2014 |
| WO | WO 99/39773 A1 | 8/1999 |
| WO | WO 2013/140023 | 9/2013 |
| WO | WO 2015/029007 A1 | 3/2015 |

OTHER PUBLICATIONS

Office Action (with English translation), Chinese Application No. 201780043618.8, 28 pages (dated Jul. 6, 2020).

Che et al, Beijing Institute of Technology Press, *Design and Structure*, first edition, pp. 97-98 (Aug. 31, 2009).

Zhang, Harbin Institute of Technology Press, *Construction Equipment*, vol. 1, first edition, p. 99 (Jun. 30, 2013).

\* cited by examiner

UNMANNED VEHICLE, SYSTEM, AND METHOD FOR INITIATING A FIRE EXTINGUISHING ACTION

PRIORITY CLAIM AND INCORPORATION BY REFERENCE

This application is a 35 U.S.C. § 371 application of International Application No. PCT/EP2017/067042, filed Jul. 6, 2017, which claims the benefit of German Application No. 10 2016 212 645.8 filed Jul. 12, 2016, each of which is incorporated by reference in its entirety.

TECHNICAL FIELD

The invention pertains to an unmanned vehicle for initiating a fire extinguishing action, a system for initiating a fire extinguishing action and a method for initiating a fire extinguishing action.

BACKGROUND AND SUMMARY OF THE INVENTION

Fire detection systems, which also referred to as fire alarm systems, are known from the prior art. These fire detection systems serve for the early detection of a fire in order to initiate corresponding countermeasures such as a fire extinguishing action.

So-called fire detectors are used for detecting a fire. These fire detectors are preferably realized in the form of so-called automatic fire detectors. A signal corresponding to the detected fire can be transmitted from the fire detector to a central fire alarm system. The central fire alarm system can then trigger an alarm signal and/or initiate follow-up actions. Subsequently, the detected fire can be extinguished by means of an extinguishing system.

Fire detectors are frequently installed in vulnerable buildings and/or regions. A fire detector may be installed, for example, in a factory building. In this case, smoke and/or heat may be produced as a result of normal production processes. It can therefore occur that an apparent fire is detected by the fire detector although no fire actually exists. In other words, a fire detector may falsely detect a fire. After the transmission of a corresponding signal from the fire detector to the central fire alarm system, this leads to a so-called false alarm. In practical applications, it was determined that it is not uncommon for a fire detector to falsely detect a fire although no fire exists. False alarms can therefore occur with corresponding frequency.

If an extinguishing action is initiated by means of an extinguishing system based on a false alarm, damages can occur in the region that is falsely extinguished by the extinguishing system. In order to prevent such damages, an on-site inspection of the region, in which the fire detector has detected the fire, is frequently carried out after the alarm signal is received by the central fire alarm system in order to determine whether the fire was correctly or falsely detected by the fire detector. The inspecting person then reports the result of the inspection to another person, who can access to the central fire alarm system by means of an input unit. A follow-up action such as extinguishing the fire is only carried out if the fire was respectively verified or confirmed during the above-described inspection. However, if the inspecting person does not verify the alleged fire detected by the fire detector, i.e. if the fire detector has falsely detected a fire, this information is also transmitted to the person accessing the central fire alarm system such that the follow-up action, e.g. extinguishing the alleged fire, can be prevented. This has the advantage that potential follow-up damages caused by an unnecessary extinguishing process can be avoided.

A certain time period can elapse between the reception of a signal regarding the detected fire from the fire detector and the arrival of the person at the location, at which the fire detector has detected the fire. This time period can differ, in particular, depending on the location, at which the fire was detected, and the person responsible for the aforementioned inspection. In order to ideally prevent property damages and/or personal injuries in case of an actual fire, however, it would be desirable to initiate firefighting measures as soon as possible because an actual fire can frequently lead to exponentially increasing property damages and/or personal injuries as time progresses.

In light of these circumstances, it is known from the prior art to provide permanently installed cameras for monitoring regions that are likewise monitored by fire detectors. If a fire is detected by a fire detector, it can be verified whether or not a corresponding fire actually exists by means of a camera. However, such cameras are only rarely used due to the high expenditures for the procurement and/or installation of permanently installed cameras, as well as legal restrictions with respect to the protection of the corresponding video data.

Another disadvantage can be seen in a stationarily installed extinguishing system of the type frequently used in the prior art. The installation of such an extinguishing system is very elaborate and results in correspondingly high costs. In addition, a significant maintenance effort is frequently required after the installation. Furthermore, extinguishing mediums accordingly have to be held available locally for a stationary extinguishing system. For example, water may be used as extinguishing medium. In this case, the stationary extinguishing system may comprise multiple nozzles for discharging the water in case of a fire. However, the nozzles of a stationary extinguishing system have a fixed orientation. Consequently, a stationary extinguishing system frequently does not allow a purposeful discharge of water or extinguishing medium, respectively.

U.S. Pat. No. 8,973,671 B2 discloses an indoor fire extinguishing robot that is able to detect fires early, for example with smoke detectors, and to extinguish fires with the aid of extinguishing containers with extinguishing medium and nozzles, which are carried along by the fire extinguishing robot. The fire extinguishing robot is capable of climbing stairs. It is equipped with multiple heat insulation technology and can withstand very high temperatures of up to 700 Celsius for 60 minutes. The fire extinguishing robot can communicate with trapped and injured persons in the region of the fire and transmits video and audio information on the source of the fire to a control. No signal exchange with stationarily installed fire detectors or a central unit is described. The disclosed fire extinguishing robot can automatically detect a fire or is informed by a user, who can also control this fire extinguishing robot remotely.

WO 99/39 733 A1 discloses an unmanned vehicle for extinguishing fires, which is realized in the form of a boat and can safely and effectively extinguish a fire on a ship. The fire is extinguished with the aid of orientable fire extinguishing monitors that are installed on a fire control tower. The extinguishing process is controlled remotely from a distant, safe region.

Offenlegungsschrift DE 199 50 848 A1 discloses a mobile robot for monitoring rooms, particularly for the detection or early detection of fires, as well as for extinguishing sources of fires. The robot comprises a unit for detecting and measuring objects in a contactless manner, as well as a detector for detecting the thermal radiation of an object, e.g. an infrared camera. The detector signals can be evaluated based on a triangulation method. DE 199 59 848 A1 furthermore discloses a fire extinguishing platform with a discharge unit, by means of which a mass flow, preferably of solid, liquid or gaseous mediums, can be applied to the object. This robot likewise does not comprise any devices that allow a signal exchange with stationarily installed fire detectors, which detect a fire early, or with a central unit, particularly a central fire alarm system.

U.S. Pat. No. 5,860,479 A discloses an unmanned track vehicle for extinguishing fires, which is connected to a water supply hose.

The invention is therefore based on the objective of making available a vehicle, a system and/or a method, which respectively allow a cost-efficient, fast and/or versatile verification of a fire detected by a fire detector and ensure prompt extinguishing of the fire.

According to a first aspect of the invention, the above-defined objective is attained by means of an unmanned vehicle described according to the invention. Advantageous designs of the unmanned vehicle and preferred embodiments of the unmanned vehicle are disclosed in the following description.

The invention proposes an unmanned vehicle for extinguishing fires. The unmanned vehicle is also simply referred to as vehicle. The vehicle comprises a vehicle sensor unit that is designed for detecting, in particular, at least one fire parameter of a vehicle monitoring region. The vehicle also comprises a vehicle communication unit for the signal exchange with a central unit, preferably a central fire alarm system, or with a stationary fire detector, wherein the vehicle communication unit is designed for receiving an instruction signal that represents a detected fire, particularly a reference fire status for a fire detector monitoring region of the stationary fire detector, and a target location and/or a target region. In addition, the vehicle comprises a navigation control unit that is designed for preferably navigating the vehicle to the target location and/or the target region autonomously based on the received instruction signal. The vehicle is furthermore configured for detecting the fire parameter at the target location or in the target region by means of the vehicle sensor unit in the form of a verification fire parameter, preferably of the fire detector monitoring region. The vehicle is also designed and/or configured for determining a verification fire status by evaluating the verification fire parameter. The vehicle is furthermore designed and/or configured for initiating a fire extinguishing action if the verification fire status was determined.

The vehicle communication unit preferably represents a signal receiving unit or comprises such a signal receiving unit.

In a preferred embodiment, the navigation control unit is designed for navigating the vehicle to the target location in such a way that the vehicle monitoring region sufficiently overlaps with the fire detector monitoring region at the target location. In this case, the detected fire represents the reference fire status for the fire detector monitoring region of the stationary fire detector. The vehicle is configured for determining the reference fire status in the form of a verified reference fire status if the reference fire status and the verification fire status at least sufficiently match. The vehicle is designed and/or configured for initiating a fire extinguishing action if the reference fire status was determined in the form of a verified reference fire status.

Upon reception of an instruction signal by means of the vehicle communication unit of the vehicle, the vehicle receives information on a detected fire, preferably on the reference fire status for a fire detector monitoring region. The fire detector monitoring region is monitored by the stationary fire detector, which is also simply referred to as fire detector. Such a fire detector may be permanently installed, for example, in a building, on a building or an object to be protected or in the vicinity thereof in order to monitor the aforementioned fire detector monitoring region. The fire detector may be realized, for example, in the form of a fire gas detector, a smoke detector, a heat detector, a flame detector or another fire detector known from the prior art. Consequently, the fire detector monitoring region is preferably a region that is assigned to the fire detector. The fire detector may comprise a fire detector sensor unit. The fire detector sensor unit is designed for detecting a fire parameter, which is referred to as reference fire parameter in this case. A fire parameter may basically represent and/or characterize at least one physical and/or chemical property of a combustion process. In a preferred embodiment, it is proposed that the fire detector sensor unit is respectively realized in the form of a multi-sensor unit or with multiple sensors, particularly different sensors. The sensor signals and/or sensor data of the multi-sensor or of the multiple sensors can be evaluated by means of a pre-processing unit, particularly based on stored signal patterns or signal data, in order to detect a corresponding number of fire parameters, which are referred to as reference fire parameters, as a result of this evaluation. The evaluation may be carried out, in particular, with the aid of neural networks. To this end, the fire detector sensor unit may be designed and/or configured accordingly.

Depending on the respective application, the fire detector sensor unit may be designed for detecting a correspondingly suitable reference fire parameter. One example of a reference fire parameter is the temperature. In this case, the fire detector sensor unit may therefore be designed for detecting a temperature of the fire detector monitoring region. However, the fire detector sensor unit may also detect a reference fire parameter in the form of a smoke concentration and/or a concentration of at least one predefined gas. In addition, the fire detector may be designed for determining a reference fire status based on the detected reference fire parameter. To this end, the reference fire parameter can be evaluated by the fire detector. The fire detector may comprise an evaluation unit in order to carry out this evaluation. This evaluation unit may be realized in the form of a data processing unit for evaluating the reference fire parameter. The reference fire status determined by the fire detector may correspond, for example, to a fire, a preliminary fire stage and/or a smoldering fire.

In this context, a fire refers to a combustion process that is associated with a light phenomenon such as a flame, an ember, a glow and/or spark. A smoldering fire refers to a combustion process without light phenomenon. A preliminary fire stage refers to a process, in which thermal decomposition products are formed, for example by means of a reduction reaction and/or homolithic fission. No oxidation or oxidation reaction preferably takes place during the corresponding thermal decomposition. In practical applications, the above-described fire, smoldering fire and preliminary fire stage may be generally referred to as a "fire."

If a reference fire status was determined by the fire detector, the fire detector can transmit a fire detector signal that represents the reference fire status to a central unit, e.g. a central fire alarm system. The central unit may in turn be configured and/or designed for transmitting the instruction signal to the vehicle, wherein the instruction signal represents at least the reference fire status for the fire detector monitoring region.

Upon reception of the instruction signal, the vehicle therefore receives information on whether a fire, a preliminary fire stage and/or a smoldering fire, which respectively corresponds to the reference fire status, exists in the fire detector monitoring region.

The vehicle provides the advantage that a reference fire status determined by the fire detector can be verified by means of a verification fire status determined by the vehicle such that a verified reference fire status can be determined if the aforementioned statuses at least sufficiently match. This can be realized without human intervention such that the determination of the verified reference fire status can take place in a particularly fast and reliable manner. If the reference fire status was determined in the form of a verified reference fire status, it can serve as a reliable basis for initiating a fire extinguishing action such as, for example, extinguishing a fire in the fire detector monitoring region.

Furthermore, the vehicle is cost-efficient and can at the same time be used in a particularly flexible and/or versatile manner. The vehicle is capable of navigating, particularly driving, to any target locations or target regions. The vehicle can therefore be used for detecting a verification fire parameter in the fire detector monitoring region of any fire detector. The vehicle particularly is mobile and therefore not bound and/or arranged stationarily. Consequently, it is not necessary to provide an additional monitoring system such as a stationarily installed camera system for each fire detector monitoring region in order to respectively confirm or verify a reference fire status determined for a fire detector monitoring region. Due to the low expenditure for only one vehicle and its mobility, this vehicle can be used in a particularly cost-efficient and flexible manner.

Another advantage of the vehicle can be seen in that the detected fire, preferably the reference fire status, can be verified in the immediate vicinity of the fire detector monitoring region such that a corresponding verification of the reference fire status and, if applicable, a fire extinguishing action can take place very quickly after the arrival of the vehicle at the target location.

The vehicle is realized in the form of an unmanned vehicle. The vehicle may be realized in the form of an unmanned land craft or in the form of an unmanned aircraft. A vehicle in the form of an unmanned land craft is preferably realized in the form of a robotic vehicle. A vehicle in the form of an unmanned aircraft may be realized, for example, in the form of a drone. The vehicle in the form of an unmanned vehicle does not require an on-board operator. The unmanned vehicle preferably can operate and/or navigate autonomously, independently and/or in a remote-controlled manner. An unmanned vehicle in the form of a robotic vehicle may also be realized in the form of an autonomous mobile robot.

The vehicle comprises a sensor unit that is referred to as vehicle sensor unit. The vehicle sensor unit is preferably realized in the form of a sensor or comprises a sensor. The vehicle sensor unit is designed for detecting a fire parameter, particularly at least one fire parameter, of a vehicle monitoring region. In this case, a fire parameter may basically represent and/or characterize at least one physical and/or chemical property of a combustion process. The vehicle monitoring region preferably is the region assigned to the vehicle sensor unit. Consequently, the vehicle sensor unit may serve for monitoring the vehicle monitoring region with respect to a fire, a preliminary fire stage and/or a smoldering fire. In a preferred embodiment, it is proposed that the vehicle sensor unit is realized in the form of a multi-sensor unit or with multiple sensors, particularly different sensors. The sensor signals and/or sensor data of the multi-sensor or of the multiple sensors can be evaluated by means of a pre-processing unit, particularly based on stored signal patterns or signal data, in order to detect a corresponding number of fire parameters as a result of this evaluation. The evaluation may be carried out, in particular, with the aid of neural networks. To this end, the vehicle sensor unit may be designed and/or configured accordingly. In this case, the detection of the fire parameter by means of the vehicle sensor unit may be controlled by the vehicle and/or take place continuously or discretely, for example in predefined time intervals. It is furthermore preferred that the vehicle monitoring region is assigned to the vehicle sensor unit and/or the vehicle in a stationary and/or fixed manner. When the vehicle is in motion, a corresponding motion of the vehicle monitoring region therefore also takes place.

Depending on the respective application, the vehicle sensor unit may be designed for detecting different fire parameters. One example of a fire parameter is the temperature. In this case, the vehicle sensor unit may be designed for detecting the temperature of the vehicle monitoring region. The vehicle sensor unit may in this case be realized in the form of a temperature sensor unit or in the form of a temperature sensor. This applies accordingly to the following potential fire parameters. For example, a fire parameter may be a smoke concentration, which is also referred to as smoke particle concentration, a concentration of a predefined gas, a concentration of multiple predefined gases, a concentration of at least one thermal decomposition product or an amplitude, particularly a mean amplitude, of a predefined electromagnetic spectral range. A fire parameter may also be a changing and/or increasing value of at least one of the aforementioned fire parameters. The fire parameter therefore may be, for example, a temperature gradient or a concentration gradient. In order to detect a concentration of a gas, the vehicle sensor unit may be realized, for example, in the form of a gas sensor unit or in the form of a gas sensor. If the vehicle sensor unit serves for detecting an amplitude of a predefined electromagnetic spectral range, it is preferably realized in the form of an optical and/or photoelectric sensor unit for detecting a corresponding amplitude, particularly a mean amplitude, of the predefined electromagnetic spectral range. For example, this spectral range may form part of the ultraviolet range, the infrared range and/or the near-infrared range. The fire parameter detected by means of the vehicle sensor unit therefore provides information on whether a fire, a preliminary fire stage or a smoldering fire exists in the vehicle monitoring region.

The vehicle also comprises a vehicle communication unit for receiving an instruction signal. In this case, the vehicle communication unit may be designed for being separably connected and/or coupled to a signal line such that the instruction signal can be transmitted to the vehicle communication unit via the signal line and the instruction signal can ultimately received by the vehicle communication unit. However, it is preferred that the vehicle communication unit is realized in the form of a wireless vehicle communication unit. In this way, the vehicle communication unit can respectively receive the instruction signal telemetrically or via radio.

The instruction signal, which can be received by the vehicle communication unit, represents at least a reference fire status of a fire detector monitoring region. In this case, the reference fire status is a fire status. The reference fire status preferably corresponds to a fire, a preliminary fire stage or a smoldering fire. The reference fire status therefore provides information on whether a fire, a preliminary fire stage or a smoldering fire exists in the fire detector monitoring region. However, the reference fire status is not determined or established by the unmanned vehicle. The vehicle rather receives the instruction signal, which represents at least the reference fire status, by means of the vehicle communication unit. Consequently, the reference fire status or information thereon is respectively made available to the unmanned vehicle by means of the instruction signal.

The instruction signal also represents a target location for the vehicle. The target location may be a location coordinate, have a location coordinate or represent a limited space and/or a region. The target location may also include other location information such as, for example, information on the orientation for the vehicle and/or for the vehicle sensor unit of the vehicle.

The instruction signal preferably also represents a target region for the vehicle. In this case, the target region may represent a limited space and/or a region. The target location preferably lies in the target region. If the detected fire has spread, it may be necessary to verify the detected fire in the target region rather than at the target location, particularly in the immediate vicinity of the fire detector monitoring region and preferably by detecting the verification fire parameter of the vehicle sensor unit.

The vehicle furthermore comprises a navigation control unit. The navigation control unit is designed and/or configured for navigating the vehicle, particularly in a controlled manner, to the target location based on the instruction signal, particularly based on the target location represented by the instruction signal. The vehicle and particularly the navigation control unit are informed of the desired target location by means of the received instruction signal. The instruction signal may simultaneously serve as a command for starting the navigation to the target location and/or be correspondingly evaluated and/or interpreted by the vehicle and/or the navigation unit. Another command for starting the navigation to the target destination by means of the navigation control unit is therefore not required. The term navigating preferably refers to steering, moving, driving or flying. It is particularly preferred that the vehicle and/or the navigation control unit are designed and/or configured for autonomously and/or independently navigating to the target location based on the transmitted instruction signal, particularly based on the target location represented by the instruction signal. The target location is preferably spaced apart from the fire detector monitoring region by a predefined distance. The target location may alternatively also lie within the fire detector monitoring region. The navigation control unit may furthermore be designed for receiving signals from a navigation satellite and/or from a pseudolite. The navigation control unit is preferably designed for navigating the vehicle to the target location in a controlled manner based on these signals and the instruction signal or the target location represented thereby. In this way, the vehicle preferably can navigate to the target location autonomously and/or independently upon reception of the instruction signal.

The instruction signal, which represents the detected fire, particularly the reference fire status and the target location, preferably is only transmitted to the vehicle if the reference fire status requires verification. The reference fire status preferably requires verification if the reference fire status corresponds to a fire that requires a fire extinguishing action.

It would also be possible that the reference fire status preferably requires verification if it corresponds to a fire, a preliminary fire stage or a smoldering fire. A preliminary fire stage can also develop into a fire and therefore require a fire extinguishing action just like a smoldering fire. The verification, i.e. the re-detection of a fire at the target location or in the target region, preferably in the fire detector monitoring region, by means of the vehicle sensor unit has the advantage that a fire extinguishing action only takes place if it is absolutely certain that a fire exists. This provides the advantage that no fire extinguishing action is initiated if the initial fire detection, preferably the detected reference fire status, represents a false alarm such that follow-up damages are prevented.

An advantageous embodiment is characterized in that the central unit is configured such that a reference fire status, i.e. a current reference fire status, requires verification if at least one reference fire status was previously transmitted to the central unit by the fire detector or another fire detector, namely within no more than a predefined maximum time interval.

In this way, a reference fire status transmitted to the central unit may initially require no verification until at least one other reference fire status is transmitted to the central unit. In this case, the two reference fire statuses may originate from the same fire detector. The two reference fire statuses may alternatively also originate from different fire detectors, wherein each fire detector is designed for detecting an associated reference fire parameter of the same fire detector monitoring region. For example, a first fire detector signal can be transmitted to the central unit if a first fire detector detects a first reference fire parameter for a fire detector monitoring region and a first reference fire status, for example, in the form of a preliminary fire stage is determined based on the first reference fire parameter, wherein the first fire detector signal represents the first reference fire status. The first reference fire status requires no verification due to the preferred configuration of the central unit. An instruction signal is therefore not transmitted to the vehicle yet. However, if the first fire detector or a second fire detector detects a second reference fire parameter for the same fire detector monitoring region and a second reference fire status is determined based on the second fire parameter, a second fire detector signal can be transmitted to the central unit, wherein the second fire detector signal represents the second reference fire status. If the first fire detector signal and the second fire detector signal are transmitted within the predefined maximum time interval, the second reference fire status requires verification due to the preferred configuration of the central unit. Consequently, the instruction signal is then also transmitted to the vehicle.

If the reference fire status requires verification, the instruction signal can be sent and/or transmitted to the vehicle, particularly by a central unit.

If a corresponding fire detector signal, which represents the reference fire status, was transmitted to the central unit, this central unit may be designed and/or configured for determining the target location based on the transmitted fire detector signal. If a plurality of fire detectors are provided and each fire detector is connected to the central unit, for example, by means of a signal line in order to respectively allow the transmission of a corresponding fire detector signal to the central unit, the central unit may be designed and/or configured, for example, for determining the respective fire detector that has transmitted the fire detector signal. The central unit may be designed and/or configured for determining the respective target location based on the determined fire detector. To this end, data that represents a target location for each of the fire detectors may be stored in the central unit, wherein the central unit is designed for determining the respective target location, which corresponds to the fire detector that has transmitted the fire detector signal, based on the aforementioned data. If a fire detector signal is transmitted to the central unit by one of the fire detectors, the central unit can determine the relevant target location for the respective fire detector by means of the stored data.

Consequently, the target location represented by the instruction signal can be predefined and/or chosen such that the vehicle monitoring region sufficiently overlaps with the fire detector monitoring region when the vehicle is at the target location. The vehicle monitoring region and the fire detector monitoring region sufficiently overlap once the navigation of the vehicle to a target location has taken place. At the target location, the vehicle is preferably spaced apart from the fire detector monitoring region by a predefined distance or even lies within the fire detector monitoring region. Since the vehicle monitoring region moves along with the corresponding navigation of the vehicle, the vehicle monitoring region sufficiently overlaps with the fire detector monitoring region when the vehicle is at the target location. Consequently, the vehicle monitoring region may also be referred to as a monitoring region that is fixed with respect to the vehicle or the vehicle sensor unit. The vehicle monitoring region may therefore be characterized in that it can be monitored by the vehicle sensor unit.

It is preferred that the vehicle monitoring region and the fire detector monitoring region sufficiently overlap when at least 30%, at least 40%, at least 50%, at least 60%, at least 70%, at least 80%, at least 90% or 100% of the vehicle monitoring region overlap with the fire detector monitoring region. The vehicle sensor unit can detect a fire parameter in the region, in which the vehicle monitoring region and the fire detector monitoring region overlap. In this context, the vehicle is preferably designed and/or configured for detecting the fire parameter at the target location by means of the vehicle sensor unit in the form of the verification fire parameter for the fire detector monitoring region, namely at least for the portion of the fire detector monitoring region that overlaps with the vehicle monitoring region. With respect to the verification fire parameter, we refer analogously to the preceding explanations, advantages and/or effects, which were described above in connection with the fire parameter. The verification fire parameter therefore provides information on whether a fire, a preliminary fire stage or a smoldering fire exists in the fire detector monitoring region, namely at least in the portion of the fire detector monitoring region that overlaps with the vehicle monitoring region.

The vehicle is designed for determining a verification fire status based on the at least one verification fire parameter. To this end, the verification fire parameter is evaluated by the vehicle. If multiple verification fire parameters are detected, the vehicle may be designed for determining the (one) verification fire status based on the multiple verification fire parameters. The evaluation unit may be realized in the form of a data processing unit for evaluating the at least one verification fire parameter. With respect to the determination of the verification fire status based on the at least one verification fire parameter, we refer analogously to the preceding explanations of the determination of a fire status based on a fire parameter. Once the verification fire status has been determined, it respectively forms a second or another fire status in addition to the reference fire status for the fire detector monitoring region. Since the reference fire status was already made available to the vehicle by means of the instruction signal, the vehicle now has information on two fire statuses for the fire detector monitoring region, namely the reference fire status and the verification fire status.

In a preferred embodiment, the vehicle sensor unit may be respectively realized in the form of a multi-sensor unit or with multiple sensors, particularly different sensors. The sensors or the multi-sensor unit may be designed for detecting multiple fire parameters, wherein these fire parameters are referred to as verification fire parameters. The vehicle may be designed for determining a verification fire status based on these detected verification fire parameters. To this end, the verification fire parameters are evaluated by the vehicle. The vehicle may comprise an evaluation unit in order to carry out this evaluation. The evaluation unit may be realized in the form of a data processing unit for evaluating the verification fire parameters. The evaluation may be carried out, in particular, with the aid of neural networks.

In addition, the vehicle is configured for determining the reference fire status in the form of a verified reference fire status if the reference fire status and the verification fire status at least sufficiently match. The vehicle may therefore be designed for evaluating the reference fire status and the verification fire status. To this end, the vehicle may comprise an or the evaluation unit. This particularly applies to the evaluation whether the reference fire status and the verification fire status at least sufficiently match. The reference fire status and the verification fire status may respectively match or sufficiently match, for example, if the reference fire status and the verification fire status exactly match and/or if the verification fire status corresponds to a fire. In the second case, the reference fire status may correspond, for example, to a smoldering fire or a preliminary fire stage. Consequently, the reference fire status and the verification fire status may sufficiently match if the verification fire status corresponds to a fire and the reference fire status corresponds to a smoldering fire or a preliminary fire stage. Even if the reference fire status and the verification fire status do not exactly match, it can be assumed that a sufficient match exists if the verification fire status represents, for example, a fire because the fire may have developed further in the transition period while the vehicle navigates to the target location. A match and therefore also a sufficient match may exist, for example, if the reference fire status and the verification fire status correspond. This is the case, for example, if the reference fire status and the verification fire status respectively correspond to a fire, a preliminary fire stage or a smoldering fire.

The verified reference fire status is determined by the vehicle if the reference fire status and the verification fire status at least sufficiently match. In this case, the verified reference fire status may respectively correspond a fire, a preliminary fire stage and/or a smoldering fire or represent the fire, the preliminary fire stage and/or the smoldering fire. The verified reference fire status therefore provides reliable information on whether a fire, a preliminary fire stage or a smoldering fire actually exists in the fire detector monitoring region.

The vehicle is furthermore designed for initiating a fire extinguishing action if the reference fire status was determined in the form of a verified reference fire status. For example, the vehicle may be designed for initiating the fire extinguishing action by transmitting a signal, which represents a request for a fire extinguishing action. The vehicle may transmit the signal, for example, to an additional unit that is at least indirectly designed for carrying out the fire extinguishing action. Consequently, the vehicle may serve for initiating the fire extinguishing action by transmitting the corresponding signal. The additional unit may be realized, for example, in the form of a central fire alarm system and/or a central fire alarm and extinguishing control system. When the signal from the vehicle is received by such a unit, the corresponding fire extinguishing action can be carried out in the fire detector monitoring region, particularly by activating an extinguishing system at least indirectly by means of the central fire alarm system and/or by means of the central extinguishing control system in order to thereby discharge extinguishing medium in the fire detector monitoring region. Alternatively or additionally, the vehicle itself may be designed for extinguishing a fire. For example, the vehicle may be designed for discharging extinguishing medium if the reference fire status was determined in the form of a verified reference fire status. In this case, the vehicle may be configured and/or designed for discharging extinguishing medium from the vehicle in the fire detector monitoring region such that, if necessary, a fire, a preliminary fire stage and/or a smoldering fire at this location can be extinguished.

An advantageous embodiment of the vehicle is characterized in that the vehicle is realized in the form of an aircraft, particularly a robotic vehicle. A land craft has the advantage that it can be realized in a particularly robust manner. A collision with an obstacle usually does not necessarily lead to such a severe defect that the land craft is no longer able to drive or navigate. After a potential collision with an obstacle, the land craft rather can drive around this obstacle in order to continue the further navigation to the target location. A land craft in the form of a robotic vehicle proved particularly advantageous. The term robotic vehicle preferably refers to an unmanned robotic vehicle. In this case, the land craft can drive and/or navigate without an on-board operator. This allows a particularly safe detection of the verification fire parameter without the risk of personal injuries.

Another advantageous embodiment of the vehicle is characterized in that the vehicle is realized in the form of an aircraft, particularly a drone. A vehicle in the form of an aircraft can overcome potential obstacles in a particularly fast and simple manner in order to reach the target location. This allows a particularly prompt determination of the verification fire parameter and the verification fire status such that information on whether or not the reference fire status should be determined in the form of a verified reference fire status can be obtained correspondingly fast.

The aircraft is preferably realized in the form of a drone or unmanned aircraft. In this case, the aircraft can navigate to the target location without an on-board operator. Personal injuries can therefore be precluded. Consequently, a reference fire status can be verified in a particularly safe manner. For example, a particularly advantageous embodiment of the aircraft is a multicopter, for example a quadrocopter or octocopter. Such multicopters have the advantage that they can hover and/or stop at any position in space. This allows a particularly simple navigation to the target location such that the vehicle monitoring region and the fire detector monitoring region sufficiently overlap. Alternatively, the aircraft may also be realized in the form of an airplane and/or a helicopter.

Another advantageous embodiment of the vehicle is characterized in that the vehicle comprises a fire extinguishing unit for extinguishing a fire, wherein the vehicle is designed for carrying out the fire extinguishing action with the aid of the fire extinguishing unit. The fire extinguishing unit may be at least partially formed by the vehicle. Consequently, the fire extinguishing unit may be realized integrally with or of the vehicle. The fire extinguishing unit may be designed for directly and/or indirectly extinguishing a fire. In order to directly extinguish a fire, the fire extinguishing unit may be designed for ejecting and/or spraying an extinguishing medium. In order to indirectly extinguish a fire, the fire extinguishing unit may be designed for making available an extinguishing medium, preferably under pressure. For example, the fire extinguishing unit may comprise an output connector, by means of which extinguishing medium can be made available. The term extinguishing medium may refer, for example, to gaseous extinguishing mediums such as nonflammable gases, extinguishing powder, extinguishing foam and/or liquid extinguishing mediums such as water and/or aqueous solutions. For example, BC-powder, ABC-powder and/or metal powder may be used as an extinguishing powder. An example of a nonflammable gas is carbon dioxide ($CO_2$). For example, the synthetic liquid extinguishing medium FK-5-1-12 ($C_4F_9OCH_3$) may be used as liquid extinguishing medium. This is the extinguishing medium known under the brand name NOVEC 1230, which in ASHRAE nomenclature is FK-5-1-12. It is listed in the standards NFPA 2001 and ISO 14520 and also described with the chemical formulas ($C_4F_9OCH_3$) or 1,1,1,2,2,4,5,5,5-NONAFLUORO-4-(TRIFLUOROMETHYL)-3-PENTANONE.

The extinguishing medium may be stored in a container that is assigned to the extinguishing medium unit and also referred to as extinguishing medium container. Once the vehicle has navigated to the target location and the verified reference fire status was subsequently determined, a fire extinguishing action can be carried out by means of the fire extinguishing unit. In this way, a fire can be quickly and efficiently extinguished. This is achieved in that the vehicle is already in the vicinity of the fire detector monitoring region and therefore can extinguish a fire in the fire detector monitoring region immediately after the verified reference fire status has been determined. A fire is thereby efficiently prevented from developing further. In practical applications, it was determined that a stationary extinguishing system can thereby be eliminated such that the costs can be additionally reduced. Since the vehicle can carry along the extinguishing medium, a stationary extinguishing system is frequently not required because the corresponding task is carried out by the mobile vehicle. In addition, damages during a fire extinguishing action can be reduced in that the extinguishing medium can be purposefully discharged from the vehicle. In summary, the vehicle is more advantageous than a stationary extinguishing system and at the same time causes fewer damages during a fire extinguishing action.

An advantageous embodiment of the vehicle is characterized in that the fire extinguishing unit comprises a nozzle that is designed for discharging, particularly spraying and/or ejecting, an extinguishing medium for extinguishing a fire. In this case, the fire extinguishing unit may be designed for conveying and/or transporting extinguishing medium to the nozzle under pressure such that the extinguishing medium can be discharged, particularly sprayed and/or ejected, by means of the nozzle. For example, if the extinguishing medium consists of water or an aqueous solution, the corresponding extinguishing medium can be sprayed by means of the nozzle. If the extinguishing medium consists of an extinguishing powder, for example, this extinguishing powder can be ejected by means of the nozzle. Since the fire extinguishing unit comprises a nozzle, the fire extinguishing unit of the vehicle is particularly suitable for directly extinguishing a fire.

An advantageous embodiment of the vehicle is characterized in that the fire extinguishing unit comprises an externally accessible output connector for making available extinguishing medium, wherein said output connector can be coupled to a mating connector of a stationary extinguishing device in order to make available extinguishing medium to the extinguishing device. If the verified reference fire status was determined by means of the vehicle, the output connector of the fire extinguishing unit may subsequently be coupled to the mating connector of the stationary extinguishing device. This coupling makes it possible to respectively transfer or make available extinguishing medium from the vehicle, particularly from the associated fire extinguishing unit, to the stationary extinguishing device. The term making available may therefore refer to pumping, conveying and/or transporting. In this case, the extinguishing medium may be transferred and/or made available under pressure. The stationary extinguishing device may be designed for discharging, particularly ejecting and/or spraying, the extinguishing medium in the fire detector monitoring region. With respect to the discharge, we refer analogously to the preceding explanations. The discharge particularly is a pressurized discharge. The stationary extinguishing device is also referred to as extinguishing system. The extinguishing device is preferably characterized by the mating connector, at least one nozzle and a pipe network that extends between the mating connector and the at least one nozzle. To this end, the pipe network may comprise at least one extinguishing medium line, preferably multiple extinguishing medium lines that are coupled to one another. For example, if the extinguishing device comprises multiple nozzles, the pipe network may be designed for conveying extinguishing medium from the mating connector to the nozzles via the extinguishing medium lines. When extinguishing medium is conveyed from the output connector of the vehicle to the mating connector of the extinguishing device, the pipe network conveys the extinguishing medium to the nozzles, which subsequently discharge the extinguishing medium in order to extinguish a fire, preferably in the fire detector monitoring region. Consequently, the extinguishing device is preferably designed for extinguishing a fire in the fire detector monitoring region, particularly by transporting extinguishing medium to the at least one nozzle through the mating connector and the pipe network. If the fire extinguishing unit of the vehicle comprises an externally accessible output connector, the fire extinguishing unit or the vehicle may respectively also serve and/or be designed for indirectly extinguishing a fire and/or indirectly initiating a fire extinguishing action.

An advantageous embodiment of the vehicle is characterized in that the vehicle sensor unit comprises a camera. In this case, the camera may be realized in the form of an optical camera for capturing an image, particularly an optical image. The camera can therefore detect a light phenomenon of a combustion process such as a fire and/or a flame, wherein the camera is preferably designed for detecting a fire parameter in the form of a color temperature of the light phenomenon and/or a temperature of the light phenomenon. The camera may furthermore be realized in the form of a thermal imaging camera for capturing a thermal image. In this case, the thermal imaging camera may be designed for detecting infrared radiation. Consequently, the camera may be designed for detecting a temperature, particularly a maximum temperature and/or an average temperature, wherein the detected temperature preferably forms the fire parameter. If the reference fire status for the fire detector monitoring region was respectively determined, for example, by means of a fire detector in the form of a fire gas detector or smoke detector, the camera of the vehicle sensor unit has the advantage that the verification fire parameter can be detected with a different measuring principle than the reference fire parameter, which is respectively detected by means of the fire gas detector or the smoke detector. In other words, the fire detector sensor unit of the fire detector and the vehicle sensor unit of the vehicle may be based on different measuring principles such that the reference fire status can be verified in a particularly reliable manner.

An advantageous embodiment of the vehicle is characterized in that the vehicle is designed for determining the location of a fire by means of the vehicle sensor unit at the target location. In this case, the location of the fire preferably is the location of a fire source, a fire, a preliminary fire stage and/or a smoldering fire in the fire detector monitoring region. If the vehicle sensor unit comprises, for example, a camera that is designed for capturing an image, particularly an optical image and/or a thermal image, the vehicle may be designed for determining the location of the fire based on the image. To this end, the vehicle may be designed for identifying the point in the image, which corresponds to the highest temperature, particularly the highest temperature of a light phenomenon. The vehicle may be designed for determining the location of the fire based on this identified point and the known target location. Furthermore, the vehicle may be designed for rotating and/or pivoting the vehicle sensor unit at the target location in order to detect sensor data by means of the vehicle sensor unit in different rotating and/or pivoting positions thereof, wherein the location of the fire can be determined by means of the vehicle based on the detected sensor data and the known target location. For example, the vehicle may be designed for capturing a plurality of images at the target location in different rotating and/or pivoting positions of a camera of the vehicle sensor unit and for determining the location of the fire by evaluating the images with consideration of the target location.

Another advantageous embodiment of the vehicle is characterized in that the vehicle is configured for determining the location of the fire based on a fire parameter detected at the target location. For example, the vehicle may be configured for determining the location of the fire at the target location based on the at least one detected fire parameter. If the vehicle sensor unit comprises a camera in the form of a line scan camera, for example, a corresponding image captured by the line scan camera can be used for determining the location of the fire and therefore for determining the source of the fire. For example, the direction to the location of the fire can be determined based on the image captured by the line scan camera by searching the captured image for the highest color temperature. To this end, the vehicle and/or the vehicle sensor unit may be designed accordingly.

Another advantageous embodiment of the vehicle is characterized in that the vehicle is designed for orienting the vehicle sensor unit in the direction of the location of the fire. If a fire parameter is detected by means of the vehicle sensor unit in this case, this fire parameter corresponds to the source of the fire in the fire detector monitoring region or in the vehicle monitoring region, respectively. A corresponding fire parameter has the advantage that it can provide particularly reliable information on whether a fire, a preliminary fire stage and/or a smoldering fire exists.

Another advantageous embodiment of the vehicle is characterized in that the vehicle is configured for respectively detecting the fire parameter or the verification fire parameter when the vehicle sensor unit is oriented in the direction of the location of the fire. Consequently, the vehicle may be configured for only detecting the fire parameter at the target location in the form of the verification fire parameter of the fire detector monitoring region by means of the vehicle monitoring unit when the vehicle sensor unit is oriented in the direction of the location of the fire. In this case, the verification fire parameter can provide particularly reliable information on whether a fire, a preliminary fire stage and/or a smoldering fire exists. As a result, the reference fire status can also be evaluated and, if applicable, determined in the form of a verified reference fire status in a particularly reliable manner.

Another advantageous embodiment of the vehicle is characterized in that the vehicle is designed for orienting the nozzle in such a way that the extinguishing medium to be sprayed and/or ejected by the nozzle flows in the direction of the location of the fire in order to extinguish the fire. In this case, the orientation of the nozzle may refer to a vertical and/or horizontal pivoting angle of the nozzle relative to the vehicle. The vehicle may be designed for rotating and/or pivoting the nozzle in a vertical direction and/or a horizontal direction. It was already explained above that the vehicle is designed for detecting the location of the fire, preferably the location of the source of the fire in the fire detector monitoring region, when the vehicle is at the target location. The vehicle can determine the direction, in which the nozzle has to be pivoted in order to be oriented in the direction of the location of the fire, based on the location of the fire and preferably also based on the target location. The orientation of the nozzle may be realized in such a way that the nozzle aims directly at the location of the fire. However, the vehicle may also be designed and/or configured in such a way that a trajectory of the extinguishing medium to be sprayed and/or ejected is taken into account. The trajectory of the extinguishing medium is frequently parabolic. Consequently, the vehicle may be designed and/or configured for orienting the nozzle in such a way that a parabolic trajectory of the extinguishing medium is taken into account during the orientation of the nozzle and/or during the discharge of extinguishing medium. Due to the described orientation of the nozzle, a fire in the fire detector monitoring region can be extinguished in a particularly effective, fast and/or reliable manner. This measure reduces the consumption of extinguishing medium and is particularly sensible if the extinguishing medium is made available by the vehicle itself. The quantity of extinguishing medium may be limited in this case. However, the orientation of the nozzle makes it possible to extinguish a fire very purposefully and therefore effectively and quickly such that personal injuries and/or property damages can be significantly reduced or even prevented.

Another advantageous embodiment of the vehicle is characterized in that the vehicle is designed and/or configured for autonomously navigating, in particular, to an optimal location for discharging extinguishing medium based on the location of the fire.

This location for discharging extinguishing medium is also referred to as optimized position for discharging extinguishing medium.

It can occur that the fire detector monitoring region and/or the vehicle monitoring the region are very large. If the vehicle sensor unit comprises a camera, for example, a more distant fire detector monitoring region can also be sufficiently overlapped with the vehicle monitoring region. In this case, the target location may be located correspondingly far from the fire detector monitoring region, particularly from the source of a fire in the fire detector monitoring region. It can therefore occur that the corresponding distance is too long for effectively extinguishing the fire. If an extinguishing medium in the form of an extinguishing powder is used, for example, the corresponding extinguishing powder can only be ejected over a limited range or discharging range. In this case, it may be sensible to position the vehicle closer to the source of the fire in order to effectively extinguish a fire in the fire detector monitoring region. The vehicle may be designed for determining the location of the fire as explained above. In addition, the information on the target location is known in the vehicle.

It is furthermore preferred that extinguishing medium discharge data, for example information on the discharging range and/or the spray pattern of the extinguishing medium to be discharged, particularly sprayed and/or ejected, is stored in the vehicle for each extinguishing medium used. The vehicle is particularly designed and/or configured for determining a location for discharging extinguishing medium, which is also referred as optimized position for discharging extinguishing medium, based on the extinguishing medium discharge data and based on the previously determined location of the fire, namely with consideration of the nozzle construction, the diameter of the extinguishing medium discharge opening and/or the pressure of the extinguishing medium in the fire extinguishing unit and/or in front of the extinguishing medium discharge opening, such that an extinguishing medium to be discharged, particularly sprayed and/or ejected, by the fire extinguishing unit, preferably by a nozzle assigned to the fire extinguishing unit, can flow to and optimally cover the location of the fire. This ensures that the fire can be effectively, quickly and/or reliably extinguished with an optimized quantity of extinguishing medium. In this case, the fire can be extinguished with a minimal consumption of extinguishing medium and within a particularly short time period because it is ensured that the extinguishing medium is purposefully discharged, particularly sprayed and/or ejected, on the actual fire, particularly the corresponding source of the fire.

An advantageous embodiment of the vehicle is characterized in that the vehicle is designed and/or configured for initiating the fire extinguishing action when the vehicle is at the location for discharging extinguishing medium. The quantity of extinguishing medium may be limited, in particular, if the extinguishing medium is made available by the vehicle itself and/or by the fire extinguishing unit of the vehicle. It is therefore sensible to discharge the extinguishing medium when this discharge of extinguishing medium actually contributes to extinguishing the fire. This is preferably the case when the vehicle is at the location for discharging extinguishing medium. In this context, we refer analogously to the preceding explanations, advantages and/or effects. Consequently, the available extinguishing medium can be used for extinguishing a fire in a particularly effective manner. It is therefore also possible to extinguish larger fires, namely even if the vehicle only carries along a limited supply of extinguishing medium, because the vehicle is designed for effectively extinguishing a fire and a small quantity of extinguishing medium therefore already contributes to extinguishing the fire.

An advantageous embodiment of the vehicle is characterized in that the fire extinguishing unit comprises an extinguishing medium container, particularly a detachable extinguishing medium container, in which extinguishing medium is stored. When the vehicle receives the instruction signal, which preferably can be simultaneously evaluated as a navigation command, the vehicle can navigate, particularly drive or fly, to the target location without delay. After the arrival at the target location and, if applicable, the subsequent determination of a verified reference fire status, the vehicle therefore does not have to navigate to a different location in order to pick up extinguishing medium and/or initiate the actual fire extinguishing action. The vehicle rather can begin to actually extinguish the fire directly at the target location and/or after the additional navigation to the location for discharging extinguishing medium. This makes it possible to extinguish the fire without an unnecessary delay such that a fire is prevented from developing further. In practical applications, for example, a combustion process without light phenomenon can thereby be prevented from developing into a combustion process with light phenomenon, i.e. a fire. In this case, the vehicle may serve, for example, for already extinguishing a smoldering fire, which can frequently be realized with a reduced consumption of extinguishing medium. This results in reduced personal injuries and/or property damages. The extinguishing medium container is preferably realized in the form of a metal container or in the form of a container of a noncombustible material. In addition, the extinguishing medium container may be detachably coupled to the fire extinguishing unit and/or the vehicle. Consequently, the extinguishing medium container can be exchanged for maintenance purposes and/or after an extinguishing action was carried out. For example, the extinguishing medium container can be exchanged for a full extinguishing medium container such that the vehicle is once again operational within a very short time after a fire extinguishing action. In addition, the detachable mounting of the extinguishing medium container provides the advantage that the vehicle can be equipped for different applications. For example, it may be sensible to store liquid extinguishing medium in the extinguishing medium container for a certain application. For another application, it may be advantageous to store extinguishing medium in the form of an extinguishing powder in the extinguishing medium container. In this way, the vehicle can be adapted to the respective application by exchanging and/or installing a corresponding extinguishing medium container.

Another advantageous embodiment of the vehicle is characterized in that the extinguishing medium is stored in the extinguishing medium container under a predefined pressure. The extinguishing medium container may be realized in the form of a pressurized extinguishing medium container. This provides the advantage that the extinguishing medium can flow out of the extinguishing medium container without additional effort. Consequently, no additional electrical and/or mechanical power is required for transporting the extinguishing medium out of the extinguishing medium container. The vehicle therefore does not require a separate energy storage device or a larger energy storage device. This reduces the weight of the vehicle and/or increases the range of the vehicle for navigating to a target location. This is particularly advantageous if the vehicle is realized in the form of an aircraft, preferably a drone. In this case, the pressurized extinguishing medium container can contribute to increasing the navigating range of the aircraft. For the sake of completeness, it should at this point be noted that the predefined pressure is higher than the atmospheric pressure, particularly at least 2 bar, at least 5 bar, at least 10 bar, at least 25 bar or at least 80 bar higher than the atmospheric pressure.

An advantageous embodiment of the vehicle is characterized in that the fire extinguishing unit comprises a coupling device for detachably coupling an extinguishing medium container thereto. The coupling device therefore serves for coupling and/or decoupling the detachable extinguishing medium container. The coupling device may also be designed for holding the extinguishing medium container, particularly while the vehicle navigates. The coupling device may comprise arm elements that are designed for catching, holding and/or releasing the extinguishing medium container. In this case, the gripping arms may be controlled by an actuator, which in turn may be controlled by the fire extinguishing unit and/or the vehicle. To this end, the vehicle and/or the fire extinguishing unit may be designed and/or configured accordingly. If the vehicle is currently not used for a fire extinguishing action, for example, a new extinguishing medium container can be coupled to the fire extinguishing unit by means of the coupling device such that the vehicle is once again operational for a new fire extinguishing action. In addition, the coupling device may be designed for producing a fluidic connection between the extinguishing medium container and the fire extinguishing unit in the coupled state of the extinguishing medium container such that extinguishing medium can subsequently be discharged, particularly sprayed and/or ejected, from the extinguishing medium container by means of the fire extinguishing unit. If a new extinguishing medium container is coupled to the fire extinguishing unit, this new extinguishing medium container forms the extinguishing medium container of the fire extinguishing unit or the vehicle, respectively.

Another advantageous embodiment of the vehicle is characterized in that the fire extinguishing unit comprises an extinguishing medium production device for producing the extinguishing medium. To this end, the extinguishing medium production device may comprise, for example, a solid and be designed for igniting the solid such that a gas and/or an aerosol is produced due to a corresponding combustion of the solid, wherein the gas and/or aerosol being produced serves as extinguishing medium. In this case, the gas and/or aerosol produced due to the combustion of the solid preferably is a nonflammable gas or a nonflammable aerosol. In one example, the extinguishing medium production device may comprise a pyrotechnic extinguishing set, which can be electrically and/or thermally triggered. To this end, the extinguishing medium production device may be designed accordingly. Triggering of the extinguishing set initiates a reaction process, in which the solid aerosol is produced. For example, the solid aerosol being produced is calcium carbonate. An average particle size of the solid aerosol may lie, for example, between 0.5 and 2.5 µm. When the solid aerosol encounters a combustion, particularly a flame, a physical reaction between the solid aerosol and the flame takes place such that energy is withdrawn from the combustion process. In addition, a chain reaction of the combustion process may thereby be interrupted. The extinguishing medium production device may furthermore be designed for producing an extinguishing powder. The extinguishing medium production device provides the advantage that a large quantity of extinguishing medium can be produced at the target location and/or at the location for discharging extinguishing medium such that the vehicle and the fire extinguishing unit are respectively also designed and/or configured for extinguishing larger fires. In addition, the extinguishing medium production device can be designed in a particularly compact manner, which leads to a corresponding compactness of the vehicle. Furthermore, the extinguishing medium production device has a particularly low weight. This is particularly advantageous if the vehicle is realized in the form of an aircraft, preferably a drone.

Another advantageous embodiment of the vehicle is characterized in that the fire extinguishing unit comprises an externally accessible input connector, which can be coupled to a mating connector of a stationary extinguishing medium source, such that extinguishing medium can be conveyed from the extinguishing medium source to the vehicle, particularly to the associated fire extinguishing unit. Consequently, extinguishing medium can be conveyed from the extinguishing medium source to the vehicle or the fire extinguishing unit when the coupling between the input connector and the mating connectors produced. It can occur that the extinguishing medium stored in an extinguishing medium container does not suffice for completely extinguishing a fire, particularly a larger fire. It therefore proved advantageous if the vehicle or the fire extinguishing unit comprises the externally accessible input connector. When this input connector is coupled to the mating connector of a stationary extinguishing medium source, the vehicle may also be designed and/or configured for using extinguishing medium from the extinguishing medium source for extinguishing a fire by discharging, particularly spraying and/or ejecting, the extinguishing medium from the extinguishing medium source by means of the fire extinguishing unit in order to extinguish a fire. The extinguishing medium source may be realized, for example, in the form of a hydrant that is coupled to a line network, through which the extinguishing medium can be transported, particularly in larger quantities. For example, liquid extinguishing medium such as water and/or aqueous solutions can be transported to the input connector of the fire extinguishing unit via the mating connector of the stationary extinguishing medium source such that the liquid extinguishing medium can subsequently sprayed by means of the fire extinguishing unit in order to extinguish the fire. In this context, it should also be noted that the mating connector of the stationary extinguishing medium source can be directly coupled to the input connector. Alternatively, connecting hoses may be used for indirectly coupling the input connector to the mating connector of the stationary extinguishing medium source.

In this context, coupling preferably refers to producing a fluidic connection. Consequently, the term coupling may also refer to producing a fluidic connection or to a fluidic connection.

Another advantageous embodiment of the vehicle is characterized in that the vehicle, particular the corresponding fire extinguishing unit, comprises a controllable triggering unit, particularly a controllable valve, which is designed for controlling the extinguishing medium flow to the nozzle and/or the output connector. In one example, the triggering unit may be coupled into a fluidic connection between the extinguishing medium container and the nozzle or the output connector, respectively. The fluidic connection may therefore extend from the extinguishing medium container to the triggering unit and from this triggering unit to the nozzle or the output connector, respectively. If the extinguishing medium is stored in the extinguishing medium container under the predefined pressure, the outflow of extinguishing medium from the extinguishing medium container to the nozzle or the output connector can be respectively controlled by means of the triggering unit. The triggering unit may therefore be designed for releasing, blocking and/or restricting an extinguishing medium flow to the nozzle and/or at the output connector. In an advantageous embodiment, the triggering unit is therefore realized in the form of a controllable valve, particularly a controllable throttle valve. The point in time, the time period and/or the quantity of the extinguishing medium to be discharged, particularly sprayed and/or ejected, can therefore be controlled by means of the controllable triggering unit. It is particularly preferred that the extinguishing unit and/or the vehicle is respectively designed and/or configured for controlling the triggering unit. The triggering unit can therefore be used for initiating the fire extinguishing action when the vehicle is at the location for discharging extinguishing medium. The triggering unit is preferably controlled in dependence on the verified reference fire status. Consequently, the extinguishing medium flow can be restricted if a smoldering fire and/or a preliminary fires stage exists. Property damages can thereby be reduced to a minimum. Extinguishing a smoldering fire and/or a preliminary fire stage usually requires less extinguishing medium than extinguishing a fire, i.e. a combustion process with a light phenomenon.

Another advantageous embodiment of the vehicle is characterized in that the fire extinguishing unit comprises an extinguishing medium pump for conveying extinguishing medium. For example, the extinguishing medium pump may serve for conveying extinguishing medium from the extinguishing medium container to the nozzle and/or the output connector. In this case, the extinguishing medium pump is preferably realized in the form of a controllable extinguishing medium pump. The extinguishing medium pump may be controlled by the fire extinguishing unit and/or the vehicle. The vehicle and the fire extinguishing unit may respectively be designed and/or configured accordingly. The use of an extinguishing medium pump may be particularly advantageous if the extinguishing medium is not stored in the extinguishing medium container under pressure. Furthermore, the extinguishing medium pump may be advantageous for increasing the range or discharging range of the extinguishing medium to be discharged, particularly sprayed and/or ejected.

Another advantageous embodiment of the vehicle is characterized in that the vehicle, particularly the corresponding fire extinguishing unit, is designed for at least additionally using the extinguishing medium pump for controlling an extinguishing medium flow to the nozzle and/or the output connector. For example, the transport of extinguishing medium can be interrupted in order to terminate the discharge of extinguishing medium.

Another advantageous embodiment of the vehicle is characterized in that the triggering unit and/or the extinguishing medium pump is coupled, in particular fluidically, between at least one component of the first group, which comprises the extinguishing medium container, the input connector and the extinguishing medium production device, and at least one component of a second group, which comprises the nozzle and the output connector. For example, the input of the triggering unit may be connected to the extinguishing medium container, the input connector and/or the extinguishing medium production device by means of a fluidic line connection in order to make available extinguishing medium to the triggering unit. An output of the triggering unit may be connected to the nozzle and/or the output connector by means of an additional fluidic line connection. This may apply correspondingly to the extinguishing medium pump. Instead of the triggering unit, this may furthermore apply correspondingly to a combination of the triggering unit and the extinguishing medium pump if they are fluidically connected to one another in series by means of an additional fluidic line connection. An extinguishing medium flow from the extinguishing medium container, the input connector and/or the extinguishing medium production device can therefore be conveyed and/or transported to the nozzle and/or the output connector in a controlled manner by means of the triggering unit and/or the extinguishing medium pump.

Another advantageous embodiment of the vehicle is characterized in that the fire extinguishing unit comprises a first orientation device, which is rotatable, pivotable and/or length-adjustable and on which the nozzle is mounted, wherein the vehicle is designed and/or configured for controlling the first orientation device in order to orient the nozzle. The first orientation device therefore makes it possible to rotate, pivot and/or adjust the height position of the nozzle, preferably in such a way that the nozzle is oriented in the direction of the location of the fire. In this case, the vehicle and/or the extinguishing unit are respectively designed and/or configured for controlling the rotation, pivoting motion and/or height adjustment of the first orientation device. The first orientation device preferably comprises a platform, on which the nozzle is mounted. The platform of the first orientation device may be designed rotatable and/or pivotable relative to the remaining vehicle. In addition, the first orientation device may be designed for raising and/or lowering the platform in the vertical direction. To this end, the first orientation device may comprise at least one controllable actuator, by means of which the platform is rotatable, pivotable and/or height-adjustable relative to the remaining vehicle. The at least one actuator may be designed for being controlled by the vehicle and/or the fire extinguishing unit. In addition, the vehicle and/or the fire extinguishing unit may be designed and/or configured for controlling the at least one actuator, particularly for achieving a correspondingly controlled rotation, pivoting motion and/or height adjustment of the platform and therefore a corresponding orientation of the nozzle. Consequently, a rotation and/or additional navigation of the vehicle is not necessarily required for effectively extinguishing a fire. In fact, the corresponding orientation of the nozzle may suffice for ensuring that a fire is extinguished effectively, quickly and/or with a reduced consumption of extinguishing medium.

Another advantageous embodiment of the vehicle is characterized in that the first orientation device is realized in the form of a first arm device, wherein the nozzle is arranged on an end section of the first arm device, which lies opposite of the vehicle. In this case, the first end section of the arm device may form the aforementioned platform for mounting the nozzle. The first arm device may also comprise at least one joint for pivoting and/or rotating arm elements of the arm device relative to one another. Furthermore, the first arm device may comprise an arm section that can be extended, for example telescopically. If the first orientation device is realized in the form of a first arm device, the first arm device can be used for positioning the nozzle above and/or in front of an obstacle, wherein the obstacle is located between the vehicle and the source of the fire in the fire detector monitoring region. In this way, the first arm device makes it possible to extinguish a fire behind the obstacle, for example, if the vehicle is unable to directly navigate around the obstacle.

Another advantageous embodiment of the vehicle is characterized in that the vehicle comprises a second rotatable, pivotable and/or length-adjustable orientation device, on which the vehicle sensor unit is mounted, wherein the vehicle is designed and/or configured for controlling the second orientation device in order to orient the vehicle sensor unit. The second orientation device therefore makes it possible to rotate, pivot and/or adjust the vertical position of the vehicle sensor unit, preferably for orienting the vehicle sensor unit in the direction of the location of the fire. In this case, the vehicle is preferably designed and/or configured for controlling the rotation, pivoting motion and/or length adjustment of the orientation device. The orientation device preferably comprises a platform, on which the vehicle sensor unit is mounted. The platform of the orientation device may be designed for being rotatable, pivotable and/or height-adjustable relative to the remaining vehicle by means of the second orientation device. In addition, the second orientation device may comprise at least one controllable actuator, by means of which the platform can be rotated or pivoted relative to the remaining vehicle and/or adjusted with respect to its distance from the remaining vehicle. The at least one actuator may be designed for being controlled by the vehicle. Furthermore, the vehicle may be designed and/or configured for controlling the at least one actuator, preferably for achieving an orientation of the vehicle sensor unit, particularly in the direction of the location of the fire, by means of a correspondingly controlled rotation, pivoting motion and/or length adjustment. In order to control the second orientation device, the vehicle may preferably be designed and/or configured for realizing an overlap, particularly a sufficient overlap, of the vehicle monitoring region with the fire detector monitoring region when the vehicle is at the target location. Consequently, a rotation and/or motion of the vehicle is not necessarily required for achieving the desired overlap. In fact, this can be ensured by means of the second orientation device or at least with the aid of the second orientation device.

Another advantageous embodiment of the vehicle is characterized in that the second orientation device is realized in the form of a second arm device, wherein the vehicle sensor unit is arranged on an end section of the second arm device, which lies opposite of the vehicle. In this case, the end section of the second arm device may form the aforementioned platform for mounting the vehicle sensor unit. The second arm device may also comprise at least one joint for pivoting and/or rotating arm elements of the second arm device relative to one another. Furthermore, the second arm device may comprise an arm section that can be extended, for example telescopically. If the second orientation device is realized in the form of a second arm device, the second arm device can be used for positioning the vehicle sensor unit above and/or in front of an obstacle, wherein the obstacle is located between the vehicle and the source of the fire in the fire detector monitoring region. The second arm device makes it possible to position the vehicle sensor unit in front of or above the obstacle, for example, if the vehicle is unable to directly navigate around the obstacle. In this case, the second arm device may be designed for positioning the vehicle sensor unit beyond the obstacle in order to realize an overlap, particularly a sufficient overlap, of the vehicle monitoring region with the fire detector monitoring region. The second arm device therefore provides the advantage that the fire detector monitoring region is also accessible to the vehicle sensor unit behind an obstacle if the obstacle is located between the vehicle and the fire detector monitoring region.

Another advantageous embodiment of the vehicle is characterized in that navigation data, which represents a map with potential paths, is stored in the vehicle, particularly the navigation control unit, wherein the navigation control unit is designed for navigating the vehicle based on the navigation data. When the instruction signal, which represents at least the target location, is received by the vehicle, particularly the navigation control unit, the navigation control unit can navigate the vehicle to the target location in a controlled manner based on the navigation data.

Another advantageous embodiment of the vehicle is characterized in that the navigation control unit is designed for navigating the vehicle to the target location and/or to the location for discharging extinguishing medium based on the navigation data. If the vehicle is used, for example, on factory premises, the navigation data may represent potential paths on the factory premises, along which the vehicle can navigate, particularly without a collision, in order to reach the target location and/or the location for discharging extinguishing medium. In this way, a potential collision of the vehicle with objects and/or other stationarily positioned objects, which may respectively form an obstacle, is effectively prevented.

Another advantageous embodiment of the vehicle is characterized in that the vehicle comprises an obstacle sensor that is designed for detecting an obstacle, particularly in front of the vehicle in the driving direction. The obstacle sensor may be realized for example, in the form of a radar sensor. A signal generated by the obstacle sensor can be transmitted to the navigation control unit, wherein the navigation control unit is preferably also designed for navigating the vehicle to the target location and/or the location for discharging extinguishing medium in a controlled manner based on the aforementioned signal of the obstacle sensor. In this way, the vehicle can very effectively avoid potential obstacles, particularly temporary obstacles.

Another advantageous embodiment of the vehicle is characterized in that the navigation control unit is designed for navigating the vehicle to the mating connector of the stationary extinguishing device based on the navigation data. In this case, the navigation of the vehicle may be realized in such a way that the output connector of the vehicle is coupled to the mating connector of the extinguishing device in order to thereby produce a fluidic connection between the output connector and the mating connector. The navigation data may therefore contain information on the location of the mating connector of the stationary extinguishing device. In this way, the vehicle can be navigated to the mating connector of the stationary extinguishing device by means of the navigation control unit. The navigation by means of the navigation control unit may in this case be realized in such a way that the output connector of the fire extinguishing unit is automatically coupled to the mating connector of the stationary extinguishing device. Alternatively, the navigation of the vehicle by means of the navigation control unit may be realized in such a way that the output connector is arranged opposite of the mating connector of the stationary extinguishing device such that the output connector can subsequently be coupled to the mating connector of the stationary extinguishing device in another step. To this end, the vehicle and/or the fire extinguishing unit may comprise an actuator for coupling the output connector to the mating connector of the stationary extinguishing device. Alternatively, the coupling of the output connector to the mating connector of the stationary extinguishing device may be realized manually. Once the coupling between the output connector of the fire extinguishing unit and the mating connector of the stationary extinguishing device has been produced, extinguishing medium can be transferred and/or transported from the fire extinguishing unit to the stationary extinguishing device. In this context, we refer analogously to the above-described preferred characteristics, advantages and/or effects.

Another advantageous embodiment of the vehicle is characterized in that the navigation control unit is designed for navigating the vehicle to the mating connector of the stationary extinguishing medium source based on the navigation data. In this case, the navigation of the vehicle by means of the navigation control unit may be realized in such a way that the input connector of the vehicle is coupled or can be coupled to the mating connector of the extinguishing medium source.

The navigation data may therefore contain information on the location of the mating connector of the stationary extinguishing medium source. In this way, the vehicle can be navigated to the mating connector of the stationary extinguishing medium source by means of the navigation control unit. The navigation by means of the navigation control unit may in this case be realized in such a way that the output connector of the fire extinguishing unit is automatically coupled to the mating connector of the stationary extinguishing medium source. Alternatively, the navigation of the vehicle by means of the navigation control unit may be realized in such a way that the output connector is arranged opposite of the mating connector of the stationary extinguishing medium source such that the output connector can subsequently be coupled to the mating connector of the stationary extinguishing medium source in another step. To this end, the vehicle and/or the fire extinguishing unit may comprise an actuator for coupling the output connector to the mating connector of the stationary extinguishing medium source. Alternatively, the coupling of the output connector to the mating connector of the stationary extinguishing medium source may be realized manually. Once the coupling between the output connector of the fire extinguishing unit and the mating connector of the stationary extinguishing medium source has been produced, extinguishing medium can be transferred and/or transported from the stationary extinguishing medium source to the fire extinguishing unit.

Another advantageous embodiment of the vehicle is characterized in that the navigation control unit is designed for navigating the vehicle in a controlled manner to an extinguishing medium container depot, in which at least one extinguishing medium container that can be coupled to the coupling device is held available. In this case, the navigation data may contain information on the location of the extinguishing medium container depot. The navigation control unit can therefore navigate the vehicle to the extinguishing medium container depot in a controlled manner. At least one extinguishing medium container can be held available in the extinguishing medium container depot. In this case, the extinguishing medium container preferably contains a predefined quantity of extinguishing medium. In addition, the extinguishing medium may be stored in the extinguishing medium container under a predefined pressure. For example, a new extinguishing medium container can therefore be held available in the extinguishing medium container depot. This is particularly advantageous if the vehicle requires more than one extinguishing medium container for extinguishing a fire. In this case, the navigation control unit can navigate the vehicle to the extinguishing medium container depot in order to exchange the extinguishing medium container by means of the coupling device. The vehicle can subsequently navigate back to the target location and/or the location for discharging extinguishing medium and continue with extinguishing the fire in the above-described manner. The vehicle may also navigate to the extinguishing medium container depot by means of the navigation control unit in order to couple a suitable extinguishing medium container for the fire to be extinguished thereto by means of the coupling device such that the extinguishing medium stored in the corresponding extinguishing medium container can be used for extinguishing the fire in a particularly effective manner.

Another advantageous embodiment of the vehicle is characterized in that the vehicle communication unit is designed for receiving a signal, particularly the instruction signal, from a central unit. Consequently, the vehicle can receive a signal from the central unit by means of the vehicle communication unit. The central unit may be realized, for example, in the form of a central fire alarm system and/or a central fire extinguishing control system or at least form part of such a system. For example, the vehicle communication unit may receive an instruction signal from the central fire alarm system. The vehicle communication unit may furthermore serve for receiving control signals that are transmitted from the central unit to the vehicle communication unit. The control signals may also serve for at least partially navigating the vehicle to the target location. The control signals received by the vehicle or the vehicle communication unit can be transmitted to the navigation control unit, wherein the navigation control unit is designed for navigating the vehicle, particularly to the target location and/or to the location for discharging extinguishing medium, in a controlled manner based on the control signals and/or at least partially based on the control signals. The navigation control unit of the vehicle may be designed, for example, for navigating the vehicle in a controlled manner based on the navigation data, the instruction signal and the control signals received from the central unit. The control signals make it possible, for example, to respectively notify the vehicle or the navigation control unit of potential obstacles and/or barriers such that the vehicle or the navigation control unit respectively navigates to the target location and/or to another location, for example the target location and/or the location for discharging extinguishing medium, along an alternative path with consideration of these control signals.

Another advantageous embodiment of the vehicle is characterized in that the vehicle is designed for generating a triggering signal for the triggering unit and for controlling the triggering unit by means of the triggering signal such that the triggering unit releases an extinguishing medium flow to the nozzle and/or the output connector when the triggering unit is activated by means of the triggering signal. Consequently, the vehicle may be designed for controlling the triggering unit in such a way that an extinguishing medium flow to the nozzle and/or to the output connector is released or blocked. In this case, the vehicle may be designed for generating the triggering signal when the vehicle has determined the verified reference fire status. The generation may furthermore depend and/or be based on whether the vehicle is at the target location and/or the location for discharging extinguishing medium. The generation of the triggering signal makes it possible to control the point in time and/or the quantity of the extinguishing medium being discharged, particularly sprayed and/or ejected. This is particularly sensible if the quantity of extinguishing medium is limited. In this case, the triggering unit can be controlled by means of the vehicle in such a way that a fire is extinguished as effectively as possible.

Another advantageous embodiment of the vehicle is characterized in that the vehicle is designed and/or configured for transmitting a signal, which represents a triggering point, at which the triggering unit releases the extinguishing medium flow, and/or a triggering period of the released extinguishing medium flow, to a central unit. The signal link, particularly the wireless signal link, between the vehicle and the central unit may be used for this purpose. In this context, we refer analogously to the preceding explanations, preferred characteristics, advantages and/or effects. Since the central unit is notified of the triggering point and/or the triggering period, a documentation, particularly of the triggering point and/or the triggering period, can be realized by means of the central unit.

Another advantageous embodiment of the vehicle is characterized in that the vehicle is designed for releasing the extinguishing medium for a predefined extinguishing period, particularly by controlling the triggering unit. In this case, the predefined extinguishing period may be chosen and/or defined in such a way that extinguishing medium can be released multiple times by the fire extinguishing unit. In other words, the predefined extinguishing period makes it possible to prevent the entire extinguishing medium available to the fire extinguishing unit from being released in one uninterrupted process. In fact, the vehicle may be designed and/or configured for releasing the extinguishing medium in multiple time segments. In this case, each time segment may correspond to the predefined extinguishing period.

Another advantageous embodiment of the vehicle is characterized in that the vehicle is designed for re-detecting a fire parameter by means of the vehicle sensor unit after the triggering point, namely during the release of the extinguishing medium flow and/or after expiration of the extinguishing period, and in that the vehicle is designed for determining an extinguished status based on the re-detected fire parameter if the re-detected fire parameter represents an extinguished fire. An extinguished status therefore exists once a fire or a smoldering fire has been completely extinguished. An extinguished status may also exist once a reaction corresponding to a preliminary fire stage has been completely interrupted and also remains autonomously interrupted. For example, the vehicle can release extinguishing medium to the nozzle in order to extinguish a fire in the fire detector monitoring region by generating a triggering signal. In this case, the extinguishing medium may be released for a predefined extinguishing period. After the extinguishing period has expired, the vehicle can re-detect the fire parameter by means of the vehicle sensor unit. This re-detected fire parameter therefore provides information on whether or not the fire in the fire detector monitoring region has the been extinguished by the extinguishing medium. For example, if the re-detected fire parameter represents a temperature that corresponds to an extinguished fire, the vehicle can determine the extinguished status based on the re-detected fire parameter. However, the extinguished status is not determined by the vehicle if the re-detected fire parameter still corresponds to a fire, a preliminary fire stage and/or a smoldering fire. The vehicle is preferably designed and/or configured in such a way that the fire parameter is re-detected prior to the expiration of a predefined time period following the triggering point or the expiration of the extinguishing period. In this way, it can be ensured that the fire parameter is re-detected after extinguishing medium has been discharged. If a fire is not extinguished yet after the discharge of the extinguishing medium, for example, the predefined time period may serve as such a limitation that the combustion process is prevented from developing further until the fire parameter is re-detected.

Another advantageous embodiment of the vehicle is characterized in that the vehicle is designed for re-generating the triggering signal such that the triggering unit once again releases an extinguishing medium flow to the nozzle and/or the output connector if the re-detected fire parameter represents a fire, a preliminary fire stage and/or a smoldering fire.

For example, if the vehicle determines that a fire is not extinguished yet after the previous discharge of the extinguishing medium based on the re-detected fire parameter, the re-generation of the triggering signal serves for further extinguishing the fire. This may apply accordingly to a preliminary fire stage and/or a smoldering fire.

After extinguishing medium was once again discharged, the fire parameter may be re-detected again in accordance with the explanations of the penultimate embodiment of the vehicle in order to determine, if applicable, an extinguished status based thereon if the last re-detected fire parameter represents an extinguished fire. The triggering signal is not re-generated if the extinguished status is determined. If the extinguished status is not determined, however, the re-detected fire parameter once again represents a fire, a preliminary fire stage and/or a smoldering fire and the vehicle can once again re-generate a triggering signal for releasing extinguishing medium to the nozzle and/or the output connector. This sequence can be repeatedly carried out by the vehicle.

Another advantageous embodiment of the vehicle is characterized in that the re-generated triggering signal or a re-generated triggering signal is generated by the vehicle in such a way that the triggering unit releases an extinguishing medium, which differs from the previously released extinguishing medium, to the nozzle and/or the output connector. To this end, the vehicle may comprise, for example, at least two extinguishing medium containers that respectively contain different extinguishing mediums. In this way, the vehicle may be designed for generating the triggering signal in such a way that extinguishing medium is initially released from one of the extinguishing medium containers and extinguishing medium is released from another extinguishing medium container upon re-generation of the triggering signal. Furthermore, the vehicle may preferably be designed and/or configured in such a way that extinguishing medium is released from an extinguishing medium container upon the initial generation of the triggering signal and extinguishing medium, which originates from the input connector and/or the extinguishing medium production device, is released upon re-generation of the triggering signal. Consequently, the vehicle may be designed for releasing extinguishing medium from different sources when the triggering signal is re-generated. This provides the advantage that a fire can be extinguished with different extinguishing mediums.

An advantageous embodiment of the vehicle is characterized in that the vehicle is configured and/or designed for generating an alarm signal based on the verified reference fire status. As mentioned above, the verified reference fire status is only determined if the reference fire status and the verification fire status at least sufficiently match, which is a reliable indicator for a fire in the fire detector monitoring region. The alarm signal may therefore serve, in particular, for initiating a potentially required follow-up action. A follow-up action may involve, for example, a shutdown of a device in the fire detector monitoring region and/or in the immediate vicinity of the fire detector monitoring region. The alarm signal may alternatively or additionally be used for informing an additional unit, particularly the central unit, of the verified reference fire status. The vehicle may therefore be designed for transmitting the alarm signal to the additional unit, particular the central unit. With respect to a corresponding signal link, we refer analogously to the preceding explanations. The additional unit may be realized, for example, in the form of a central extinguishing control system and/or a control center. It is furthermore preferred that the alarm signal or a signal based on the alarm signal can be acoustically and/or optically output by the vehicle. To this end, at least one corresponding output unit may be provided for the vehicle. The alarm signal therefore provides the advantage that a corresponding alarm, which indicates a fire, a preliminary fire stage and/or a smoldering fire in the fire detector monitoring region, can be acoustically and/or optically output. In this way, persons in the fire detector monitoring region can be directly informed of the corresponding hazardous situation.

Another advantageous embodiment of the vehicle is characterized in that the vehicle is configured and/or designed for generating a false alarm signal, which represents a false determination of the reference fire status and/or an unverified reference fire status, if the reference fire status was not determined in the form of a verified reference fire status. The reference fire status is preferably not determined in the form of a verified reference fire status if the reference fire status and the verification fire status do not match and/or sufficiently match. This may be the case, for example, when the reference fire status corresponds to a fire whereas the verification fire status does not correspond to a fire, a smoldering fire or a potentially irrelevant preliminary fire stage. In this case, the verification fire status indicates that no fire, no smoldering fire or no relevant preliminary fire stage exists in the fire detector monitoring region. This suggests that the reference fire status may be falsely determined. A verification of the reference fire status should therefore not take place. In this case, the false alarm signal may be generated by the vehicle. The false alarm signal therefore provides the information that the reference fire status was falsely determined or that the reference fire status could not be verified. Consequently, it can be assumed that the fire detector has falsely detected a fire, a preliminary fire stage and/or a smoldering fire although no fire, no relevant preliminary fire stage and/or no relevant smoldering fire actually exists in the fire detector monitoring region. The false alarm signal may be acoustically and/or optically output by the vehicle. To this end, at least one corresponding output unit may be provided for the vehicle. Alternatively or additionally, the false alarm signal may be used for informing an additional unit, particular the central unit, of the unverified reference fire status. The vehicle may be designed, for example, for transmitting the false alarm signal to the additional unit, particularly the central unit. In this context, we refer analogously to a corresponding signal link between the vehicle and the additional unit, particularly the central unit. A person monitoring the central unit is thereby informed of the fact that the reference fire status may have been falsely determined. In this case, no shutdown of devices in the fire detector monitoring region and/or in the immediate vicinity thereof would be initiated. An acoustical and/or optical output of the false alarm signal and/or a signal based thereon makes it possible to respectively inform persons in the fire detector monitoring region of the false alarm signal or the false determination of the reference fire status. This can have a calming effect on persons located in the fire detector monitoring region.

Another advantageous embodiment of the vehicle is characterized in that the vehicle is designed and/or configured for generating an all-clear signal based on the extinguished status. As explained above, the extinguished status is determined if the re-detected fire parameter represents an extinguished fire. The all-clear signal may be used for informing an additional unit, particularly the central unit, of the extinguished fire. The vehicle may therefore be designed for transmitting the all-clear signal to the additional unit, particularly the central unit. The additional unit may be realized, for example, in the form of the central fire alarm system, the central extinguishing control system and/or the control center. With respect to a corresponding signal link, we refer analogously to the preceding explanations. The vehicle may furthermore be designed and/or configured for acoustically and/or optically outputting the all-clear signal or a signal based on the all-clear signal. To this end, the vehicle may comprise a corresponding output unit. This provides the advantage that persons in the fire detector monitoring region can be informed of the corresponding all-clear status of the fire, which in turn can contribute to calming the corresponding persons.

Another advantageous embodiment of the vehicle is characterized in that the vehicle is designed for transmitting the alarm signal, the false alarm signal and/or the all-clear signal to a central unit, particularly a central fire alarm system and/or a control center. In this context, we refer analogously to the preceding explanations, advantages and/or effects.

The unmanned vehicle is also referred to as extinguishing robot.

According to an alternative aspect to the first aspect of the invention, the initially defined objective is attained by means of an extinguishing robot.

With respect to the extinguishing robot according to this alternative aspect of the invention and the embodiments described below, we refer analogously to the preceding explanations, preferred embodiments, preferred characteristics, advantages and/or effects, which were described above in connection with the unmanned vehicle according to the first aspect of the invention. The extinguishing robot preferably may comprise individual characteristics of the unmanned vehicle as described according to the invention and/or combinations of these characteristics.

The extinguishing robot is preferably designed and/or configured for autonomously navigating to an optimized position for discharging extinguishing medium based on a previously determined location of the fire.

The extinguishing robot preferably comprises a robot control unit with a computer unit that controls the drive and/or the navigation and preferably calculates the optimized position for discharging extinguishing medium.

Extinguishing medium discharge data, for example information on the discharging range and/or the spray pattern of the extinguishing medium to be discharged, particularly sprayed and/or ejected, is preferably stored in the extinguishing robot, particularly in the robot control unit, for each extinguishing medium used.

In another embodiment of the extinguishing robot, the extinguishing robot, particularly the robot control unit, is designed and/or configured for determining the optimized position for discharging extinguishing medium.

The extinguishing robot is particularly designed and/or configured for determining the optimized position for discharging extinguishing medium based on the extinguishing medium discharge data and based on the previously determined location of the fire, namely with consideration of the nozzle construction, the diameter of the extinguishing medium discharge opening and/or the pressure of the extinguishing medium in the fire extinguishing unit and/or in front of the extinguishing medium discharge opening, such that an extinguishing medium to be discharged, particularly sprayed and/or ejected, by the fire extinguishing unit, preferably by a nozzle assigned to the fire extinguishing unit, can flow to and optimally cover the location of the fire. This ensures that the fire can be effectively, quickly and/or reliably extinguished with an optimized quantity of extinguishing medium. In this case, the fire can be extinguished with a minimal consumption of extinguishing medium and within a particularly short time period because it is ensured that the extinguishing medium is purposefully discharged, particularly sprayed and/or ejected, on the actual fire, particularly the corresponding source of the fire.

In another advantageous embodiment, the extinguishing robot comprises a fire extinguishing unit for extinguishing a fire, wherein the vehicle is designed for carrying out a fire extinguishing action with the aid of the fire extinguishing unit. In addition, the fire extinguishing unit preferably comprises a nozzle that is designed for discharging, particularly spraying, an extinguishing medium in order to extinguish a fire.

In another preferred embodiment, the fire extinguishing unit of the extinguishing robot comprises an externally accessible output connector for making available extinguishing medium, wherein said output connector can be coupled to a mating connector of a stationary extinguishing device in order to make available extinguishing medium to the stationary extinguishing device.

In another preferred embodiment, the fire extinguishing unit comprises an extinguishing medium container, particularly a detachable extinguishing medium container, in which extinguishing medium is stored, or alternatively two detachable extinguishing medium containers with different extinguishing mediums, for example one extinguishing medium container with the synthetic extinguishing medium FK-5-1-12 ($C_4F_9OCH_3$) and another extinguishing medium container with water, which is preferably discharged in the form of water mist. This provides the advantage that the required extinguishing medium can be cost-efficiently used in an optimized quantity for the extinguishing result.

In another embodiment of the extinguishing robot, the extinguishing robot comprises a navigation control unit and is designed and/or configured for navigating to an extinguishing medium container depot in a controlled manner, preferably based on navigation data. The navigation to the extinguishing medium container depot may preferably also be realized by means of a position signal of the extinguishing medium container depot, which is made available by a transmitting device of the extinguishing medium container depot, preferably in case of a fire. The transmission of the position signal is preferably initiated by a central unit, preferably a central fire alarm system. At least one extinguishing medium container, which can be coupled to the extinguishing robot by means of a coupling device, is made available in the extinguishing medium container depot that is preferably arranged in the fire zone. This has the advantage that the extinguishing robot only picks up the extinguishing medium container when it is needed such that the energy consumption for the locomotion of the extinguishing robot is reduced. If necessary, an empty extinguishing medium container may furthermore be exchanged for an extinguishing medium container filled with extinguishing medium for further extinguishing processes.

In another embodiment of the extinguishing robot, the extinguishing robot is designed and/or configured for detecting a fire parameter by means of a vehicle sensor unit. If the detected fire parameter represents a fire, a preliminary fire stage and/or a smoldering fire, the extinguishing robot initiates a fire extinguishing action by means of the fire extinguishing unit, preferably for a predefined extinguishing period.

Furthermore, the extinguishing robot is preferably designed and/or configured for re-detecting a fire parameter by means of the vehicle sensor unit after the predefined extinguishing period and for once again discharging extinguishing medium if the re-detected fire parameter represents a fire, a preliminary fire stage and/or a smoldering fire. Consequently, a fire can be extinguished again if the first fire extinguishing action did not completely extinguish the fire or the fire flared up again after the extinguishing process.

In another embodiment of the extinguishing robot, the extinguishing robot, particularly the robot control unit, is designed and/or configured for once again or iteratively determining the optimized position for discharging extinguishing medium based on the extinguishing medium discharge data, particularly based on the discharging range, and/or the re-calculated location of the fire, which was calculated by means of the vehicle sensor unit based on the re-detected fire parameter. This has the advantage that the respectively optimized position for discharging extinguishing medium can be assumed in adaptation to the extinguishing progress or the change of the position of the flame front or the position of hotspots in order to quickly extinguish a fire with a minimal quantity of extinguishing medium.

In another embodiment, the extinguishing robot, particularly the fire extinguishing unit, comprises a first rotatable, pivotable and/or length-adjustable orientation device, on which the nozzle is mounted, wherein the extinguishing robot, particularly the computer unit, is designed for controlling the first orientation device in order to orient the nozzle. Furthermore, the extinguishing robot is preferably designed and/or configured for calculating the orientation of the nozzle based on the previously determined location of the fire, the fire extinguishing discharge data and/or the optimized position for discharging extinguishing medium.

According to a second aspect of the invention, the initially defined objective is attained by means of a system. The system serves for extinguishing fires. The system comprises a central unit, particularly a central fire alarm system and/or a stationary fire detector, as well as a vehicle. In this case, the vehicle is a vehicle according to the first aspect of the invention and/or according to one of the described advantageous embodiments of the vehicle. The vehicle comprises a first signal communication unit that includes the vehicle communication unit of the vehicle. The central unit comprises a second signal communication unit that is designed for producing a wireless signal link with the first signal communication unit of the vehicle. The central unit and/or the stationary fire detector is designed and/or configured for transmitting the instruction signal to the vehicle. With respect to the vehicle of the system, we refer analogously to the preceding explanations, preferred embodiments, preferred characteristics, advantages and/or effects, which were described above in connection with the vehicle according to the first aspect of the invention or the corresponding embodiments. With respect to the central unit, we likewise refer analogously to the preceding explanations, preferred embodiments, preferred characteristics, advantages and/or effects.

The first signal communication unit of the vehicle comprises the vehicle communication unit, which is preferably designed and/or configured for receiving the instruction signal. The vehicle communication unit may be realized in the form of a wireless signal receiving unit. The first signal communication unit may therefore be at least partially realized in the form of a wireless signal communication unit. The information represented by the instruction signal can thereby be made available to the vehicle. In addition, the vehicle communication unit of the vehicle may comprise the advantageous signal transmitting unit, which was described above with reference to the vehicle and is preferably realized in the form of a wireless signal transmitting unit. In this context, we refer analogously to the corresponding explanations, preferred characteristics, effects and/or advantages.

The second signal communication unit of the central unit may be designed for transmitting the instruction signal. To this end, the second signal communication unit of the central unit may comprise a signal transmitting unit. The signal transmitting unit may be realized in the form of a wireless signal transmitting unit. The signal transmitting unit may also be designed and/or configured for transmitting the instruction signal. In this way, the instruction signal can be wirelessly transmitted from the central unit to the vehicle, preferably via radio.

In addition, the first signal communication unit and/or the signal communication unit may be designed for the bidirectional transmission of a signal. Consequently, each of the two signal communication units may comprise a signal receiving unit and a signal transmitting unit. This provides the advantage that the vehicle and the central unit can exchange signals, preferably in order to exchange information represented by the respective signals.

An advantageous embodiment of the system is characterized in that the central unit is formed by a central fire alarm system. The central fire alarm system may be realized in the form of a device. Furthermore, the central fire alarm system and a central extinguishing control system may be realized in the form of a common unit and/or device. Alternatively or additionally, the central unit may comprise the central fire alarm system and the central extinguishing control system. If the central unit is formed by at least one central fire alarm system, the central unit in the form of a central fire alarm system can be advantageously integrated into an existing system, particularly a fire alarm system, and/or into an existing facility, particularly a fire alarm facility.

Another advantageous embodiment of the system is characterized in that the central unit is designed for transmitting navigation control signals from the central unit to the vehicle, in that the vehicle is designed and/or configured for navigating based on the transmitted navigation control signals, and in that the central unit is designed for navigating the vehicle in a remote-controlled manner by transmitting navigation control signals to the vehicle. As mentioned above, the first signal communication unit of the vehicle may comprise a signal receiving unit and a signal transmitting unit. In addition, the vehicle may be designed and/or configured for receiving a position finding signal. For example, the position finding signal may be a satellite position finding signal such as a GPS signal. The vehicle may be designed for autonomously navigating based on the position finding signal. However, it can occur that obstacles, for example temporary obstacles and/or stationary obstacles, are arranged along the path to the target location. This information may be available to the central unit. The central unit can therefore transmit navigation control signals to the vehicle in order to navigate or at least influence the navigation in a remote-controlled manner based on the navigation control signals. For example, the navigation control signals may serve for driving and/or flying around the aforementioned obstacles. Consequently, the vehicle may be designed for navigating to the target location based on the navigation control signals and the likewise receivable position finding signals. In addition, the vehicle may transmit a position signal, which represents the current position of the vehicle, to the central unit by means of the signal transmitting unit of the first signal communication unit. This position signal can be received by the signal receiving unit of the second signal communication unit of the central unit. The central unit may be designed and/or configured for adapting and/or determining the navigation control system based on the received position signal in order to subsequently transmit this navigation control signal to the vehicle. In this case, known obstacles along the path to the target location can be taken into account in the determination of the navigation control signal. This embodiment of the system therefore provides the advantage that the vehicle can very quickly and/or safely navigate to the target location because the vehicle does not collide with potential obstacles, but rather can drive and/or fly around these obstacles.

An advantageous embodiment of the system is characterized by a stationary extinguishing device with a mating connector that is designed for being coupled to the output connector of the vehicle. A fluidic connection between the output connector and the mating connector is produced when the output connector is coupled to the mating connector. A fluidic connection is thereby produced by means of the coupling process. The stationary extinguishing device may be designed for discharging, particularly ejecting and/or spraying, extinguishing medium in the fire detector monitoring region. The stationary extinguishing device is also referred to as extinguishing system. When extinguishing medium is transported from the output connector of the vehicle to the mating connector of the extinguishing device, the extinguishing device can convey the extinguishing medium onward in such a way that it is discharged in the fire detector monitoring region in order to extinguish a fire, a preliminary fire stage and/or a smoldering fire at this location. With respect to the extinguishing device of the system, we refer analogously to the preceding explanations, preferred characteristics, effects and/or advantages, which were described above in connection with the extinguishing device of the vehicle according to the first aspect of the invention or the corresponding embodiments, respectively.

Another advantageous embodiment of the system is characterized in that the central unit is designed and/or configured for navigating the vehicle to the target location, the location for discharging extinguishing medium, the extinguishing device and/or the extinguishing medium source in a remote-controlled manner. For example, the vehicle may be designed for initially navigating to the extinguishing medium source based on the received navigation control signals and preferably based on the received position finding signals in order to be coupled to an extinguishing medium container with extinguishing medium stored therein at this extinguishing medium source, preferably by means of the coupling device. Subsequently, the vehicle can navigate to the target location based on the navigation control signals and/or the position finding signals in order to determine if a fire actually exists. If this is the case, the vehicle can then navigate to the location for discharging extinguishing medium based on the received navigation control signals and/or received position finding signals in order to subsequently discharge, preferably spray and/or eject, the extinguishing medium from the extinguishing medium container. If the extinguishing medium should not be directly discharged by the vehicle, the vehicle may be designed and/or configured for navigating to the extinguishing device based on the received navigation signals and/or received position finding signals. The vehicle can then couple the output connector of the vehicle to the mating connector of the extinguishing device in order to transport the extinguishing medium to the extinguishing device. The extinguishing medium is thereby discharged in the fire detector monitoring region in order to extinguish a potentially existing fire, a potentially existing preliminary fire stage and/or a potentially existing smoldering fire.

An advantageous embodiment of the system is characterized in that the extinguishing device comprises the mating connector, at least one extinguishing nozzle and a pipe network that extends between the mating connector of the extinguishing device and the at least one extinguishing nozzle of the extinguishing device. To this end, the pipe network may comprise at least one extinguishing medium line, preferably multiple extinguishing medium lines that are coupled to one another. If the extinguishing device comprises multiple extinguishing nozzles, for example, the pipe network may be designed for conveying extinguishing medium from the mating connector to the extinguishing nozzles by means of the extinguishing medium lines. In this context, we refer analogously to the preceding explanations, preferred characteristics, effects and/or advantages, which were described above in connection with the vehicle according to the first aspect or the corresponding embodiments, respectively.

An advantageous embodiment of the system is characterized in that the extinguishing device is designed for extinguishing a fire in the fire detector monitoring region in that extinguishing medium can be transported from the output connector of the vehicle to the mating connector of the extinguishing device and to the at least one extinguishing nozzle of the extinguishing device via the pipe network. When extinguishing medium is transported from the output connector to the mating connector, the pipe network conveys the extinguishing medium to the extinguishing nozzles that subsequently discharge the extinguishing medium, for example, in order to extinguish a fire in the fire detector monitoring region. In this context, we refer analogously to the preceding explanations, preferred characteristics, effects and/or advantages, which were described above in connection with the vehicle according to the first aspect or the corresponding embodiments, respectively.

Another advantageous embodiment of the system is characterized by a stationary fire detector, wherein the fire detector comprises a fire detector sensor unit that is designed for detecting a reference fire parameter of a predefined fire detector monitoring region, wherein the fire detector is designed for determining a reference fire status by evaluating the reference fire parameter, wherein the fire detector is designed for transmitting a fire detector signal, which represents the reference fire status, to the central unit, wherein the central unit is configured for transmitting an instruction signal to the vehicle in case the fire detector signal transmitted by the fire detector represents a reference fire status that requires verification, wherein the instruction signal represents at least a target location for the vehicle, and wherein the vehicle monitoring region sufficiently overlaps with the fire detector monitoring region when the vehicle is at the target location.

The system serves for extinguishing fires, preferably based on a verified reference fire status. The system comprises the central unit, the at least one stationary fire detector and the unmanned vehicle. The stationary fire detector is also simply referred to as fire detector. The system provides the advantage that a reference fire status determined by a fire detector can be verified by means of a verification fire status determined by the vehicle such that a verified reference fire status can be determined if the aforementioned statuses at least sufficiently match. Consequently, the system makes it possible to determine a verified fire status, namely the verified reference fire status. A transmission of sensor data from the vehicle to the central unit is therefore not required. A signal link between the vehicle and the central unit, which is preferably realized in the form of a wireless link, therefore does not have to be suitable for transmitting large amounts of data within a short time period. In fact, the verified reference fire status can be determined by means of the vehicle at the target location or the vehicle transmits a verification signal, which represents the verification fire status, to the central unit such that, if applicable, the central unit can determine the verified reference fire status.

Another advantage of the system can be seen in the automatic determination of the verified reference fire status as such. The verification fire status can be determined by the vehicle itself such that an automatic verification of the reference fire status can take place based thereon, i.e. the verified reference fire status can be automatically determined upon a sufficient match. This can be realized without human intervention such that the determination of the verified reference fire status can take place in a particularly fast and reliable manner.

Furthermore, the system is cost-efficient and can at the same time be used in a particularly flexible and/or versatile manner. The vehicle can navigate, particular drive and/or fly, to any target locations. Consequently, the vehicle of the system can be used for detecting a verification fire parameter of the fire detector monitoring region of any fire detector. The vehicle is mobile and therefore not stationarily bound or assigned to a stationary device, respectively. It is therefore no longer necessary to provide an additional monitoring system, for example a stationarily installed camera system, for each fire detector or for a group of fire detectors in a monitoring region in order to respectively confirm or verify a reference fire status determined by the respective fire detector. Due to the low expenditures for only one vehicle and the mobility of the vehicle, the system is particularly cost-efficient and can be used in a flexible manner.

The verified reference fire status can serve as a reliable basis for initiating a follow-up action such as a fire extinguishing action in order to thereby extinguish, for example, a fire in the fire detector monitoring region. The system may form at least part of a fire alarm system. A fire alarm system is preferably also referred to as fire alarm facility. Consequently, the system or the fire alarm system may respectively also serve for preventive fire protection.

Fire detectors are basically known from the prior art. With respect to the system, it is proposed that at least one fire detector is stationarily installed. Such a fire detector may be permanently installed, for example, in a building, on a building or on an object to be protected or in its vicinity. The stationary fire detector is also simply referred to as fire detector below. For example, the fire detector may be realized in the form of a fire gas detector, a smoke detector, a heat detector, a flame detector, a detector for detecting electromagnetic radiation of a predefined spectrum, which preferably implies a fire, or in the form of a combination of the aforementioned detectors.

The fire detector comprises a fire detector sensor unit. It is preferred that the fire detector sensor unit is respectively formed by a sensor or a sensor unit. In addition, the fire detector sensor unit is designed for detecting a fire parameter of the fire detector monitoring region. The fire parameter detected by the fire detector sensor unit is referred to as reference fire parameter. In this case, a fire parameter may basically represent and/or characterize at least one physical and/or chemical property of a combustion process. In a preferred embodiment, the fire detector sensor unit may be respectively realized in the form of a multi-sensor unit or with multiple sensors, particularly different sensors. The sensor signals and/or sensor data of the multi-sensor or the multiple sensors can be evaluated by means of a pre- processing unit, particularly based on stored signal patterns or signal data, in order to determine the fire parameter as a result thereof. To this end, the fire detector sensor unit may be designed and/or configured accordingly. The determined fire parameter may then be referred to as detected fire parameter or reference fire parameter, respectively. If the fire detector is stationarily installed, the fire detector monitoring region preferably is also a stationary fire detector monitoring region. The fire detector monitoring region preferably is a region that is assigned to the fire detector and monitored with respect to a fire, a preliminary five stage and/or a smoldering fire by the fire detector. The fire detector is preferably realized in the form of a so-called automatic fire detector. In this way, the reference fire parameter of the fire detector monitoring region can be automatically detected with the fire detector sensor unit. In this case, the detection may take continuously or discretely, for example in predefined time intervals.

Depending on the respective application, the fire detector sensor unit may be designed for detecting different reference fire parameters. One example of a reference fire parameter is the temperature. In this case, the fire detector sensor unit may be designed for detecting the temperature of the fire detector monitoring region. The fire detector sensor unit may in this case be realized in the form of a temperature sensor unit or in the form of a temperature sensor. This applies accordingly to the following potential fire parameters. For example, a fire parameter may be a smoke concentration, which is also referred to as smoke particle concentration, a concentration of a predefined gas, a concentration of multiple predefined gases, a concentration of at least one thermal decomposition product or an amplitude, particularly a mean amplitude, of a predefined electromagnetic spectral range. A fire parameter may also be a changing and/or increasing value of at least one of the aforementioned fire parameters. The fire parameter therefore may be, for example, a temperature gradient or a concentration gradient. In order to detect a concentration of a gas, the fire detector sensor unit may be realized, for example, in the form of a gas sensor unit or in the form of a gas sensor. If the fire detector sensor unit serves for detecting an amplitude of a predefined electromagnetic spectral range, it is preferably realized in the form of an optical and/or photoelectric sensor unit for detecting a corresponding amplitude, particularly a mean amplitude, of the predefined electromagnetic spectral range. For example, this spectral range may form part of the ultraviolet range, the infrared range and/or the near-infrared range.

The detected reference fire parameter therefore provides information on whether a fire, a preliminary fire stage or a smoldering fire exists in the fire detector monitoring region.

The fire detector is designed for determining a reference fire status based on the detected reference fire parameter, preferably based on the at least one detected reference fire parameter. To this end, the reference fire parameter is evaluated by the fire detector. The fire detector may comprise an evaluation unit in order to carry out this evaluation. The evaluation unit may be realized in the form of a data processing unit for evaluating the reference fire parameter. If the fire detector sensor unit is designed, for example, for detecting the temperature of the fire detector monitoring region, the reference fire status can be determined by evaluating the temperature by means of the fire detector. For example, if the temperature exceeds a predefined threshold value, the reference fire status can be determined in the form of a fire. With respect to a smoldering fire or a combustion process without light phenomenon, in particular, it can be concluded that the reference fire status should be determined in the form of a preliminary fire stage or a smoldering fire, for example, by detecting the concentration of a predefined gas. However, no reference fire status is determined if the fire detector sensor unit detects a reference fire parameter that does not correspond to a fire, a preliminary fire stage or a smoldering fire. To this end, the fire detector may be designed and/or configured accordingly.

In a preferred embodiment, the fire detector sensor unit may be realized in the form of a multi-sensor unit or with multiple sensors, particularly different sensors. The sensors or the multi-sensor unit may be designed for detecting multiple fire parameters, wherein these fire parameters are referred to as reference fire parameters. The fire detector may be designed for determining a reference fire status based on the aforementioned detected reference fire parameters. To this end, the reference fire parameters are evaluated by the fire detector. The fire detector may comprise an evaluation unit in order to carry out this evaluation. The evaluation unit may be realized in the form of a data processing unit for evaluating the reference fire parameters. The evaluation may be carried out, in particular, with the aid of neural networks.

If a reference fire status was determined by the fire detector, the fire detector can transmit a fire detector signal, which represents the reference fire status, to the central unit. To this end, the fire detector may comprise a signal transmitting unit. The central unit may accordingly comprise a signal receiving unit. In this way, the fire detector signal can be transmitted to the signal receiving unit of the central unit by means of the transmitting unit of the fire detector such that the fire detector signal or the reference fire status is respectively made available to the central unit. In this case, the transmitting unit may be realized in the form of a wireless transmitting unit and the signal receiving unit may be realized in the form of a wireless signal receiving unit. Alternatively or additionally, a wire-bound signal link may be produced between the signal transmitting unit and the signal receiving unit. In other words, the central unit and the fire detector may be connected to one another by means of a cable-bound signal link and/or a wireless link in order to allow the transmission of the fire detector signal. If a cable-bound signal link is used for transmitting the fire detector signal, the fire detector signal may be represented and/or modeled by a current signal and/or voltage signal. To this end, the fire detector may adapt, for example, the current intensity and/or the voltage potential in order to transmit the fire detector signal. The cable-bound signal link may lead from the central unit to a plurality of fire detectors, wherein the fire detectors are connected in series by means of the cable-bound signal link. This is also referred to as the fire detector line. The cable-bound signal link may also be realized in the form of a bus line. In this case, each of the multiple fire detectors respectively forms a bus subscriber. Each bus subscriber may have its own address, which is also referred to as bus address. All in all, a bus system for transmitting information may thereby be formed by the bus subscribers and the bus line. The bus system is preferably realized in the form of a ring bus system. For example, the information represents or concerns the fire detector signal. In this way, a fire detector can transmit a fire detector signal to the central unit by means of the bus line or the bus system, respectively. This may be realized, for example, in bit-serial form or in a half-duplex process. In this case, the fire detector modulates the fire detector signal or the corresponding data information on a bus supply voltage made available by the central unit. The central unit demodulates the corresponding signals such that the fire detector signal is available to the central unit.

In an advantageous embodiment, the fire detector or at least one of the fire detectors, preferably each of the fire detectors, is supplied with electrical energy by the central unit. This may be realized with the aforementioned cable-bound signal link. This cable-bound signal link particularly may also serve and/or be designed for transmitting electrical power from the central unit to the respective fire detectors. For example, the central unit may make available a direct voltage, wherein the signals are modulated by means of an alternating voltage.

The central unit is configured and/or designed for transmitting an instruction signal to the vehicle. Consequently, the central unit is preferably designed for transmitting the instruction signal to the vehicle.

The second signal communication unit of the central unit and the first signal communication unit of the vehicle serve for transmitting the instruction signal. Consequently, the instruction signal can be transmitted to the vehicle by means of a signal transmitting unit of the second signal communication unit. The signal receiving unit of the first signal communication unit of the vehicle may be designed and/or configured for receiving the instruction signal. Consequently, the central unit and the vehicle may preferably be connected to one another by means of a wireless signal link in order to transmit the instruction signal from the central unit to the vehicle. However, the instruction signal is only transmitted to the vehicle if the fire detector signal transmitted by the fire detector represents a reference fire status that requires verification. The reference fire status preferably requires verification if the reference fire status represents a fire. If the stationary fire detector is installed, for example, in a factory building, in which smoke is regularly produced due to the production of components, it can occur that the fire detector determines a reference fire status that corresponds to a preliminary fire stage. In this case, a corresponding reference fire status may not require verification. However, the described example is only one of many examples of a reference fire status requiring verification. For example, the reference fire status preferably requires verification if it corresponds to a fire, a preliminary fire stage or a smoldering fire. If the reference fire status requires verification, the instruction signal is transmitted from the central unit to the vehicle.

In this case, the instruction signal represents at least a target location for the vehicle. The target location may be a location coordinate, have a location coordinate or represent a limited space and/or a region. The target location may also include other location information such as, for example, information for orienting the vehicle and/or the vehicle sensor unit of the vehicle. In this context, we refer analogously to the preceding explanations, preferred characteristics, effects and/or advantages, which were described above in connection with the instruction signal and/or the navigation of the vehicle according to the first aspect of the invention or the corresponding embodiments, respectively.

The vehicle monitoring region and the fire detector monitoring region sufficiently overlap once the vehicle has navigated to the target location, preferably in the form of a controlled motion. At the target location, the vehicle preferably is spaced apart from the fire detector monitoring region by a predefined distance or even lies within the fire detector monitoring region. Since the vehicle monitoring region correspondingly moves along with the navigation of the vehicle, the vehicle monitoring region is sufficiently overlapped with the fire detector monitoring region when the vehicle is at the target location.

It is preferred that the vehicle monitoring region and the fire detector monitoring region sufficiently overlap when at least 30%, at least 40%, at least 50%, at least 60%, at least 70%, at least 80%, at least 90% or 100% of the vehicle monitoring region overlap with the fire detector monitoring region. A reference fire status can be determined by the fire detector and a corresponding verification fire status can be determined by the vehicle in the region, in which the vehicle monitoring region and the fire detector monitoring region overlap.

The verified reference fire status is determined by the vehicle if the reference fire status and the verification fire status at least sufficiently match. In this case, the verified reference fire status may respectively correspond to a fire, a preliminary fire stage and/or a smoldering fire or represent the fire, the preliminary fire stage and/or the smoldering fire. The verified reference fire status therefore provides reliable information on whether a fire, a preliminary fire stage or a smoldering fire actually exists in the fire detector monitoring region.

In addition, the vehicle is designed and/or configured for initiating a fire extinguishing action if the reference fire status was determined in the form of a verified reference fire status. In this context, we refer analogously to the preceding explanations, advantageous characteristics, preferred embodiments, effects and/or advantages, which were described above in connection with the vehicle according to the first aspect or the corresponding embodiments, respectively.

An advantageous embodiment of the system is characterized in that a measuring principle of the fire detector sensor unit and a measuring principle of the vehicle sensor unit differ. If the system comprises multiple fire detectors, each fire detector may operate on the same measuring principle. In one example, the sensor type used for a vehicle sensor unit may be realized differently from a sensor type used for the at least one fire sensor unit. Consequently, faulty measurements caused by the respective measuring principle and corresponding errors in determining, in particular, the verified reference fire status can be prevented or at least reduced by using different measuring principles for the vehicle sensor unit and the at least one fire detector sensor unit.

An advantageous embodiment of the system is characterized in that the system comprises multiple stationary fire detectors. In this case, each fire detector may be realized analogous to the above-described fire detector. In this context, we refer analogously to the explanations of the above-described fire detector, as well as the resulting advantages and/or effects, with respect to each fire detector. In addition, the central unit may be configured and/or designed for receiving a fire detector signal transmitted by each fire detector. A system comprising multiple stationary fire detectors makes it possible, for example, to monitor larger regions and/or larger buildings. In this case, the fire detectors may be arranged in such a way that their fire detector monitoring regions lie directly adjacent to one another and/or at least partially overlap.

Another advantageous embodiment of the system is characterized in that the central unit is designed for determining a fire detector location of the fire detector, which has transmitted the fire detector signal, based on the fire detector signal transmitted by one of the fire detectors, and in that the central unit is designed for determining the target location based on the fire detector location. In this case, the fire detector signal transmitted by the fire detector may also contain an identification. This identification may also be referred to as address, bus address or address identification, particularly of a fire detector. The identification may provide information on the fire detector location. The central unit may in this case be designed for determining the fire detector location based on the identification. Alternatively or additionally, the central unit may contain stored data on each of a plurality of identifications, which can be transmitted from the fire detectors to the central unit by means of the fire detector signal and respectively represent a corresponding fire detector location. If an identification is additionally transmitted from the fire detector to the central unit by means of the fire detector signal, the central unit may be designed for determining the fire detector location of the fire detector based on the fire detector signal and the aforementioned data. In addition, the central unit may contain stored data that represents a corresponding target location for each fire detector location. The central unit may therefore be configured and/or designed for determining a corresponding target location, in particular, based on this data and the determined fire detector location, wherein said target location is then used for transmitting an instruction signal to the vehicle such that the vehicle can navigate to the corresponding target location.

The aforementioned data of the central unit for determining the target location and/or the fire detector location may alternatively also be stored in another unit and/or another system, wherein the central unit has a communication link to the corresponding unit or the corresponding system, and wherein the central unit is designed for retrieving the corresponding data from the aforementioned unit or the aforementioned system in order to subsequently carry out the corresponding determination of the target location or fire detector location, respectively.

Another advantageous embodiment of the system is characterized in that the central unit is configured for determining the instruction signal in such a way that the instruction signal represents at least one target location for the vehicle, at which the vehicle monitoring region sufficiently overlaps with the fire detector monitoring region, the reference fire parameter of which was detected by the fire detector sensor unit of the fire detector that has transmitted the fire detector signal to the central unit, when the vehicle is at the target location. If a reference fire parameter is detected by one of the fire detectors and a fire detector signal is transmitted to the central unit based on the detected reference fire parameter, for example, the instruction signal is determined by the central unit in such a way that the target location for the vehicle represented by the instruction signal is chosen such that the vehicle monitoring region sufficiently overlaps with the fire detector monitoring region when the vehicle is at the target location. Consequently, the central unit is configured for respectively determining a corresponding target location or a corresponding instruction signal for each of the fire detectors such that the vehicle can upon reception of this instruction signal navigate to the corresponding target location in order to achieve an overlap of the vehicle monitoring region with the corresponding fire detector monitoring region. This embodiment of the system provides the advantage that a plurality of stationary fire detectors can be provided and that the vehicle can navigate to a respectively adapted target location by means of the instruction signal in order to achieve the overlap between the vehicle monitoring region and the fire detector monitoring region corresponding to the fire detector. A plurality of vehicles is therefore not required. In fact, only one vehicle suffices for a determination of a verified reference fire status, namely also if a plurality of fire detectors are provided. The system can therefore also be realized in a particularly cost-efficient manner if a plurality of fire detectors are provided and nevertheless make it possible to verify a reference fire status and, if applicable, to determine a verified reference fire status.

According to a third aspect of the invention, the initially defined objective is attained by means of a method. The method serves for extinguishing fires. The method comprises the following steps:

a) receiving an instruction signal by means of a vehicle communication unit of an unmanned vehicle, wherein a vehicle sensor unit of the vehicle is designed for detecting, in particular, at least one fire parameter of a vehicle monitoring region, and wherein the instruction signal represents a detected fire, particularly a reference fire status for a fire detector monitoring region of a stationary fire detector and a target location;

b) navigating the vehicle to the target location or to the target region, preferably in an autonomous manner, based on the instruction signal received by the vehicle;

c) detecting the or each fire parameter in the form of a verification fire parameter, particularly of the fire detector monitoring region, by means of the vehicle sensor unit;

d) determining a verification fire status by evaluating, in particular, the at least one verification fire parameter by means of the vehicle; and e) initiating a fire extinguishing action by means of the vehicle if the verification fire status was determined.

With respect to the method according to the third aspect of the invention, we refer analogously to the preceding explanations, preferred embodiments, preferred characteristics, advantages and/or effects, which were described above in connection with the vehicle according to the first aspect of the invention and/or the system according to the second aspect of the invention.

Preferred embodiments of the method are described below. At this point, we already refer analogously to the preceding explanations, preferred embodiments, preferred characteristics, advantages and/or effects, which were described above in connection with the vehicle according to the first aspect of the invention and/or the system according to the second aspect of the invention, with respect to each preferred embodiment of the method.

In an embodiment of the method, the navigation to the target location is realized in such a way that the vehicle monitoring region sufficiently overlaps with the fire detector monitoring region at the target location, wherein the vehicle determines the reference fire status in the form of a verified reference fire status if the reference fire status and the verification fire status at least sufficiently match, and wherein the vehicle initiates a fire extinguishing action if the reference fire status was determined in the form of a verified reference fire status.

An advantageous embodiment of the method is characterized by an additional step, which is carried out prior to the reception of the instruction signal, namely the step of transmitting a corresponding instruction signal to the vehicle communication unit of the vehicle by means of a signal transmitting unit of a central unit.

Another advantageous embodiment of the method is characterized by the following additional steps, which are carried out prior to the transmission of the instruction signal:

detecting, in particular, at least one reference fire parameter of the fire detector monitoring region by means of a fire detector sensor unit of a fire detector;

determining the reference fire status by evaluating, in particular, the at least one reference fire parameter by means of the fire detector;

transmitting a fire detector signal representing the reference fire status from the fire detector to a central unit; and transmitting the instruction signal to the vehicle if the fire detector signal transmitted by the fire detector represents a reference fire status that requires verification.

Another advantageous embodiment of the method is characterized in that the fire extinguishing action is carried out by means of a fire extinguishing unit of the vehicle.

Another advantageous embodiment of the method is characterized by an additional step, namely the step of determining a location of the fire by means of the vehicle sensor unit of the vehicle when the vehicle is at the target location or in the target region.

Another advantageous embodiment of the method is characterized by an additional step, namely the step of orienting the vehicle sensor unit in the direction of the location of the fire.

Another advantageous embodiment of the method is characterized in that the verification fire parameter is detected when the vehicle sensor unit is oriented in the direction of the location of the fire.

Another advantageous embodiment of the method is characterized in that extinguishing medium is discharged in the direction of the location of the fire in order to extinguish a fire.

Another advantageous embodiment of the method is characterized by an additional step, namely the step of navigating the vehicle, in particular, to an optimal location for discharging extinguishing medium based on the location of the fire.

Another advantageous embodiment of the method is characterized in that the fire extinguishing action is initiated when the vehicle is at the location for discharging extinguishing medium.

Another advantageous embodiment of the method is characterized by an additional step, namely the step of discharging extinguishing medium by means of the fire extinguishing unit, particularly by means of a nozzle of the fire extinguishing unit and for a predefined extinguishing period, in order to extinguish a fire.

Another advantageous embodiment of the method is characterized by additional steps, namely the step of coupling an externally accessible output connector of the fire extinguishing unit to a mating connector of a stationary extinguishing device, and the step of transferring extinguishing medium from the vehicle to the extinguishing device in order to extinguish a fire.

Another advantageous embodiment of the method is characterized in that the fire extinguishing unit comprises a first rotatable, pivotable and/or length-adjustable orientation device, on which the nozzle is mounted, wherein the method is furthermore characterized by the step of orienting the nozzle by means of the first orientation device based on the location of the fire, preferably in such a way that extinguishing medium discharged through the nozzle flows to the location of the fire.

Another advantageous embodiment of the method is characterized in that the fire extinguishing unit comprises a second rotatable, pivotable and/or length-adjustable orientation device, on which the vehicle sensor unit is mounted, wherein the method is furthermore characterized by the step of orienting the vehicle sensor unit, preferably in the direction of the location of the fire, by means of the second orientation device.

Another advantageous embodiment of the method is characterized in that navigation data, which represents a map with potential paths, is stored in the vehicle, particularly in the navigation control unit, wherein the method is furthermore characterized in that the navigation of the vehicle takes place based on the navigation data.

Another advantageous embodiment of the method is characterized in that extinguishing medium is respectively discharged or transferred for a predefined extinguishing period.

Another advantageous embodiment of the method is characterized by additional steps, namely the step of re-detecting, in particular, at least one fire parameter by means of the vehicle sensor unit during or after the respective discharge or transfer of extinguishing medium and the step of determining an extinguished status if the re-detected fire parameter, particularly at least one re-detected fire parameter, represents an extinguished fire, wherein the determination of the extinguished status takes place based on the re-detected fire parameter.

Another advantageous embodiment of the method is characterized by additional steps, namely the step of re-detecting a fire parameter by means of the vehicle sensor unit after the predefined extinguishing period, and the step of once again discharging extinguishing medium if the re-detected fire parameter represents a fire, a preliminary fire stage and/or a smoldering fire.

This provides the advantage that the initial discharge of the extinguishing medium does not have to take place with large safety margins regarding the quantity of extinguishing medium, but optimized quantities of extinguishing medium can rather be discharged. The extinguishing result can therefore be controlled by the vehicle sensor unit and the overall quantity of extinguishing medium can be reduced in comparison with stationary extinguishing facilities, which carry out extinguishing processes with significant safety margins regarding the quantity of extinguishing medium. In addition, it is therefore possible to extinguish the fire again if the first fire extinguishing action did not completely extinguish the fire or the fire flared up again after it was extinguished.

BRIEF DESCRIPTION OF THE DRAWINGS

Other characteristics, advantages and potential applications of the present invention can be gathered from the following description of exemplary embodiments and the figures. In this case, all described and/or graphically illustrated characteristics form the object of the invention individually and in any combination. Identical or similar objects are furthermore identified by the same reference symbols in the figures.

MODE(S) FOR CARRYING OUT THE INVENTION

Figure 1:
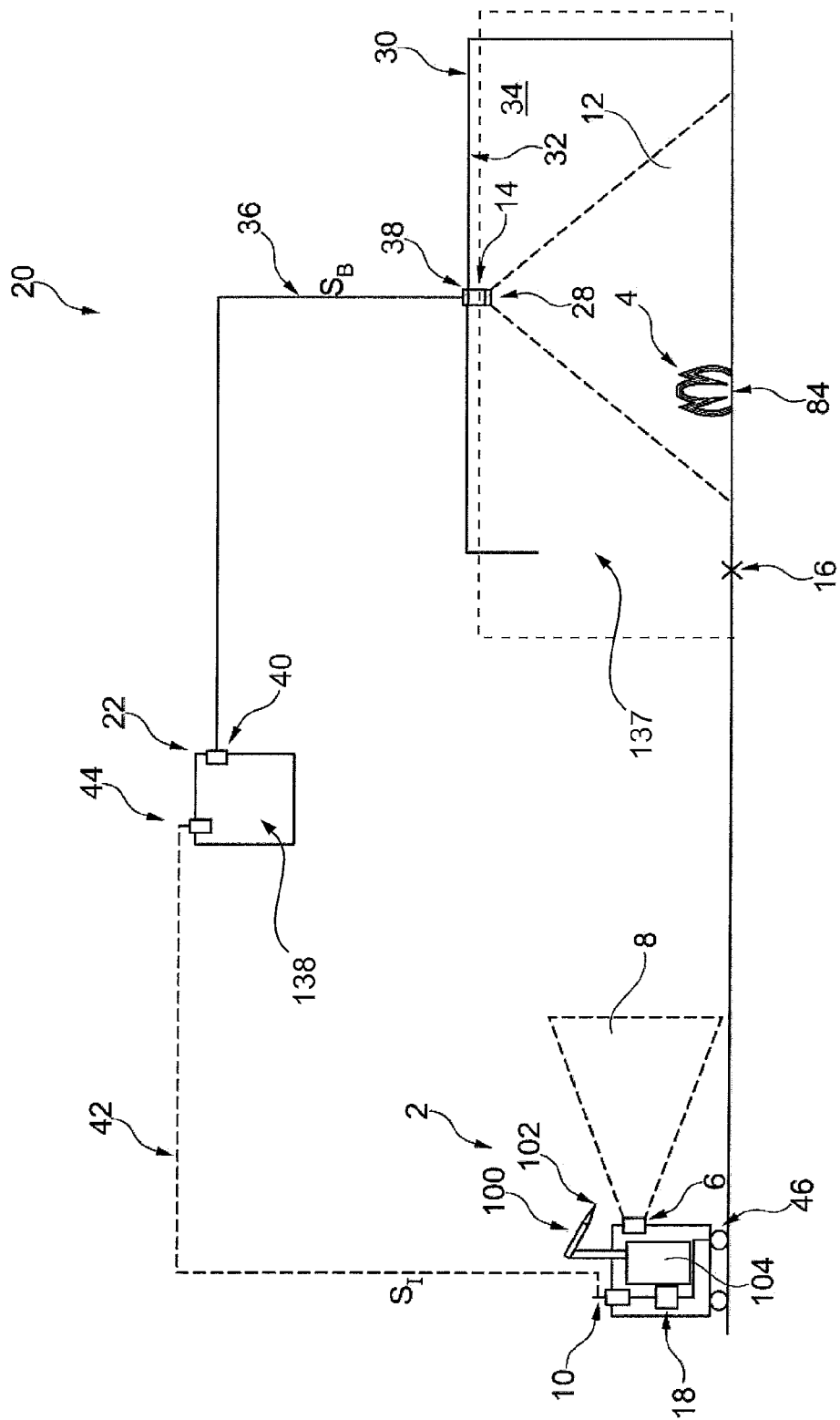
FIG. 1 shows a first embodiment of the vehicle and the system in the form of a schematic representation.

FIG. 1 schematically shows an unmanned vehicle 2. The unmanned vehicle 2 is also simply referred to as vehicle 2. The unmanned vehicle 2 serves for extinguishing fires. FIG. 1 furthermore shows a system 20 that likewise serves for extinguishing fires. The system 20 comprises a stationary fire detector 14, a central unit 22, which is realized in the form of a central fire alarm system 138 in this case, and the unmanned vehicle 2.

In order to avoid repetitions, the unmanned vehicle 2 is described below in connection with the system 20. Although correlations between the unmanned vehicle and other parts of the system 20 are described, it should be noted that corresponding embodiments, advantageous characteristics, effects and/or advantages of the unmanned vehicle 2 also apply analogously and separately to the unmanned vehicle 2. Consequently, it should at this point already be noted that the advantageous embodiments, preferred characteristics, effects and/or advantages described below apply analogously to the unmanned vehicle 2, namely even if this vehicle does not form part of the system 20.

FIG. 1 schematically shows a stationary fire detector 14 that may be installed, for example, in a building 30. The stationary fire detector 14 is also simply referred as fire detector 14. For example, the fire detector 14 may be arranged on a ceiling 32 of a room 34 of the building 30.

The fire detector 14 may be realized, for example, in the form of a fire gas detector, a smoke detector or a flame detector. Other embodiments of the fire detector 14 are known from the prior art and also form potential embodiments of the fire detector 14. Since the fire detector 14 is permanently installed on the ceiling 32 of the building 30, the fire detector 14 is immovable and therefore realized in the form of a stationary fire detector 14.

The fire detector 14 monitors part of the room 34, namely the fire detector monitoring region 12. The fire detector monitoring region 12 may therefore be assigned to the fire detector 14. The fire detector 14 serves for detecting a fire, a preliminary fire stage and/or a smoldering fire. This is achieved in that the fire detector 14 comprises a sensor unit that is referred to as fire detector sensor unit 28. The fire detector sensor unit 28 is designed for detecting a reference fire parameter KR of the fire detector monitoring region 12. If the fire detector 14 is realized in the form of a fire gas detector, for example, the corresponding fire detector sensor unit 28 may be designed for detecting a smoke concentration and/or for detecting a concentration of at least one predefined gas. The predefined gas may be a gas that is produced during a combustion, particularly CO2 and/or CO. In this case, the smoke concentration or the concentration of the predefined gas forms the reference parameter KR that can be detected by the fire detector sensor unit 28. The term detection may basically refer to a direct or indirect detection.

In addition, the fire detector 14 is designed for determining a reference fire status ZR by evaluating the reference fire parameter KR. To this end, the fire detector 14 may comprise an evaluation unit. The evaluation unit is preferably designed for evaluating the reference fire parameter KR. In addition, the evaluation unit is preferably designed for determining the reference fire status ZR based on the result of the evaluation. For example, a reference fire status ZR represents a fire, a preliminary fire stage and/or a smoldering fire. A fire, a preliminary fire stage and/or a smoldering fire frequently produces characteristic gases such as CO, which can be measured, for example, by the fire detector sensor unit 28.

Figure 2:
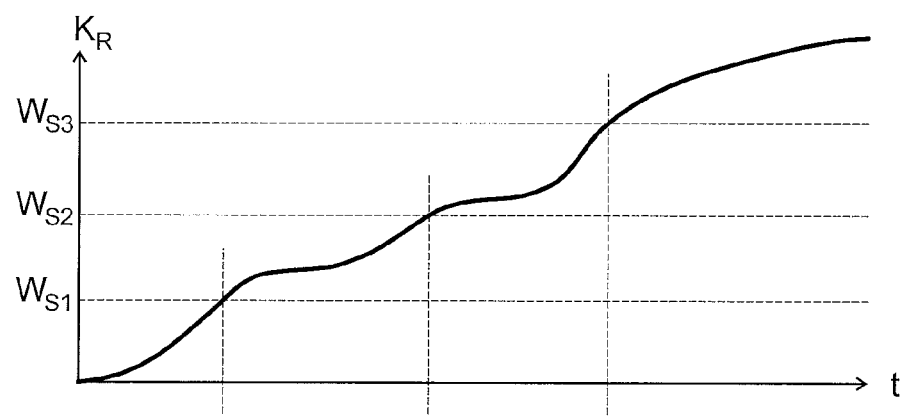
FIG. 2 shows a time sequence of the reference fire parameter in the form of a schematic representation.
Figure 3:
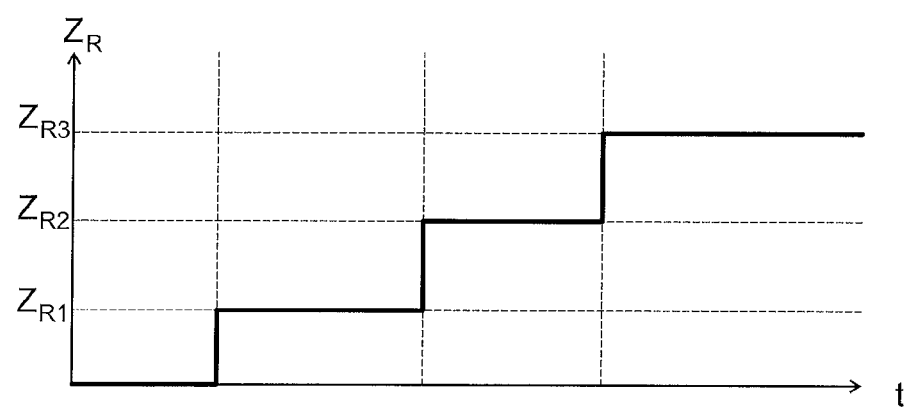
FIG. 3 shows a time sequence of the reference fire status in the form of a schematic representation.

FIG. 2 schematically shows an exemplary value pattern of the reference fire parameter KR as a function of the time t. At least one threshold value WS1, preferably a plurality of threshold values WS1, WS2, WS3, may be stored in the fire detector 14, preferably in the corresponding evaluation unit. These threshold values WS1, WS2, WS3 may be threshold values for the reference fire parameter KR, preferably for a gas concentration measured by the fire detector sensor unit 28. If a reference fire parameter KR detected by means of the fire detector sensor unit 28, particularly a corresponding smoke concentration, exceeds a first threshold value WS1, this may be characteristic, for example, for a smoldering fire. FIG. 3 shows an exemplary status development of the reference fire status ZR as a function of the time t and corresponds to the value pattern of the reference fire parameter KR, which is schematically illustrated in FIG. 2. If the detected reference fire parameter KR reaches and/or exceeds the threshold value WS1, a reference fire status ZR1 corresponding, for example, to a smoldering fire can be determined based thereon. If a higher reference fire parameter KR, particularly a higher smoke concentration, is detected, for example, the reference fire parameter KR or the smoke concentration may respectively reach and/or exceed another threshold value WS2, which is characteristic for a preliminary fire stage, such that a corresponding reference fire status ZR2 can be determined. If the detected reference fire parameter KR reaches and/or exceeds the next threshold value WS3, a reference fire status ZR3 corresponding, for example, to a fire 4 can be determined based thereon. Consequently, the evaluation unit of the fire detector 14 is preferably designed for determining a reference fire status ZR based on the detected reference fire parameter KR and based on at least one threshold value WS1, WS2, WS3.

The system 20 also comprises a central unit 22. The central unit 22 preferably forms part of a (not-shown) fire alarm system, which may also be referred to as fire alarm facility. The central unit 22 may alternatively or additionally be realized in the form of a central fire alarm system or at least form part of a central fire alarm system. Furthermore, the central unit 22 may be or form at least part of a (not-shown) control center unit. As a mere example, it is in the following description assumed that the central unit 22 is a central fire alarm system without thereby limiting the general inventive concept to this example. For the sake of completeness, it should also be noted that the central unit 22 in the form of a central fire alarm system may be at least partially realized together with a central extinguishing control system 64. For example, a central fire alarm system and a central extinguishing control system 64 may be at least partially realized in the form of a common unit.

The stationary fire detector 14 is connected to the central unit 22 by means of a signal line 36. Consequently, a signal link is produced between the stationary fire detector 14 and the central unit 22. The stationary fire detector 14 comprises a signal transmitting unit in order to transmit a signal from the stationary fire detector 14 to the central unit 22. The signal transmitting unit 38 of the fire detector 14 is connected to the signal line 36. The central unit 22 comprises a signal receiving unit 40. The signal receiving unit 40 of the central unit 22 is likewise connected to the signal line 36. The signal line 36 may therefore extend from the signal transmitting unit 38 of the fire detector 14 to the signal receiving unit 40 of the central unit 22. In this way, a fire detector signal SB can be transmitted from the fire detector 14 to the central unit 22. The fire detector 14 is therefore designed for transmitting the fire detector signal SB, which represents the reference fire status ZR, to the central unit 22. The reference fire status ZR or information thereon can be respectively made available to the central unit 22 by transmitting the fire detector signal SB from the fire detector 14 to the central unit 22.

If a reference fire status ZR corresponding to a fire was determined by means of the fire detector 14 and a fire detector signal SB, which represents the corresponding reference fire status ZR, was transmitted to the central unit 22 by means of the fire detector 14, it was in the prior art frequently not completely clear whether a fire 4 or, if applicable, a preliminary fire stage and/or a smoldering fire actually exists in the fire detector monitoring region 12. In fact, deceptive variables and/or unforeseen circumstances may cause the fire detector 14 to determine a reference fire status ZR that corresponds to a fire 4 although no actual fire 4 exists in the fire detector monitoring region 12. The more frequently such deceptive variables and/or unforeseen circumstances occur and lead to the aforementioned result, the greater the risk of a reference fire status ZR, which corresponds to an actual fire 4, not being perceived and/or interpreted with the required seriousness by emergency personnel for extinguishing a fire 4. However, this entails serious endangerment because property damages and/or personal injuries, which increase exponentially over time, can only be effectively prevented in the fire detector monitoring region 12 of the room 34 by means of an immediate and prompt fire extinguishing action. It is therefore very important to confirm and/or verify the reference fire status ZR as promptly and as early as possible. When a fire detector signal SB representing the reference fire status ZR is transmitted from the fire detector 14 to the central unit 22, a person is frequently dispatched to the fire detector 14 or the fire detector monitoring region 12 in practical applications in order to confirm whether a fire 4 or preliminary fire stage and/or smoldering fire corresponding to the reference fire status ZR actually exists. The fire can develop further in the time between the transmission of the fire detector signal SB from the fire detector 14 to the central unit 22 and the arrival of the person in the room 34 or at the fire detector monitoring region 12, respectively. For example, a smoldering fire may already have developed into an actual fire 4 with light phenomenon. The risk of property damages and/or personal injuries therefore increases accordingly. Once the person has arrived in order to inspect the fire detector monitoring region 12 for a potential fire or a preliminary fire stage and/or a smoldering fire, the person can provide corresponding feedback such that the reference fire status ZR can be confirmed or not confirmed. In light of the aforementioned circumstances, the invention proposes a system 20 that can prevent or at least reduce a potential risk of property damages and/or personal injuries to the greatest extent possible.

The inventive unmanned vehicle 2 and/or the inventive system 20 should therefore make it possible to automatically verify the reference fire status ZR in order to thereby determine, if applicable, a verified reference fire status ZVR. In addition, the vehicle 2 should be capable of initiating a fire extinguishing action if the reference fire status ZR was determined in the form of a verified reference fire status ZVR.

The central unit is therefore configured and/or designed for transmitting an instruction signal SI to the vehicle 2. However, the instruction signal SI is only transmitted if the fire detector signal SB transmitted by the fire detector 14 represents a reference fire status ZR that requires verification. In principle, all reference fire statuses ZR may require verification. In this case, the instruction signal SI is transmitted to the vehicle 2 once the central unit 22 receives the fire detector signal SB from different detector 14. However, it can occur that not all reference fire statuses ZR require verification. A corresponding reference fire status ZR may not require verification if the reference fire status ZR corresponds, for example, to a preliminary fire stage.

The central unit 22 and the vehicle 2 are connected to one another by means of a signal link 42. The signal link 42 is preferably realized in the form of a wireless signal link. In this case, the central unit 22 comprises a signal transmitting unit 44, which is preferably realized in the form of a wireless signal transmitting unit. In this way, the instruction signal SI can be transmitted to the vehicle 2 by means of the signal transmitting unit 44. The vehicle 2 comprises a vehicle communication unit 10, which is preferably realized in the form of a wireless signal receiving unit, in order to receive the instruction signal SI. In this case, it is not necessary to directly transmit the instruction signal SI from the signal transmitting unit 44 of the central unit 22 to the vehicle communication unit 10 of the vehicle 2. For example, at least one (not-shown) transmitter may be provided, wherein said transmitter is designed for signal transduction and serves for transmitting the instruction signal SI from the central unit 22 or the corresponding signal transmitting unit 44 onward to the signal receiving unit 10 of the vehicle 2.

The vehicle 2 comprises a sensor unit that is referred to as vehicle sensor unit 6. The vehicle sensor unit 6 is designed for detecting a fire parameter KF of a vehicle monitoring region 8. With respect to the fire parameter KF, we refer analogously to the preceding explanations of the reference fire parameter KR. However, the vehicle sensor unit 6 serves for detecting the fire parameter KF of the vehicle monitoring region 8. The vehicle monitoring region 8 may therefore be assigned to the vehicle sensor unit 6. In other words, the vehicle monitoring region 8 may be assigned to the vehicle sensor unit 6 in a fixed manner. When the vehicle 2 and/or the vehicle sensor unit 6 are in motion, a corresponding motion of the vehicle monitoring unit 8 therefore also takes place. In this way, the vehicle sensor unit 6 can detect whether a fire 4, a preliminary fire stage and/or a smoldering fire exists in the vehicle monitoring region 8.

Figure 4:
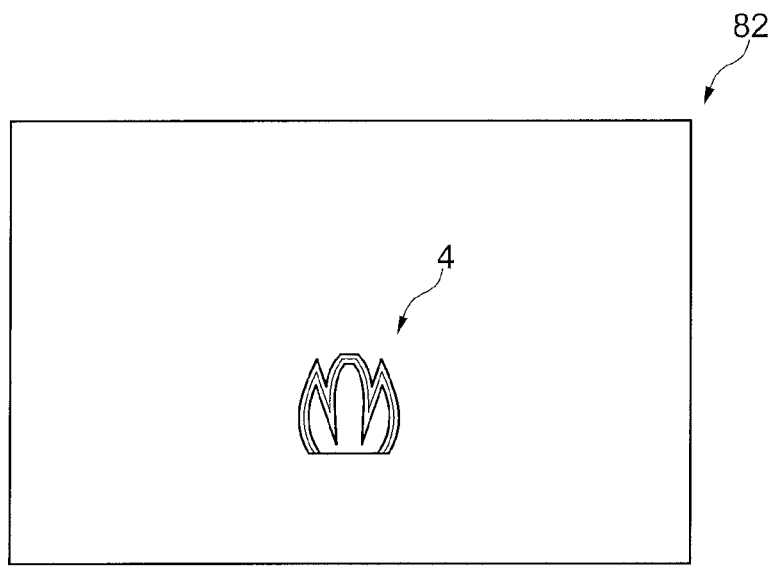
FIG. 4 shows a schematic representation of an image.

It proved advantageous if the vehicle sensor unit 6 comprises and/or is realized in the form of a camera, particularly a thermal imaging camera. In this case, the camera may be designed for capturing an image 82 of the vehicle monitoring region 8, an example of which is schematically illustrated in FIG. 4. If the camera is realized in the form of a thermal imaging camera, the thermal imaging camera may be designed for capturing a thermal image of the vehicle monitoring region 8. In addition, the vehicle sensor unit 6 may be designed for respectively evaluating the corresponding image or thermal image and for detecting the fire parameter KF of the vehicle monitoring region 8 based on the evaluation.

If the vehicle sensor unit 6 is realized, for example, in the form of a thermal imaging camera, the vehicle sensor unit 6 may be designed for detecting a temperature, particularly for detecting a mean temperature and/or a maximum temperature. In this case, the temperature, particularly the mean and/or maximum temperature, forms the fire parameter KF that can be detected by the vehicle sensor unit 6. Additionally or alternatively to the camera, the vehicle sensor unit 6 may, in principle, also comprise a smoke detector, a temperature detector, a flame detector and/or a fire gas detector.

Figure 6:
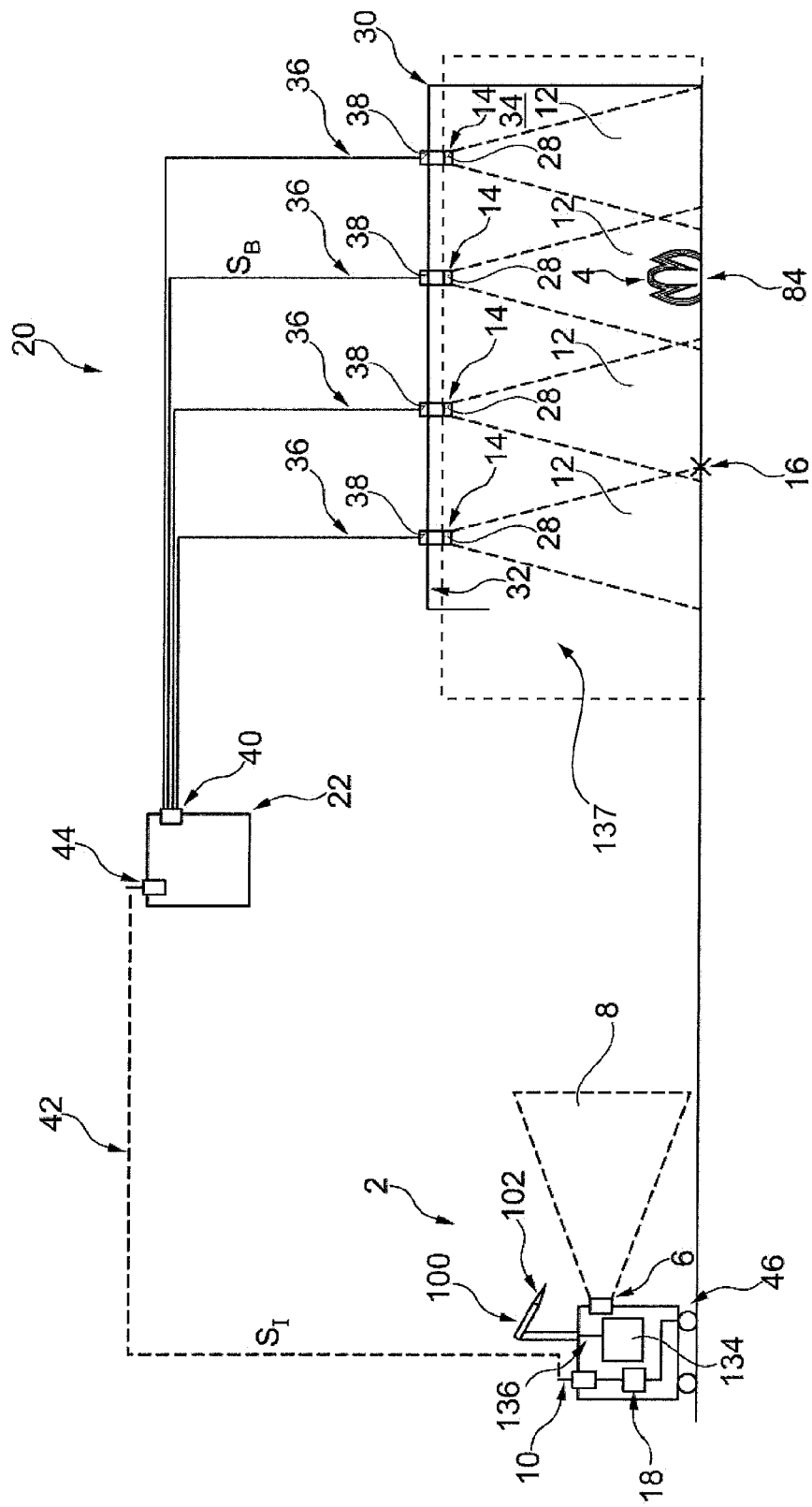
FIG. 6 shows a third embodiment of the vehicle and the system in the form of a schematic representation.

The vehicle 2 should initially verify whether a fire 4 or a preliminary fire stage and/or a smoldering fire actually exists in the fire detector monitoring region 12. The instruction signal SI transmitted from the central unit 22 to the vehicle 2 therefore represents at least one target location 16 or a target region 137 for the vehicle 2. Examples of a target location 16 and a target region 137 are illustrated in FIG. 1 and FIG. 6. Consequently, the target location 16 or the target region 137 can be transmitted to the vehicle 2 by means of the instruction signal SI. In this case, the vehicle 2 may be configured and/or designed for respectively navigating to the corresponding target location 16 or to the target region 137 based on the instruction signal SI or the target location 16 or target region 137 represented by the instruction signal SI. In this context, navigating preferably refers to driving, flying and/or moving. It proved advantageous to design the vehicle 20 for autonomously navigating to the target location 16 or the target region 137 based on the instruction signal SI. To this end, the vehicle 2 comprises a navigation control unit 18 that is designed for evaluating the instruction signal SI, as well as for controlling the vehicle 2 based on the instruction signal SI, in order to thereby navigate the vehicle 2 to the target location 16 or to the target region 137 in a controlled manner.

Figure 5:
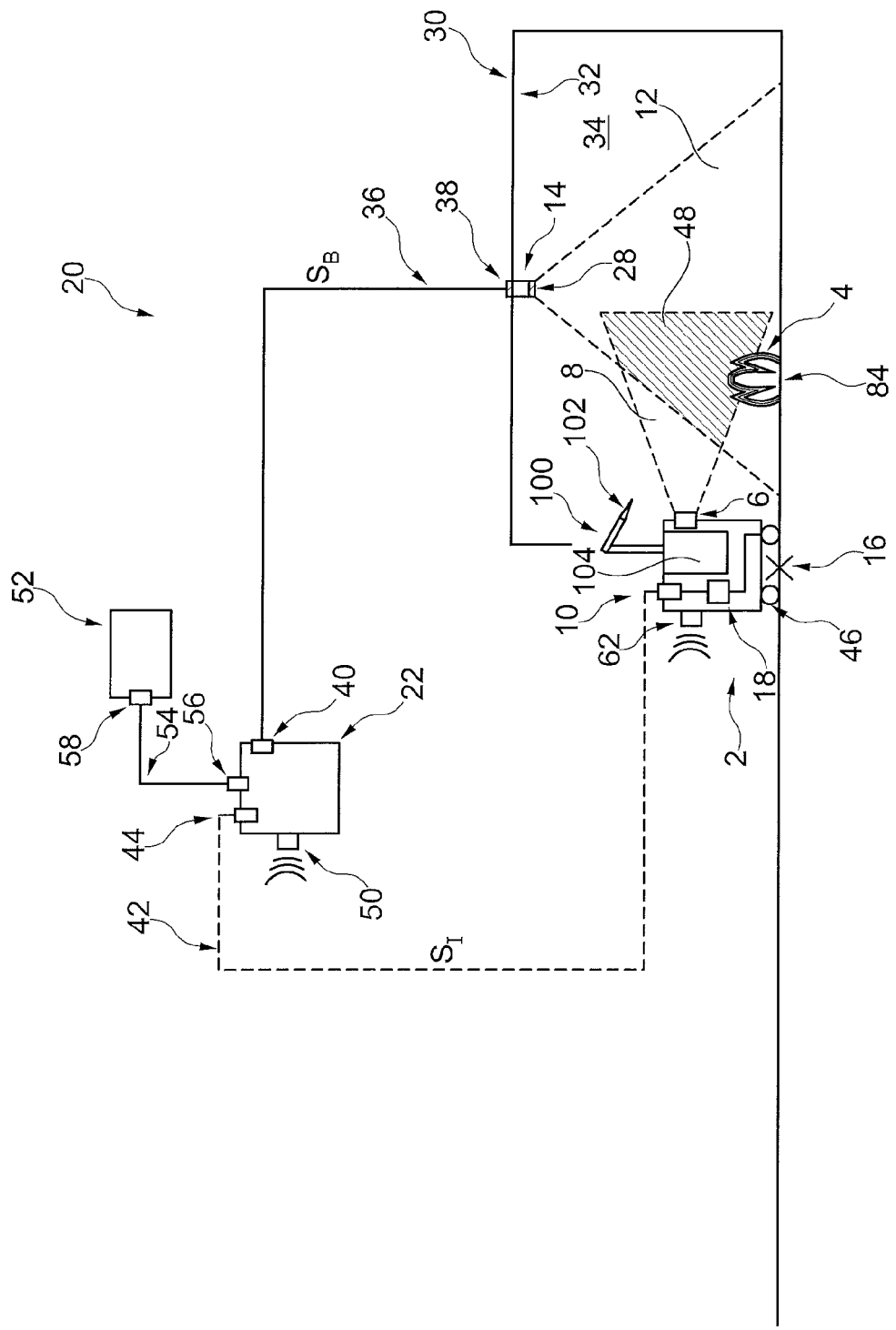
FIG. 5 shows a second embodiment of the vehicle and the system in the form of a schematic representation.

In the schematic representation of the system 20 and the vehicle 2 in FIG. 5, the vehicle 2 has driven to the target location 16. According to a synopsis of FIGS. 1 and 2, the vehicle 2 is preferably realized in the form of a land craft. For example, the land craft may comprise tires 46. However, the land craft may also be equipped with different propulsion means such as a chain drive. For example, the land craft may be realized in the form of a robotic vehicle.

In an advantageous embodiment, a target location 16 for the fire detector 14 and/or for the fire detector monitoring region 12 is stored in the central unit 22. When the central unit 22 receives the fire detector signal SB from the fire detector 14, the central unit 22 can transmit an instruction signal SI, which represents the target location 16 corresponding to the fire detector 14, to the vehicle 2. If the system 20 comprises multiple fire detectors 14 as schematically indicated in FIG. 6, a corresponding target location 16 for each of the fire detectors 14 and/or for each of the corresponding fire detector monitoring regions 12 may be stored in the central unit 22. If a fire detector signal SB is transmitted to the central unit 22 by one of the multiple fire detectors 14, the instruction signal SI transmitted from the central unit 22 to the vehicle 2 may represent the target location 16, which corresponds to the respective fire detector 14 or fire detector monitoring region 12.

The target location 16 is characterized in that the vehicle monitoring region 8 at least sufficiently overlaps with the fire detector monitoring region 12 when the vehicle 2 is at the target location 16. In other words, the target location 16 is chosen such that an overlap, preferably the sufficient overlap, between the vehicle monitoring region 8 and the fire detector monitoring region 12 is achieved when the vehicle 2 is at the target location 16. It is preferred that the vehicle monitoring region 8 and the fire detector monitoring region 12 sufficiently overlap when at least 20%, at least 30%, at least 40%, at least 50%, at least 60%, at least 70%, at least 80% or at least 90% of the fire detector monitoring region 12 overlap with the vehicle monitoring region 8. In this case, the overlap preferably refers to the intersection 48 between the vehicle monitoring region 8 and the fire detector monitoring region 12 (for example, see FIG. 5). In this way, the desired sufficient overlap of the vehicle monitoring region 8 with the fire detector monitoring region 12 is achieved when the vehicle 2 is at the target location 16.

Figure 21:
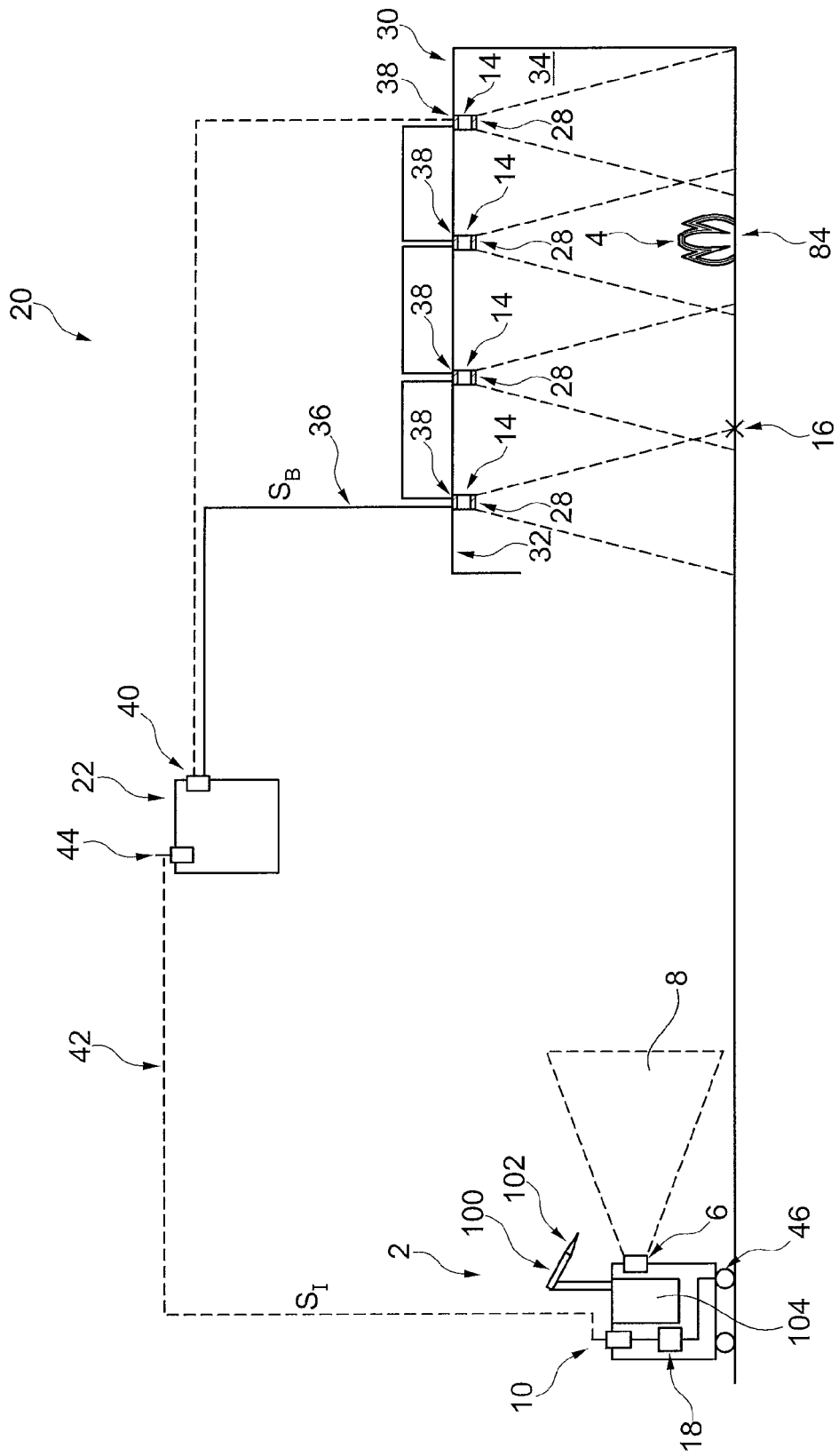
FIG. 21 shows the third embodiment of the vehicle and the system with modified signal link in the form of a schematic representation.

According to FIG. 6, a separate signal line 36 may be provided for each fire detector 14. Each signal line 36 extends from a corresponding fire detector 14 to the central unit 22. An alternative signal link between the fire detectors 14 and the central unit 22 is illustrated in FIG. 21. In this case, the central unit 22 and the fire detectors 14 are preferably connected in series by means of a single signal line 36, preferably a cable-bound signal line. The signal line 36 may be realized ring line as indicated with the section of the signal line 36 drawn with broken lines. Alternatively— and in this case without the section drawn with broken lines—the signal line 36 may extend from the central unit 22 to the fire detectors 14 in the form of a branch line. If a cable-bound signal link 36 is used for transmitting the fire detector signal SB, the fire detector signal SB may be represented and/or modeled by a current signal and/or a voltage signal. For example, the current intensity and/or the voltage potential may be adapted by the fire detector 14 in order to transmit the fire detector signal SB. If the cable-bound signal link 36 extends from the central unit 22 to the plurality of fire detectors 14 and the fire detectors 14 are connected in series by means of the cable-bound signaling 36, it is frequently impossible to positively identify the fire detector 14, from which the fire detector signal SB or the corresponding change of the current or the voltage originates. In an advantageous alternative, the cable-bound signal link 36 is therefore realized in the form of a bus line. In this case, the central unit 22 and each of the fire detectors 14 respectively form a bus subscriber. Each bus subscriber may have its own bus address, which is also referred to as identification. All in all, a bus system for transmitting information may therefore be formed by the bus subscribers and the bus line. The bus system is preferably realized in the form of a ring bus system. For example, the transmitted information is the fire detector signal or represents the fire detector signal. In this way, a fire detector 14 can transmit the fire detector signal SB to the central unit 22 by means of the bus line 36 or the bus system, respectively. The address of the respective fire detector 14 may also be transmitted in this case. The transmission may be realized, for example, in bit-serial form or in a half-duplex process. In this case, the fire detector 14 respectively modulates the fire detector signal SB or the corresponding data information on a bus supply voltage made available by the central unit 22. The central unit 22 demodulates the corresponding signals such that the fire detector signal SB is available to the central unit 22. In addition, the central unit 22 receives information on which of the fire detectors 14 has transmitted the fire detector signal SB to the central unit 22.

According to the advantageous exemplary embodiment of the vehicle 2 illustrated in FIG. 6, the fire extinguishing unit 100 comprises an extinguishing medium production device 134 for producing extinguishing medium. For example, the extinguishing medium production device 134 may comprise a solid and be designed for igniting the solid such that a gas and/or a solid aerosol is produced due to a corresponding combustion of the solid, wherein the gas and/or the aerosol being produced serves as extinguishing medium. The extinguishing medium production device 134 may be connected to the nozzle 102 of the fire extinguishing unit 100 by means of a fluidic line connection 136.

As explained above, the vehicle sensor unit 6 of the vehicle 2 is designed for detecting a fire parameter KF of the vehicle monitoring region 8. Since the vehicle monitoring region 8 now sufficiently overlaps with the fire detector monitoring region 12 because the vehicle 2 is at the target location 16, a fire parameter KF of the fire detector monitoring region 12 can be respectively detected by means of the vehicle 2 or by means of the vehicle sensor unit 6 of the vehicle 2, wherein this detected fire parameter KF forms the verification fire parameter KV. In other words, the vehicle 2 is configured for detecting the fire parameter KF at the target location 16 in the form of a verification fire parameter KV of the fire detector monitoring region 12 by means of the vehicle sensor unit 6.

After the verification fire parameter KV of the fire detector monitoring region 12 has been detected, two independently detected fire parameters, namely the reference fire parameter KR and the verification fire parameter KV, are available for the fire detector monitoring region. As explained above, however, it is preferred that the fire detector 14 is realized in the form of a fire gas detector whereas the vehicle sensor unit 6 of the vehicle 2 preferably comprises or is formed by a camera. Consequently, it is difficult to compare these independently detected fire parameters KR, KF. It is therefore proposed that the vehicle 2 is designed for determining another fire status, which is referred to as verification fire status ZV, namely by evaluating the verification fire parameter KV.

To this end, the vehicle 2 may comprise an evaluation unit. The evaluation unit is preferably designed for evaluating the verification fire parameter KV. In addition, the evaluation unit is preferably designed for determining the verification fire status ZF based on the results of the evaluation. A verification fire status ZF represents, for example, a fire 4, a preliminary fire stage and/or a smoldering fire. A fire 4, a preliminary fire stage and/or a smoldering fire frequently generates characteristic temperatures that can be detected, for example, by the vehicle sensor unit 6. In this context, it should be noted that the detection may also include an indirect detection. If an infrared spectrum is detected by means of the thermal imaging camera, for example, it is possible to determine a temperature, particularly a maximum and/or average temperature, based thereon.

Figure 7:
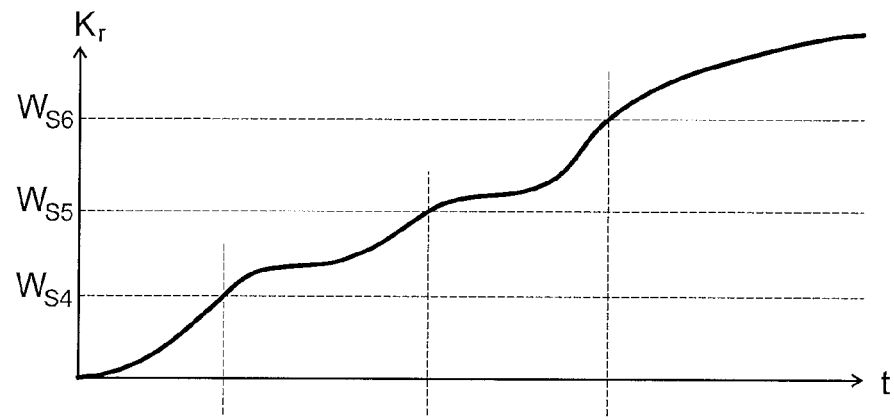
FIG. 7 shows a time sequence of the verification fire parameter in the form of a schematic representation.
Figure 8:
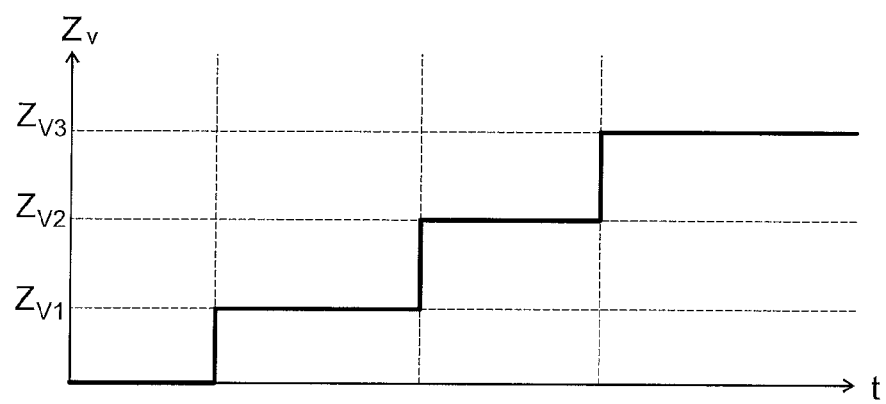
FIG. 8 shows a time sequence of the verification fire status in the form of a schematic representation.

FIG. 7 schematically shows an exemplary value pattern of the verification fire parameter KV as a function of the time t. At least one threshold value WS4, preferably a plurality of threshold values WS4, WS5, WS6, may be stored in the vehicle 2, particularly the corresponding evaluation unit. These threshold values WS4, WS5, WS6 may be threshold values for the verification fire parameter KV, preferably for a temperature detected by the vehicle sensor unit 6. If the verification fire parameter KV detected by means of the vehicle sensor unit 6 exceeds the first threshold value WS4, this may be characteristic, for example, for a smoldering fire. FIG. 8 schematically shows an exemplary status development of the verification fire status ZV as a function of the time t, which corresponds to the value pattern of the verification fire parameter KV in FIG. 7. If the detected verification fire parameter KV reaches and/or exceeds the threshold value WS4, a reference fire status ZR4, which corresponds, for example, to a smoldering fire, can be determined based thereon. If a higher verification fire parameter KV, i.e. a higher temperature, is detected, for example, the verification fire parameter KV can reach and/or exceed the next threshold value WS5, which is characteristic for a preliminary fire stage, and a corresponding reference fire status ZV5 can be determined. If the detected verification fire parameter KV reaches and/or exceeds the next threshold value WS6, a verification fire status ZV6, which corresponds, for example, to a fire 4, can be determined based thereon. Consequently, the evaluation unit of the vehicle 2 is preferably designed for determining the verification fire status ZV based on the detected verification fire parameter KV and based on the at least one threshold value WS4, WS5, WS6.

The thusly determinable verification fire status ZV therefore preferably corresponds to a fire 4, a preliminary fire stage and/or a smoldering fire, namely in dependence on the verification fire parameter KV. The verification fire status ZV can therefore be compared with the reference fire status ZR, which likewise corresponds to a fire 4, a preliminary fire stage and/or a smoldering fire. Consequently, it is possible to verify the reference fire status ZR and, if applicable, to determine this reference fire status in the form of a confirmed or verified reference fire status ZVR.

As explained above, the instruction signal SI represents at least the target location 16. Since the information on the reference fire status ZR is also available to the central unit 22 due to the transmission of the fire detector signal SB, it is proposed that the central unit 22 also makes available the information on the reference fire status ZR to the vehicle 2. The instruction signal SI is therefore realized in such a way that the instruction signal SI represents the reference fire status ZR and the target location 16. In this way, the target location 16 and the reference fire status ZR are made available to the vehicle 2 by transmitting the instruction signal SI from the central unit 22 to the vehicle 2. In addition, the vehicle 2 is configured for determining the reference fire status ZR in the form of a verified reference fire status ZVR if the reference fire status ZR and the verification fire status ZV at least sufficiently match. A sufficient match preferably exists if the verification fire status ZV corresponds to a fire 4 and the reference fire status ZR corresponds to a fire 4, a preliminary fire stage or a smoldering fire. A sufficient match may furthermore exist if the verification fire status ZV and the reference fire status ZR respectively correspond to a preliminary fire stage or to a smoldering fire.

The aforementioned determination of the verified reference fire status ZVR therefore only takes place if the verification fire status ZV and the reference fire status ZR match or if the verification fire status ZV corresponds to a fire that has developed further. The verified reference fire status ZVR can therefore also be referred to and/or interpreted as a confirmed and/or reliable reference fire status. Consequently, the verified reference fire status ZVR serves as a reliable basis for initiating and/or carrying out follow-up actions.

The vehicle 2 is therefore designed for initiating a fire extinguishing action if the reference fire status ZR was determined in the form of a verified reference fire status ZVR. For example, the vehicle 2 may be designed for transmitting a signal, which represents a request for a fire extinguishing action, in order to initiate the fire extinguishing action. However, it is preferred that the vehicle 2 comprises a fire extinguishing unit 100 that serves and/or is designed for at least indirectly extinguishing a fire 4. Since the vehicle is provided with the fire extinguishing unit 100, the vehicle 2 may therefore be designed for carrying out the fire extinguishing action with the aid of the fire extinguishing unit 100. The fire extinguishing unit 100 may be designed for directly and/or indirectly extinguishing a fire 4.

FIG. 5 schematically shows an example of a fire extinguishing unit 100 that is designed for directly extinguishing a fire 4. In this case, the fire extinguishing unit 100 comprises a nozzle 102. The nozzle 102 is designed for discharging, particularly spraying and/or ejecting, an extinguishing medium. The extinguishing medium discharged by the nozzle 102 then serves for extinguishing a fire 4. In this case, the fire extinguishing unit 100 may be designed for conveying and/or transporting extinguishing medium to the nozzle 102 under pressure such that the extinguishing medium can be discharged, particularly sprayed and/or ejected, by means of the nozzle 102. If the extinguishing medium consists of water or an aqueous solution, for example, the corresponding extinguishing medium can be sprayed by means of the nozzle 102. However, if the extinguishing medium consists, for example, of an extinguishing medium powder, this extinguishing medium powder can be ejected by means of the nozzle 102.

In order to make available the extinguishing medium, the fire extinguishing unit may comprise, in particular, a detachable extinguishing medium container 104, in which the extinguishing medium is stored. In this case, the extinguishing medium may be stored in the extinguishing medium container 104 under pressure. This provides the advantage that the extinguishing medium can flow out of the extinguishing medium container 104 without additional effort. Consequently, no additional electrical and/or mechanical power is required for transporting the extinguishing medium from the extinguishing medium container 104 to the nozzle 102. In fact, the pressurized extinguishing medium can be discharged and preferably flow out of the nozzle 102. The predefined pressure preferably refers to a pressure that is higher than the atmospheric pressure. For example, the predefined pressure may be at least 5 bar or at least 10 bar higher than the atmospheric pressure. Once the vehicle 2 receives the instruction signal SI, the vehicle 2 can navigate to the target location 16 or to the target region 137 without delay. After the arrival at the target location 16 or the target region 137 and, if applicable, a subsequent determination of the verified reference fire status ZVR, the vehicle 2 therefore does not have to navigate to a different location in order to pick up extinguishing medium and/or to initiate the actual extinguishing of the fire 4. In fact, the vehicle 2 can immediately begin with the actual fire extinguishing action at the target location 16 or in the immediate vicinity thereof. This makes it possible to extinguish the fire 4 without unnecessary delay such that a fire is prevented from developing further. In practical applications, for example, a smoldering fire without light phenomenon can thereby be prevented from developing into a fire 4 with light phenomenon. In this case, the vehicle 2 may serve for already extinguishing a smoldering fire, which can frequently be achieved with a reduced consumption of extinguishing medium. This results in reduced personal injuries and/or property damages.

Figure 9:
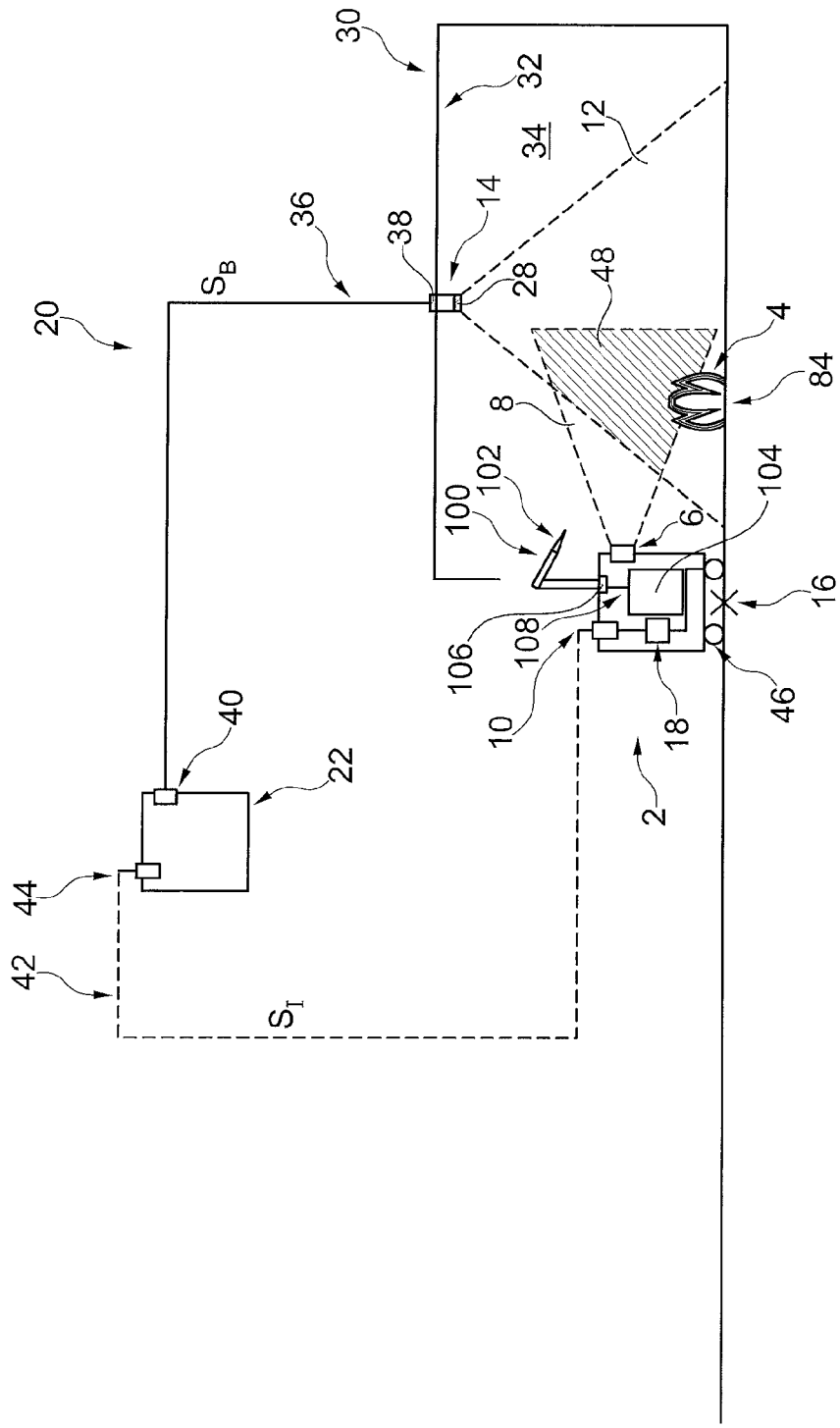
FIG. 9 shows a fourth embodiment of the vehicle and the system in the form of a schematic representation.

FIG. 9 schematically shows another embodiment of the vehicle 2 and the system 20. In this case, the vehicle 2 comprises a controllable triggering unit 106. The controllable triggering unit 106 is also simply referred to as triggering unit. The triggering unit 106 may form part of the fire extinguishing unit 100. The triggering unit 106 is preferably realized in the form of a controllable valve. Consequently, the triggering unit 106 may be designed for controlling an extinguishing medium flow to the nozzle 102. In this case, the triggering unit 106 is preferably coupled into a fluidic line connection 108 between the extinguishing medium container 104 and the nozzle 102 such that an extinguishing medium flow from the extinguishing medium container 104 to the nozzle 102 can be controlled by means of the triggering unit 106. The triggering unit 106 may be designed for releasing, blocking and/or restricting the extinguishing medium flow to the nozzle 102. The point in time, the time period and/or the quantity of the extinguishing medium to be discharged can therefore be controlled by means of the controllable triggering unit 106. If the verified reference fire status ZVR was determined by the vehicle 2, the vehicle 2 may be designed and/or configured for controlling the triggering unit 106 based on the verified reference fire status ZVR. In this case, the triggering unit 106 may be controlled in such a way that it releases an extinguishing medium flow from the extinguishing medium container 104 to the nozzle 102 when the reference fire status ZVR represents a fire 4. In this way, a fire can be extinguished immediately after the verified reference fire status ZVR has been determined. This provides the advantage that personal injuries and/or property damages can be reduced to a minimum.

Figure 10:
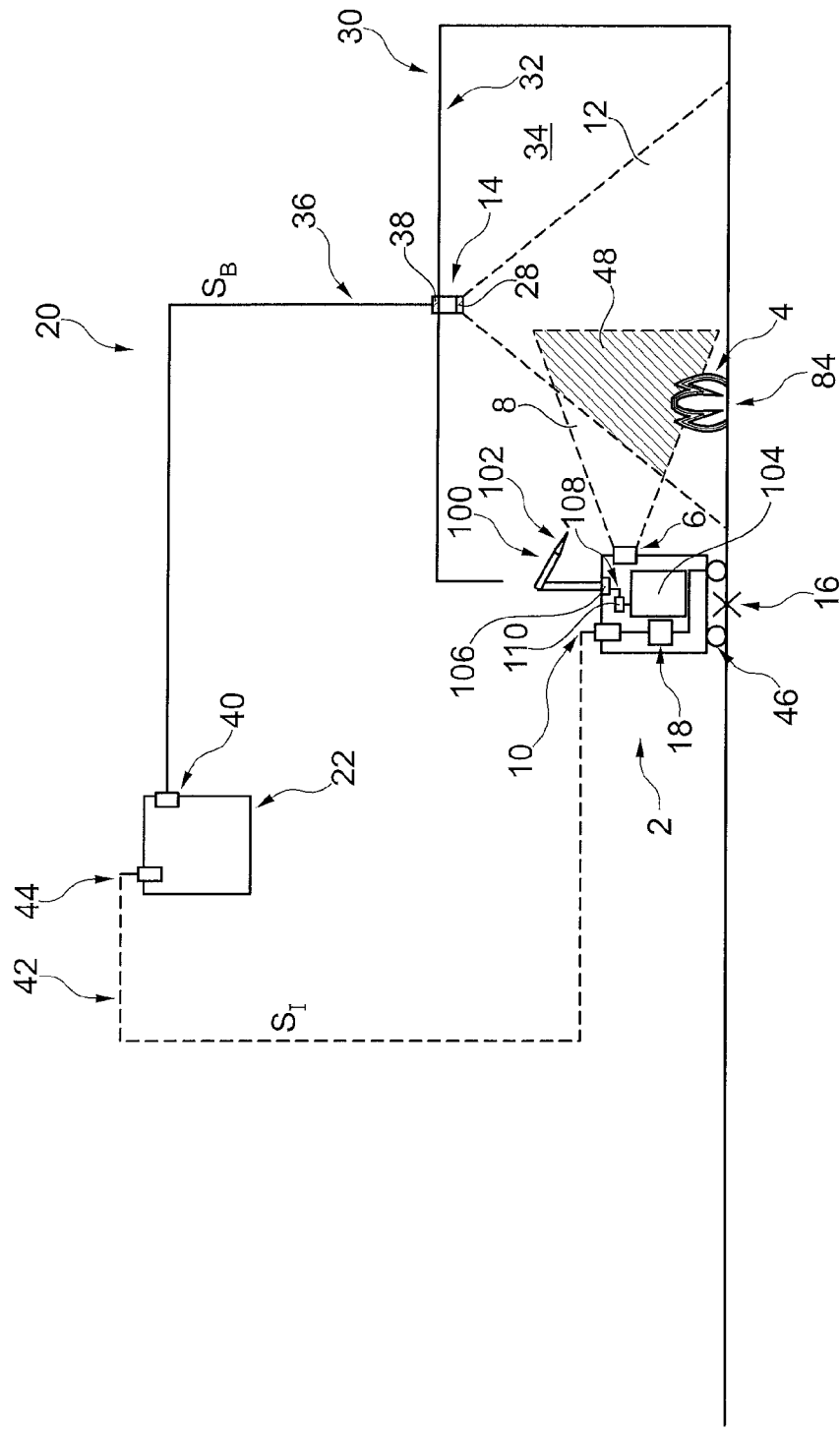
FIG. 10 shows a fifth embodiment of the vehicle and the system in the form of a schematic representation.

FIG. 10 schematically shows another advantageous embodiment of the vehicle 2 and the system 20. In this case, the vehicle 2 comprises an extinguishing medium pump 110. The extinguishing medium pump 110 may form part of the extinguishing unit 100. The extinguishing medium pump 110 is preferably designed for transporting extinguishing medium. In this case, the extinguishing medium pump 110 may be coupled into the fluidic collection 108 between the extinguishing medium container 104 and the nozzle 102, preferably between the extinguishing medium container 104 and the triggering unit 106. The extinguishing medium pump 110 may serve for transporting extinguishing medium from the extinguishing medium container 104 to the nozzle 102. This is particularly advantageous if the extinguishing medium is not stored in the extinguishing medium container 104 under pressure. The extinguishing medium pump 110 may furthermore be advantageous for increasing the range or discharging range of the extinguishing medium to be discharged. The extinguishing medium pump 110 makes it possible to increase the pressure, with which the extinguishing medium is conveyed and/or transported to the nozzle 102. Furthermore, the vehicle 2 and/or the fire extinguishing unit 110 may be respectively designed for controlling the triggering unit 106 and/or at the extinguishing medium pump 110. In this case, the control may be based on the verified reference fire status ZVR.

Figure 11:
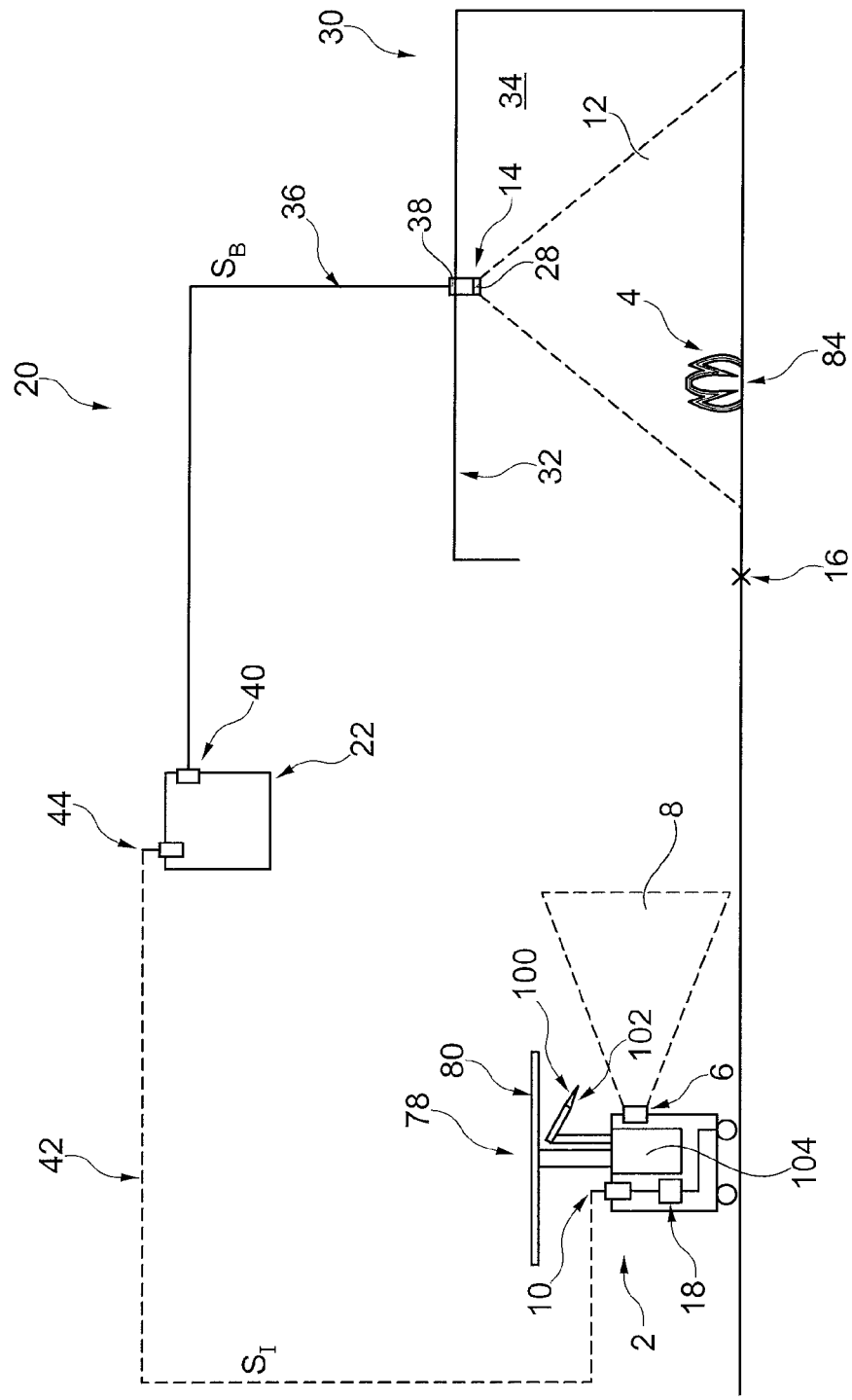
FIG. 11 shows a sixth embodiment of the vehicle and the system in the form of a schematic representation.

In FIGS. 1, 5, 6, 9 and 10, the vehicle 2 is schematically illustrated in the form of a land craft. However, the vehicle 2 may basically be realized in the form of any type of vehicle 2. FIG. 11 shows another advantageous embodiment of the vehicle 2. According to this figure, the vehicle 2 may be realized in the form of an aircraft, particularly a drone. The aircraft preferably comprises at least one rotor 78. The rotor 78 may be coupled to multiple rotary wings 80 in order to ensure the corresponding lift and/or propulsion. The aircraft is preferably realized, in particular, in the form of a helicopter and/or a multicopter, for example a quadrocopter and/or an octocopter. If the vehicle 2 is realized in the form of an aircraft, it is advantageous that the vehicle also can respectively navigate or fly to regions, which are difficult to access, in order to respectively detect a fire parameter KF or a verification fire parameter KV by means of the vehicle sensor unit 6. In addition, the aircraft provides the advantage that corresponding regions, which are difficult to access, can be extinguished by means of the fire extinguishing unit 100. In other respects, we refer analogously to the preceding explanations, preferred characteristics, effects and/or advantages.

Figure 12:
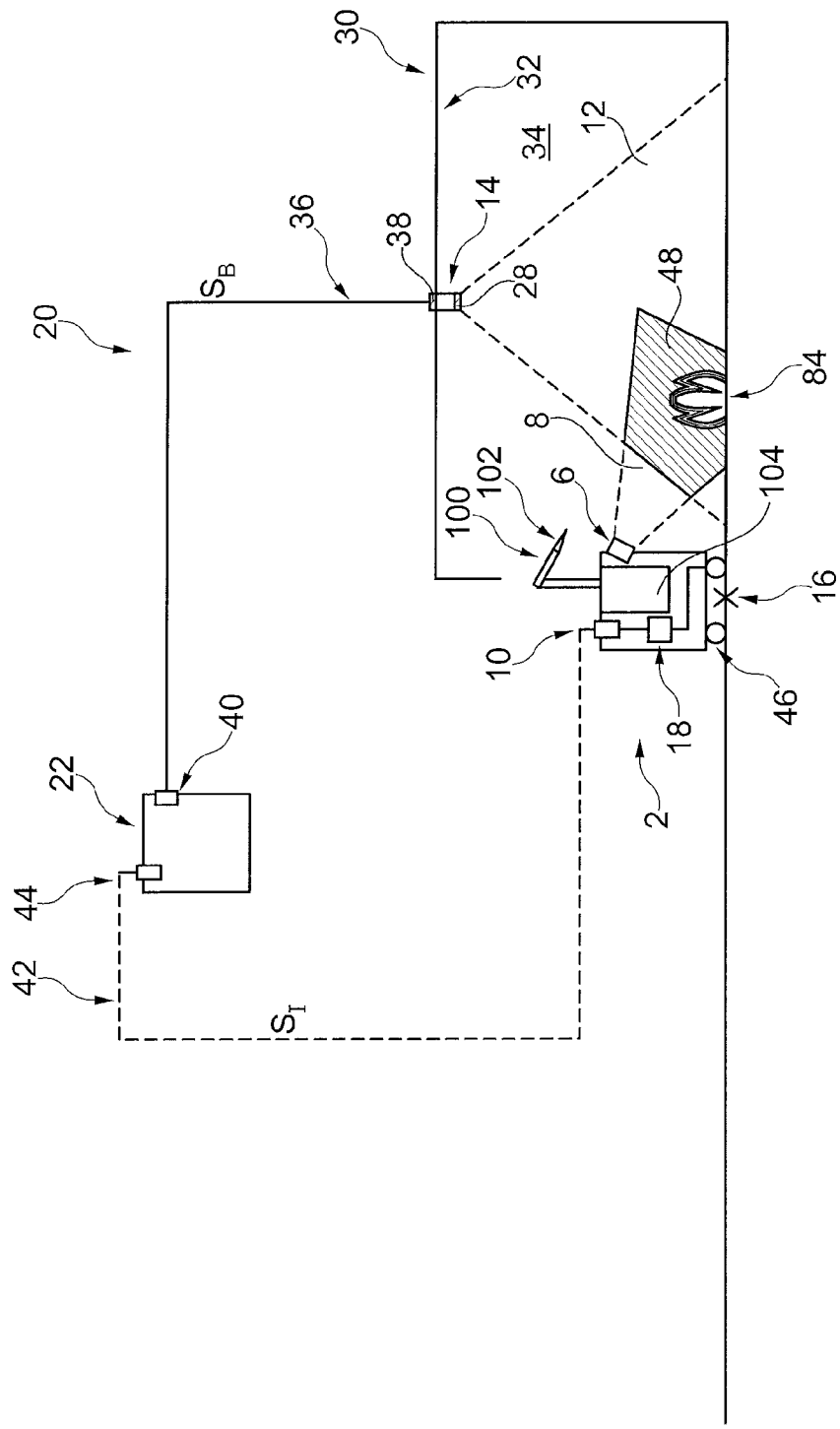
FIG. 12 shows a seventh embodiment of the vehicle and the system in the form of a schematic representation.

The following explanations preferably refer to FIGS. 4, 10 and 12.

An advantageous embodiment of the vehicle 2 is characterized in that the vehicle 2 is designed for determining the location 84 of a fire at the target location 16 or in the target region 137 by means of the vehicle sensor unit 6. This is particularly advantageous if the vehicle sensor unit 6 is realized with or in the form of a camera.

In this context, the location 84 of the fire respectively refers to the location of the fire 4, the preliminary fire stage and/or the smoldering fire. When the vehicle 2 is at the target location 16, an image 82 of the fire detector monitoring region 12 can be captured by means of the camera of the vehicle sensor unit 6. The location 84 of the fire can then be determined by evaluating the image 82, preferably by means of an evaluation unit of the vehicle 2. The information on the target location 16 is made available to the vehicle 2. The respective position of the vehicle sensor unit 6 or the camera can be determined from this information. Furthermore, the location 84 of the fire can be determined by the vehicle 2 by means of triangulation, namely with consideration of the target location 16 and the image 82. In this case, a single image 82 may be captured by means of the camera of the vehicle sensor unit 6. However, the camera of the vehicle sensor unit 6 may also capture a plurality of images, which respectively correspond to different rotating and/or pivoting positions of the camera, the vehicle sensor unit 6 and/or the vehicle 2, wherein the vehicle 2 is at least essentially at the target location 16 in this case. For example, the plurality of images may be captured in such a way that the corresponding images are captured during a rotation of the vehicle 2 at the target location 16 and/or during a respective rotation of the camera or the vehicle sensor unit 6. The common image 82 may then be formed of the plurality of images. This image 82 can then serve as basis for determining the location 84 of the fire. In the schematic representation in FIG. 4, the fire 4 and therefore the source of the fire are located centrally in the lower third of the image 82. The fire 4 is therefore located obliquely underneath the vehicle sensor unit 6 as illustrated, for example, in FIG. 10.

Figure 13:
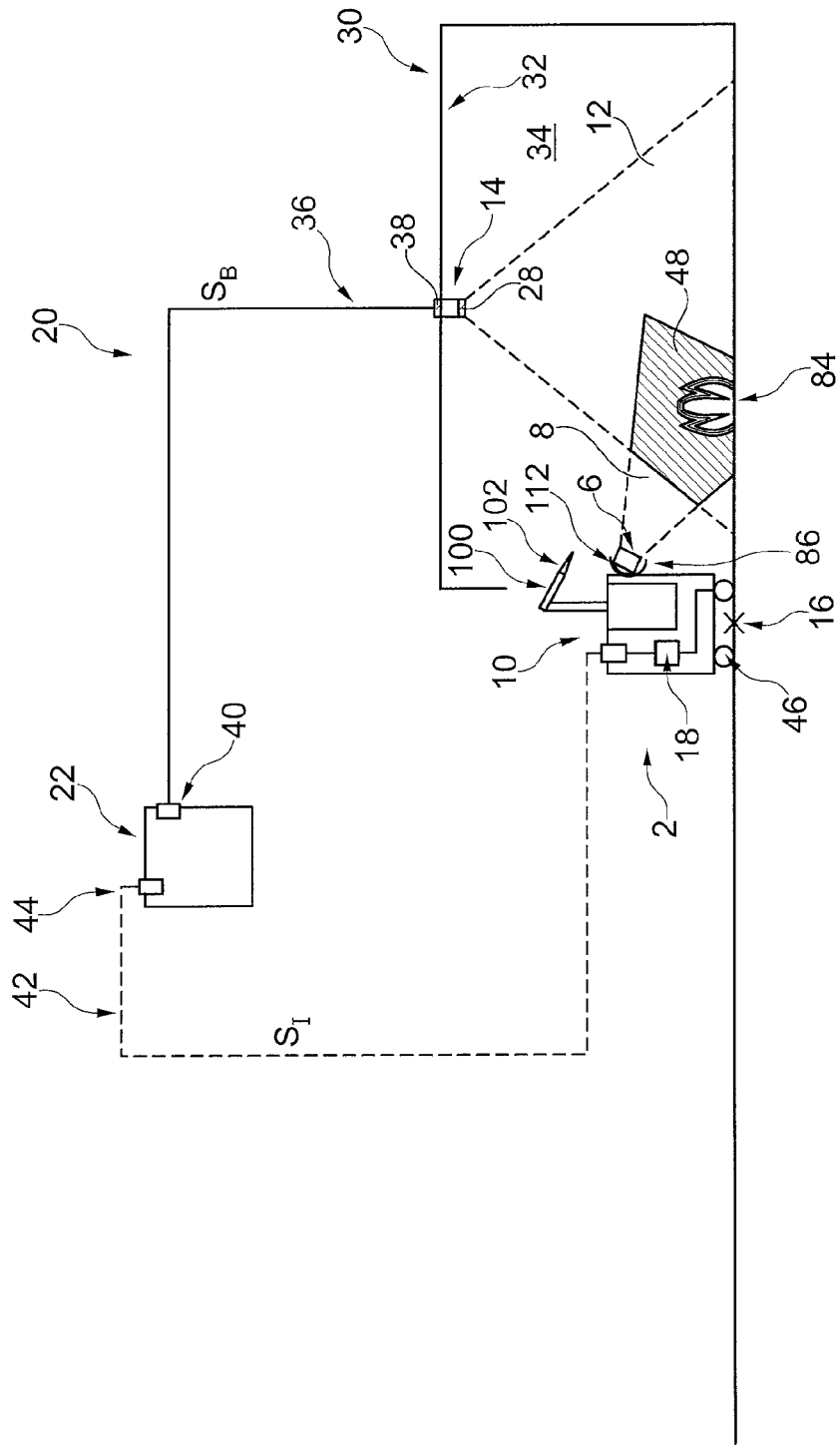
FIG. 13 shows an eighth embodiment of the vehicle and the system in the form of a schematic representation.
Figure 14:
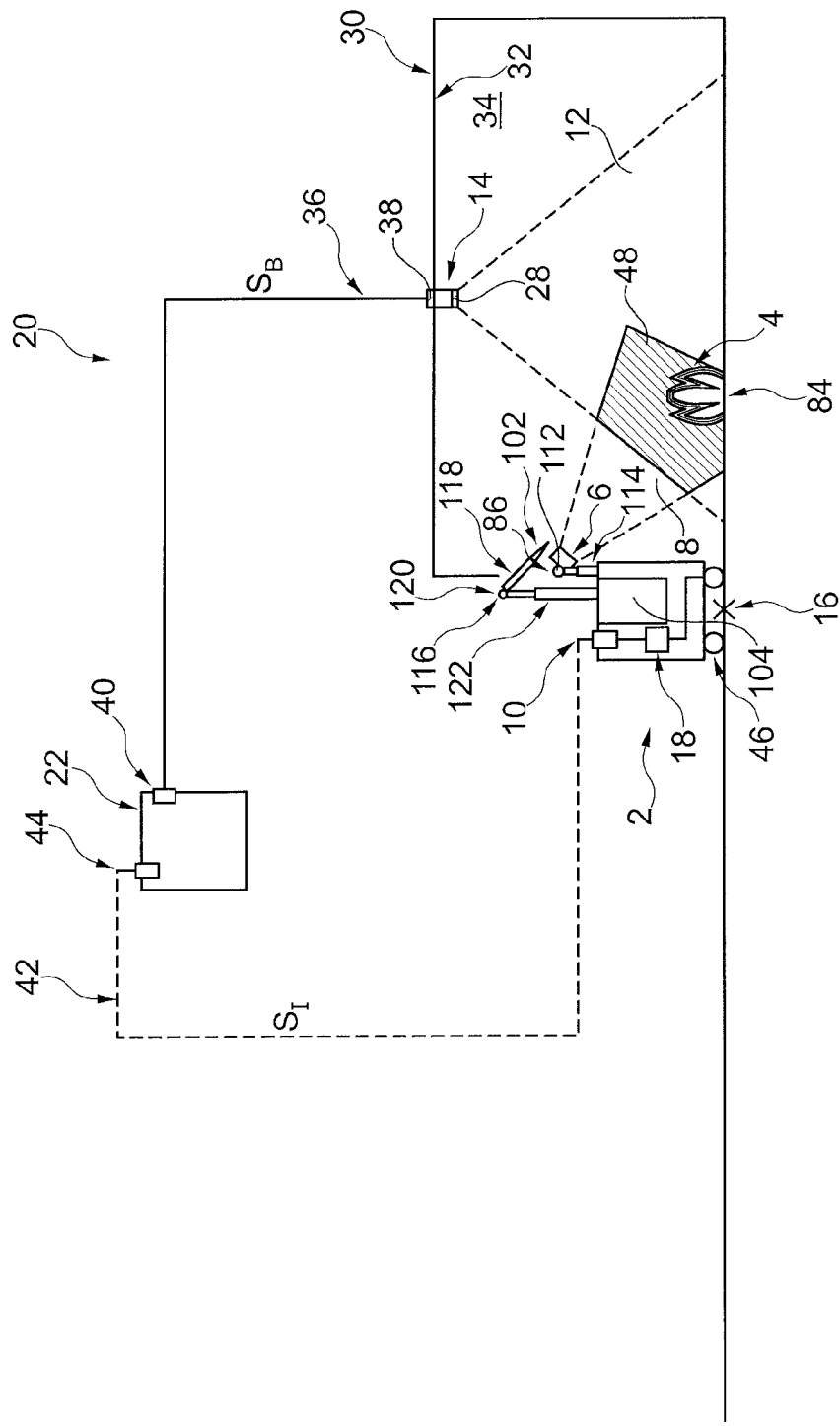
FIG. 14 shows a ninth embodiment of the vehicle and the system in the form of a schematic representation.

In order to detect the most informative fire parameter KF possible by means of the vehicle sensor unit 6, it is preferred that the vehicle 2 is designed for orienting the vehicle sensor unit 6 in the direction of the location 84 of the fire, particularly when the vehicle 2 is at the target location 16. A corresponding orientation of the vehicle sensor unit 6 in the direction of the location 84 of the fire is schematically illustrated in FIG. 12. In order to allow the orientation of the vehicle sensor unit 6, the vehicle 2 may comprise a rotatable, pivotable and/or length-adjustable orientation device 86, wherein at least part of the vehicle sensor unit 6, particularly the corresponding camera, is mounted on said orientation device, and wherein the vehicle 2 is designed for controlling the orientation device 86 in such a way that the vehicle sensor unit 6 or the corresponding camera is respectively oriented, in particular, in the direction of the location 84 of the fire. The orientation device 86 is also referred to as second orientation device 68. Exemplary embodiments of the vehicle 2 with an orientation device 86 are schematically illustrated in FIGS. 13-14.

The orientation device 86 may comprise a joint unit 112 or a telescopic, length-adjustable device 14, which can be controlled by an actuator, such that a rotation, a pivoting motion and/or a height adjustment of the vehicle sensor unit 6 or the corresponding camera can be respectively realized by controlling the actuator accordingly. In addition, the instruction signal SI may contain at least one parameter for the control of the orientation device 86 such that the vehicle sensor unit 6 or the corresponding camera can be respectively oriented by activating the orientation device 86 based on the aforementioned parameter in order to at least sufficiently overlap the vehicle monitoring region 8 with the fire detector monitoring region 12 when the vehicle 2 is at the target location.

The orientation of the vehicle sensor unit 6 in the direction of the location 84 of the fire may alternatively or additionally be realized by means of a controlled navigation of the vehicle 2 itself. For example, the vehicle 2 may carry out a rotation about the vertical axis at the target location 16 based on the instruction signal SI such that the vehicle sensor unit 6 is oriented in the direction of the vehicle monitoring region 12 and/or the location 84 of the fire. In this way, it can be ensured that the desired overlap between the vehicle monitoring region 8 and the fire detector monitoring agent 12 is achieved at least to a sufficient degree.

It furthermore proved advantageous if the vehicle 2 is configured for only detecting the verification fire parameter KV of the fire detector monitoring region 12 when the vehicle sensor unit 6 is oriented in the direction of the location 84 of the fire. Consequently, the vehicle 2 may initially drive to the target location 16 based on the instruction signal SI and subsequently orient the vehicle sensor unit 6 in the direction of the location 84 of the fire in order to subsequently detect the fire parameter KF in the form of the verification fire parameter KV of the fire monitoring region at the target location 16 by means of the vehicle sensor unit 6. This ensures a reliable determination of the verification fire parameter KV of the fire detector monitoring region 12 such that two independently detected fire parameters, namely the reference fire parameter KR and the verification fire parameter KV, are subsequently available for the fire detector monitoring region 12.

In addition, the vehicle 2 may be designed for orienting the nozzle 102 as illustrated, for example, in FIG. 14. In this case, the nozzle 102 is oriented in such a way that the extinguishing medium to be discharged, particularly sprayed and/or ejected, by the nozzle 102 flows in the direction of the location 84 of the fire in order to respectively extinguish the fire 4 or a preliminary fire stage and/or a smoldering fire. For example, the orientation of the nozzle 102 may refer to a height position, a vertical pivoting angle and/or a horizontal pivoting angle of the nozzle 102 relative to the vehicle 2. The vehicle 2 may be designed for vertically displacing, vertically rotating and/or pivoting and/or horizontally rotating and/or pivoting the nozzle 102. However, the vehicle 2 may also be designed and/or configured for taking into account a trajectory of the extinguishing medium to be discharged, particularly sprayed and/or ejected. The trajectory of the extinguishing medium is frequently parabolic. Due to the described orientation of the nozzle 102, a fire 4 or a preliminary fire stage and/or a smoldering fire in the fire detector monitoring region 12 can be extinguished in a particularly effective, fast and/or reliable manner.

The vehicle 2 and/or the fire extinguishing unit 100 may comprise an additional orientation device 116 for orienting the nozzle 102. This orientation device is referred to as first orientation device 116. In this case, the first orientation device 116 is realized in the form of a rotatable, pivotable and/or length-adjustable orientation device. The nozzle 102 is mounted and/or arranged on the first orientation device 116, preferably on an end section 118 of the first orientation device 116 that lies opposite of the vehicle 2. In this case, the first orientation device 116 may be realized in the form of an arm device. The first orientation device 116 may comprise a controllable actuator, by means of which a rotation, pivoting motion and/or height adjustment of the first orientation device 116 can be realized. In this case, the vehicle 2 and/or the fire extinguishing unit 100 may be designed and/or configured for controlling the actuator of the first orientation device 116 in such a way that a correspondingly controlled rotation, pivoting motion and/or height adjustment is achieved. For example, the first orientation device 116 or the corresponding arm device may respectively comprise a joint unit 120 and/or a telescopic, length-adjustable device 122. The joint unit 120 and/or the telescopic, length-adjustable device 122 may be controlled by the actuator such that a controlled rotation and/or pivoting motion can be realized by means of the joint unit 120 and a height adjustment can be realized by means of the length-adjustable device 122. The first orientation device 116 provides the advantage that the nozzle 102 can be positioned above a potential obstacle located between the vehicle 2 and the source of the fire at the location 84 of the fire. In addition, the first orientation device 116 can be used for pivoting and/or rotating the nozzle 102 while the extinguishing medium is discharged in order to thereby extinguish a potentially extensive fire 4.

With respect to larger buildings 30, in particular, it may be sensible if the system 20 comprises multiple stationary fire detectors 14. A corresponding example is schematically illustrated in FIG. 6. In this case, the multiple stationary fire detectors 14 may be mounted on the ceiling 32 at a certain distance from one another. A fire detector monitoring region 12 is assigned to each of the fire detectors 14. In this case, the fire detectors 14 may be arranged relative to one another in such a way that fire detector monitoring regions 12 of adjacent fire detectors 14 intersect and/or overlap. This ensures that the room 34 of the building 30 can be monitored for a potential fire 4, a potential preliminary fire stage and/or a potential smoldering fire in a particularly reliable manner. In this case, each of the fire detectors 14 is preferably realized and/or designed analogous to the individual fire detector 14 described above in connection with the preceding figures. In addition, each of the fire detectors 14 is connected to the central unit 22 by means of a signal line 36. Alternatively, the signal line 36 may be realized in the form of a signal bus of the type schematically illustrated, for example, in FIG. 21, wherein the fire detectors 14 and the central unit 22 are coupled to said signal bus such that a fire detector signal SB can be transmitted from a fire detector 14 to the central unit 22, wherein the fire detector signal SB may in this case also represent the address of the respective fire detector 14.

Figure 15:
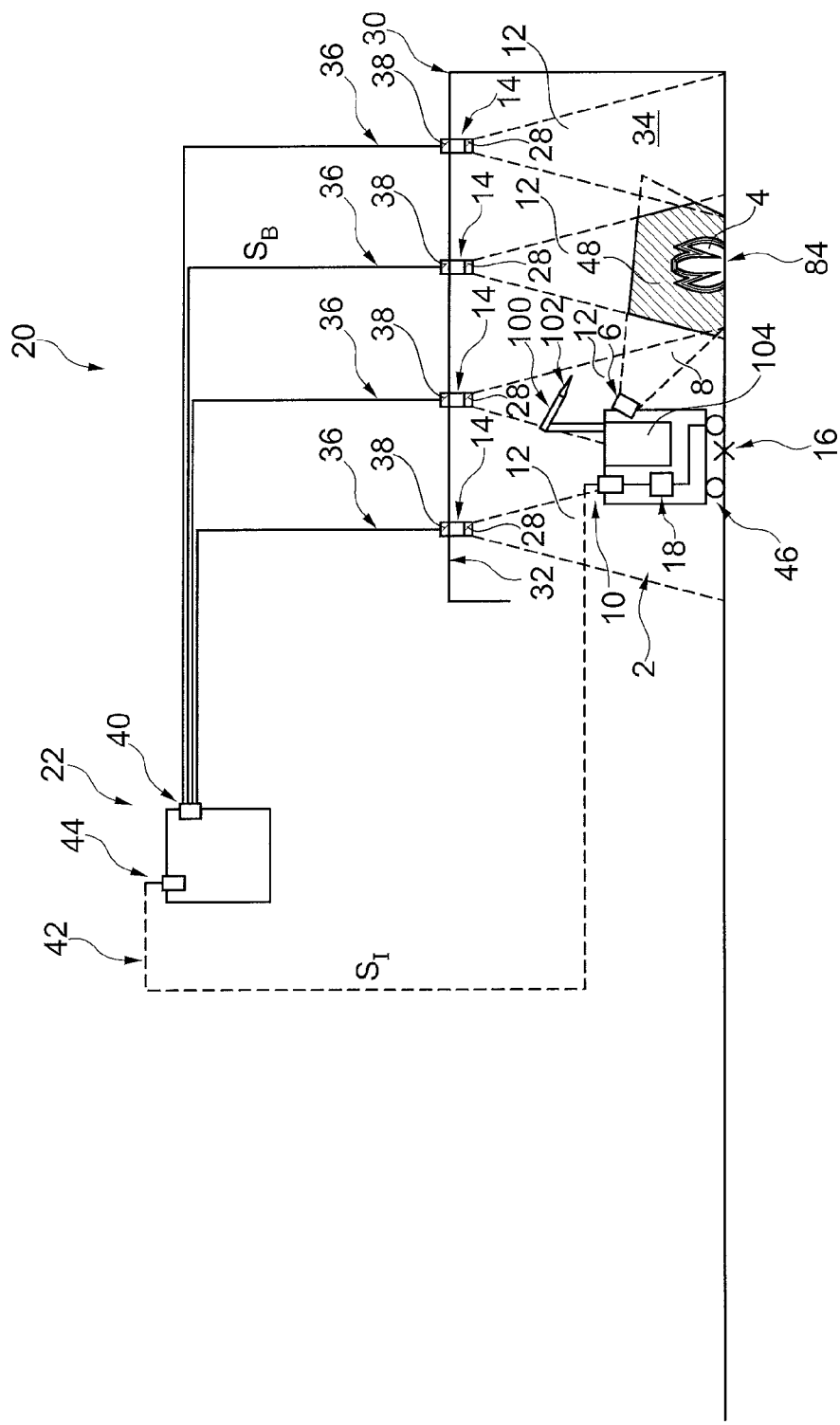
FIG. 15 shows a tenth embodiment of the vehicle and the system in the form of a schematic representation.

If a fire 4 occurs in the fire detector monitoring region 12 of one of the fire detectors 14, a reference fire parameter KR corresponding to the fire 4 is detected and a reference fire status ZR is determined based on the detected reference fire parameter by the corresponding fire detector 14. Subsequently, the corresponding fire detector 14 transmits a fire detector signal SB to the central unit 22, wherein said fire detector signal SB represents the corresponding reference fire status ZR. If the fire detectors 14 are individually connected to the central unit 22 by means of a respective signal connection 36, the central unit 22 can already determine the fire detector 14, which has transmitted the fire detector signal SB to the central unit 22, based on the parallel connection of the fire detectors 14 to the central unit 22. The fire detector signal SB may furthermore represent an identification that serves for identifying the fire detector 14 and/or the location of the respective fire detector 14. The identification is also referred to as address. Consequently, the central unit 22 can determine the location of the fire detector 14 based on the identification. If this information is available, the central unit 22 may be designed for determining a target location 16 for the vehicle 2 based on the fire detector location or the identification, respectively. The central unit 22 is therefore preferably configured for generating the instruction signal SI in such a way that the instruction signal SI represents at least a target location 16 for the vehicle 2, at which the vehicle monitoring region 8 sufficiently overlaps with the fire detector monitoring region 12, the reference fire parameter KR of which was detected by the fire detector sensor unit 28 of the fire detector 14 that has transmitted the fire detector signal SB to the central unit 22, when the vehicle 2 is at the target location 16. Once the instruction signal SI has been transmitted to the vehicle 2, the vehicle 2 navigates to the corresponding target location 16. A corresponding example is schematically illustrated in FIG. 15.

Figure 16:
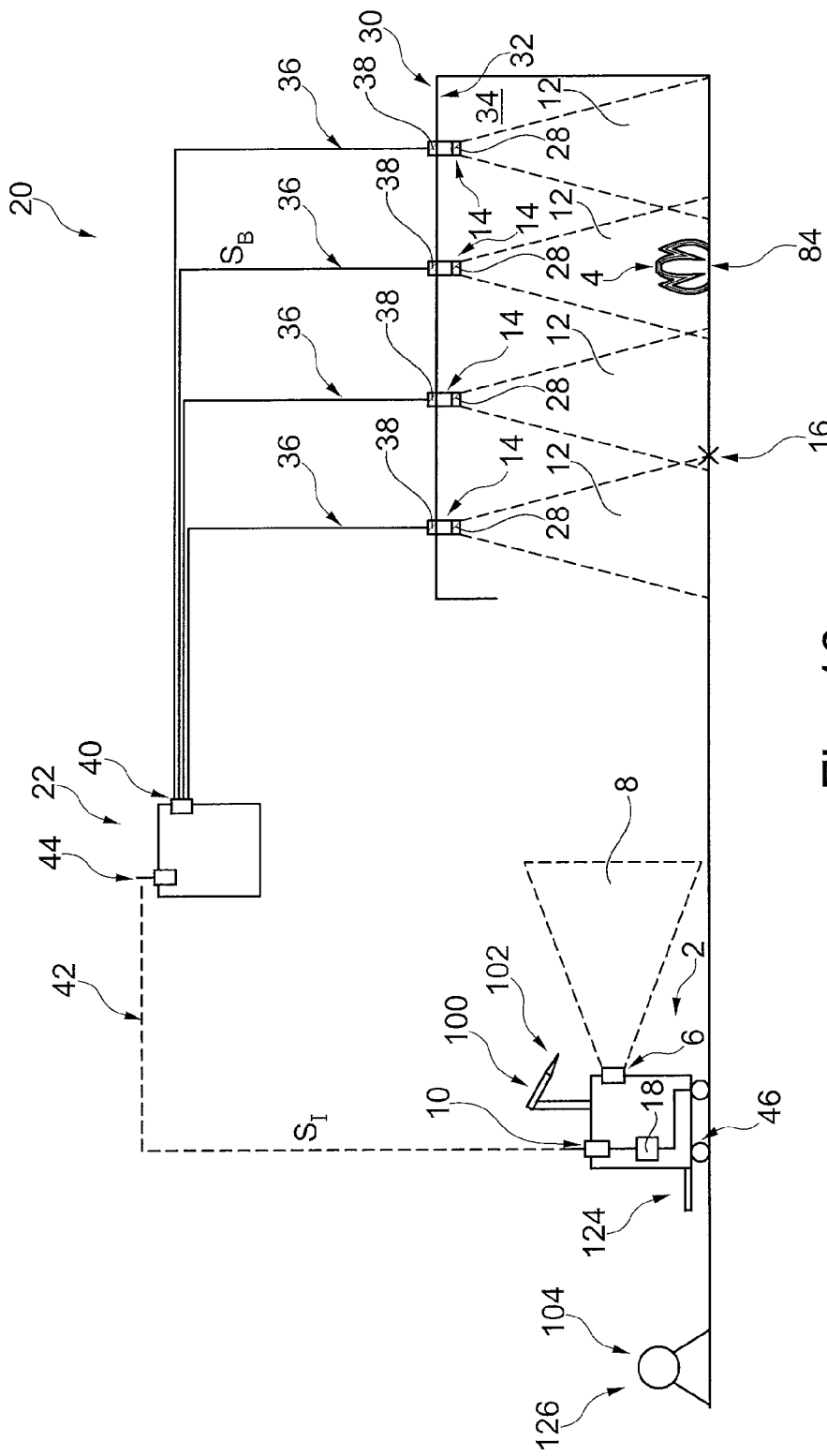
FIG. 16 shows an eleventh embodiment of the vehicle and the system in the form of a schematic representation.

FIG. 16 schematically shows another advantageous embodiment of the vehicle 2 and/or the system 20. In this case, the fire extinguishing unit 100 of the vehicle 2 comprises a coupling device 124. The coupling device 124 is designed for detachably coupling an extinguishing medium container 104 thereto. Consequently, the coupling device 124 serves for coupling and/or decoupling a detachable extinguishing medium container 104. When the vehicle 2 is not used for extinguishing a fire, for example, an extinguishing medium container 104, particularly a new extinguishing medium container, can be respectively coupled to the fire extinguishing unit 100 or to the vehicle 2 such that it is once again operational for extinguishing a fire.

Figure 17:
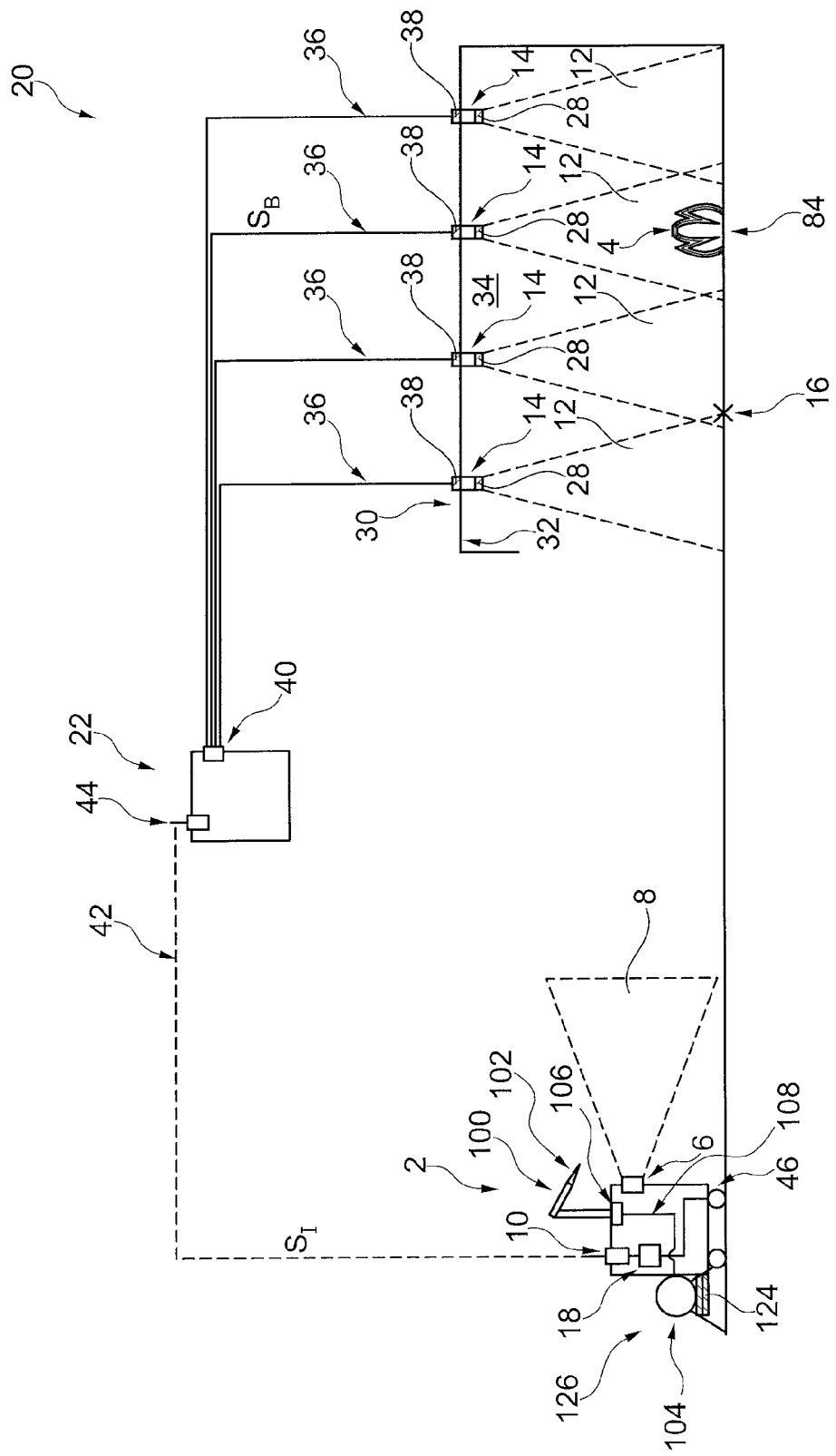
FIG. 17 shows a twelfth embodiment of the vehicle and the system in the form of a schematic representation.

The coupling of the extinguishing medium container 104 may be realized in that the vehicle 2 initially navigates to an extinguishing medium container depot 126, in which an extinguishing medium container 104 is held available. This can be gathered from a synopsis of FIGS. 16 and 17. Once the vehicle 2 has arrived at the extinguishing medium container depot 126, the extinguishing medium container 104 can be coupled thereto by means of the coupling device 124. Extinguishing medium is stored in the extinguishing medium container 104. In this case, a fluidic connection 108 to the triggering unit 106 of the fire extinguishing unit 100 is preferably produced simultaneously with the coupling of the extinguishing medium container 104. Consequently, the extinguishing medium in the extinguishing medium container 104 may serve for extinguishing a potential fire 4.

Figure 18:
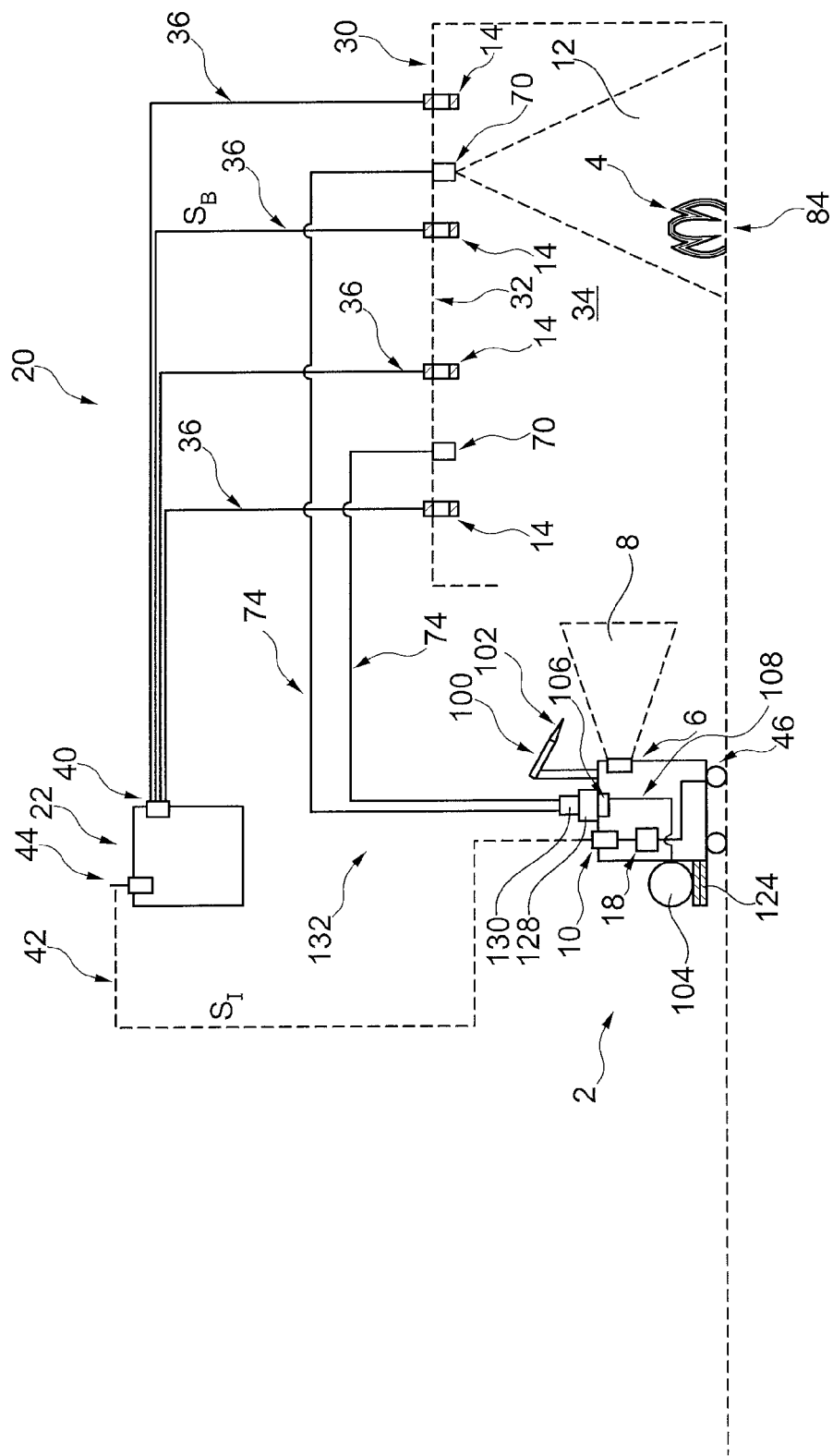
FIG. 18 shows a thirteenth embodiment of the vehicle and the system in the form of a schematic representation.

As initially mentioned, a fire extinguishing action may also be initiated in that the vehicle 2 indirectly extinguishes a fire. A suitable embodiment of the vehicle 2 in this respect is schematically illustrated in FIG. 18. With respect to the vehicle 2, the fire extinguishing unit 100 preferably comprises an externally accessible output connector 128 for making available extinguishing medium, wherein said output connector can be fluidically connected to a mating connector 130 of a stationary extinguishing device 132 in order to make available extinguishing medium to the stationary extinguishing device 132. The stationary extinguishing device 132 may also be simply referred to as extinguishing device 132 or as extinguishing facility. The extinguishing device 132 preferably forms part of the system 20. Consequently, the system 20 may comprise the stationary extinguishing device 132 with the mating connector 130, which is designed and/or serves for being coupled to the mating connector 128 of the vehicle 2. The extinguishing device 132 may comprise at least one extinguishing nozzle 70, preferably multiple extinguishing nozzles, for discharging extinguishing medium. Instead of the extinguishing nozzle 70 or the extinguishing nozzles 70, it would also be possible to provide other means that are suitable and/or designed for discharging extinguishing medium. The term extinguishing nozzle 70 may therefore also refer to another means for discharging extinguishing medium. Each extinguishing nozzle 70 is fluidically connected to the mating connector 130 by means of a pipe 74 such that extinguishing medium can be transported from the mating connector 130 to the respective extinguishing nozzle 70. It would furthermore be possible, in principle, to provide a fluidic line connection, by means of which the multiple extinguishing nozzles 70 are fluidically connected to the mating connector 130, wherein a controllable valve may be provided for each extinguishing nozzle 70 in order release or block a fluid flow to the respective extinguishing nozzle. According to the example illustrated in FIG. 18, multiple extinguishing nozzles 70 may be mounted on the ceiling 32. In a particularly preferred embodiment, the extinguishing nozzles 70 are arranged in the vicinity of an object to be protected in such a way that an optimized extinguishing result can be achieved, preferably with minimal consumption of extinguishing medium. In this case, the extinguishing nozzles 70 are preferably spaced apart from one another in such a way that a fire 4 can be extinguished in any region or a predefined region of the room 34 or the object.

Once the verified reference fire status ZVR was determined by means of the vehicle 2, the vehicle 2 may navigate to the mating connector 130 in order to subsequently couple the output connector 128 to the mating connector 130. Due to this coupling, extinguishing medium can be made available to the stationary extinguishing device 132 by the vehicle 2, particularly by the corresponding extinguishing unit 100 and/or the extinguishing medium container 104. Making available the extinguishing medium may therefore preferably refer to pumping, conveying and/or transporting. When extinguishing medium is transported from the output connector 128 to the mating connector 130, a pipe network comprising the pipes 74 conveys the extinguishing medium to the extinguishing nozzles 70, which subsequently discharge the extinguishing medium, for example, in order to extinguish a fire 4 in the fire detector monitoring region 12.

Figure 19:
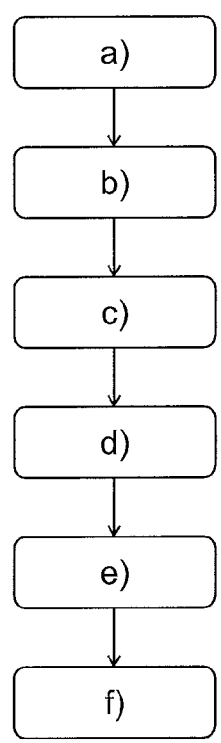
FIG. 19 shows a flow chart of steps of an embodiment of the method in the form of a schematic representation.

According to another aspect of the invention, a method for initiating a fire extinguishing action is proposed, wherein the steps of the method are schematically illustrated in FIG. 19.

According to step a) of the method, an instruction signal SI is received by means of a vehicle communication unit 10 of an unmanned vehicle 2, wherein a vehicle sensor unit 6 of the vehicle 2 is designed for detecting a fire parameter KF of a vehicle monitoring region 8, wherein the instruction signal SI represents a reference fire status ZR for a fire detector monitoring region 12 of a stationary fire detector 14 and a target location 16, and wherein the vehicle monitoring region 8 sufficiently overlaps with the fire detector monitoring region 12 when the vehicle 2 is at the target location 16.

According to step b) of the method, the vehicle 2 navigates to the target location 16, preferably in an autonomous manner, based on the instruction signal SI received by the vehicle 2 such that the vehicle monitoring region 8 and the fire detector monitoring region 12 sufficiently overlap.

According to step c) of the method, the vehicle sensor unit 6 detects the fire parameter KF in the form of a verification fire parameter KV of the fire detector monitoring region 12.

According to step d) of the method, a verification fire status ZV is determined by evaluating the verification fire parameter KV by means of the vehicle 2.

According to step e) of the method, the vehicle 2 determines the reference fire status ZR in the form of a verified reference fire status ZVR if the reference fire status ZR and the verification fire status ZV at least sufficiently match.

According to step f) of the method, a fire extinguishing action is initiated by means of the vehicle 2 if the reference fire status ZR was determined in the form of a verified reference fire status ZVR.

With respect to steps a) through f), we refer analogously, if applicable, to the preceding explanations, preferred characteristics, effects and/or advantages, which were described above in connection with the system 20 and/or the vehicle 2.

According to an advantageous embodiment of the method, it is proposed that the fire extinguishing action in step f) of the method is carried out by means of a fire extinguishing unit 100 of the vehicle 2. In this respect, we also refer analogously to the preceding explanations, preferred characteristics, effects and/or advantages, which were described above with reference to the system 20 and/or the vehicle 2.

Figure 20:
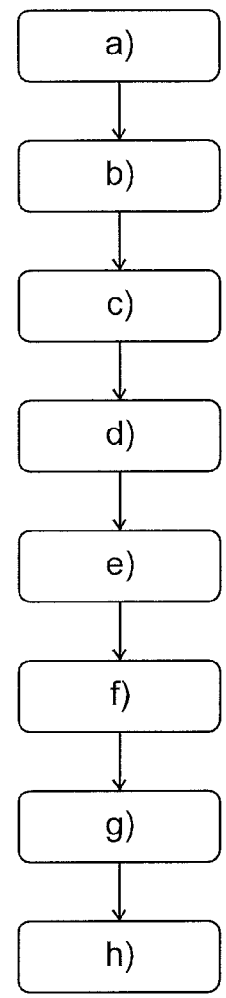
FIG. 20 shows a flow chart of steps of another embodiment of the method in the form of a schematic representation.

Another advantageous embodiment of the method is illustrated in FIG. 20. In this case, the method is characterized by the additional steps g) and h). According to step g) of the method, a location of the fire is determined by means of the vehicle sensor unit 6 of the vehicle 2, preferably when the vehicle 2 is at the target location 16. According to step h), the extinguishing medium is discharged in the direction of the location 84 of the fire in order to extinguish a fire 4, a preliminary fire stage and/or a smoldering fire. With respect to steps g) and h), we refer analogously, if applicable, to the preceding explanations, preferred characteristics, effects and/or advantages, which were described above in connection with the system 20 and/or the vehicle 2.

LIST OF UTILIZED REFERENCE NUMBERS

Symbol Meaning
$K_F$ Fire parameter
$K_R$ Reference fire parameter
$K_V$ Verification fire parameter
$S_A$ Alarm signal
$S_B$ Fire detector signal
$S_F$ False alarm signal
$S_I$ Instruction signal
$S_V$ Verification signal
t Time
$W_{S1}$ First threshold value
$W_{S2}$ Second threshold value
$W_{S3}$ Third threshold value
$W_{S4}$ Fourth threshold value
$W_{S5}$ Fifth threshold value
$W_{S6}$ Sixth threshold value
$Z_R$ Reference fire status
$Z_V$ Verification fire status
$Z_{R1}$ Reference fire status corresponding to smoldering fire
$Z_{R2}$ Reference fire status corresponding to preliminary fire stage
$Z_{R3}$ Reference fire status corresponding to fire
$Z_{VR}$ Verified reference fire status
2 Vehicle
4 Fire
6 Vehicle sensor unit
8 Vehicle monitoring region
10 Vehicle communication unit
12 Fire detector monitoring region
14 Fire detector
16 Target location
18 Navigation control unit
20 System
22 Central unit
28 Fire detector sensor unit
30 Building
32 Ceiling
34 Room
36 Signal line, signal link
38 Signal transmitting unit (of fire detector)
40 Signal receiving unit (of central unit)
42 Signal link
44 Signal transmitting unit (of central unit)
46 Tire
48 Intersection
50 Output unit
52 Control center
54 Signal link
56 Signal transmitting unit (of central unit)
58 Signal receiving unit (of control center)
60 Output unit
62 Output unit
64 Central extinguishing control system
66 Signal link
68 Extinguishing facility
70 Extinguishing nozzle
72 Extinguishing medium source
74 Pipe
76 Signal control line
78 Rotor
80 Rotary wing
82 Image
84 Location of fire
86 Second orientation device
100 Fire extinguishing unit
102 Nozzle
104 Extinguishing medium container
106 Triggering unit
108 Fluidic line connection, fluidic connection
110 Extinguishing medium pump
112 Joint unit
114 Device
116 First orientation device
118 End section
120 Joint unit
122 Device
124 Coupling device 126 Extinguishing medium container depot
128 Output connector
130 Mating connector
132 Stationary extinguishing device
134 Extinguishing medium production device
136 Fluidic line connection
137 Target region
138 Central fire alarm system

The invention claimed is:

1. A system for initiating a fire extinguishing action, comprising:
a central unit having a central fire alarm system and/or a stationary fire detector,
a vehicle including:
a vehicle sensor unit that is designed for detecting a fire parameter $K_F$ of a vehicle monitoring region,
a vehicle communication unit for a signal exchange with the central unit having the central fire alarm system, or with the stationary fire detector, wherein the vehicle communication unit is designed for receiving an instruction signal $S_I$ that represents a detected fire status $Z_R$ for a fire detector monitoring region of the stationary fire detector, and a target location and/or a target region, and
a navigation control unit for navigating the vehicle to the target location and/or to the target region, in an autonomous manner, based on the received instruction signal $S_I$,
wherein the vehicle is configured for detecting the fire parameter $K_F$ in the form of a verification fire parameter $K_V$ of the fire monitoring region, at the target location or in the target region of the vehicle sensor unit, configured for determining a verification fire status $Z_V$ by evaluating the verification fire parameter $K_V$, and designed and/or configured for initiating a fire extinguishing action if the verification fire status $K_V$ was determined;
wherein the vehicle comprises a first signal communication unit that contains the vehicle communication unit of the vehicle, the central unit comprises a second signal communication unit that is designed for producing a wireless signal link to the first signal communication unit of the vehicle, and the central unit and/or the stationary fire detector is designed for transmitting the corresponding instruction signal $S_I$ to the vehicle; and
wherein the fire detector comprises a fire detector sensor unit that is designed for detecting a reference fire parameter $K_R$ of a predefined fire detector monitoring region, wherein the fire detector is designed for determining a reference fire status $Z_R$ by evaluating the reference fire parameter $K_R$, wherein the fire detector is designed for transmitting a fire detector signal $S_B$, which represents the reference fire status $Z_R$, to the central unit, wherein the central unit is configured for transmitting an instruction signal $S_I$ to the vehicle if the fire detector signal $S_B$ transmitted by the fire detector represents a reference fire status $Z_R$ that requires verification, wherein the instruction signal $S_I$ represents at least the target location for the vehicle, wherein the vehicle monitoring region sufficiently overlaps with the fire detector monitoring region when the vehicle is at the target location, and wherein a measuring principle of the fire detector sensor unit and a measuring principle of the vehicle sensor unit differ.

2. The system according to claim 1, wherein the vehicle is configured for determining the reference fire status $Z_R$ in the form of a verified reference fire status $Z_{VR}$ if the reference fire status $Z_R$ and the verification fire status $Z_V$ at least sufficiently match, and wherein the vehicle is designed and/or configured for initiating a fire extinguishing action if the reference fire status $Z_R$ was determined in the form of a verified reference fire status $Z_{VR}$.

3. The system according to claim 1, wherein the vehicle is realized in the form of a land craft, a robotic vehicle, an aircraft, or a drone.

4. The system according to claim 1, wherein the vehicle comprises a fire extinguishing unit for extinguishing a fire, wherein the vehicle is designed for carrying out a fire extinguishing action with the aid of the fire extinguishing unit.

5. The system according to claim 4, wherein the fire extinguishing unit comprises a nozzle, which is designed for discharging and spraying an extinguishing medium for extinguishing a fire.

6. The system according to claim 5, wherein the fire extinguishing unit comprises an externally accessible output connector for making available extinguishing medium, wherein said output connector can be coupled to a mating connector of a stationary extinguishing device in order to make available extinguishing medium to the stationary extinguishing device.

7. The system according to claim 1, wherein the vehicle is designed for determining the location of a fire by the vehicle sensor unit at the target location.

8. The system according to claim 7, wherein the vehicle is designed for autonomously navigating to an optimal location for discharging extinguishing medium based on the location of the fire.

9. The system according to claim 4, wherein the fire extinguishing unit comprises a detachable extinguishing medium container, in which extinguishing medium is stored, and/or the fire extinguishing unit comprises an extinguishing medium production device for producing the extinguishing medium.

10. The system according to claim 4, wherein the fire extinguishing unit comprises an externally accessible input connector, which can be coupled to a mating connector of a stationary extinguishing medium source, such that extinguishing medium can be conveyed from the extinguishing medium source to the vehicle to the corresponding fire extinguishing unit.

11. The system according to claim 1, wherein the navigation control unit is designed for navigating the vehicle to an extinguishing medium container depot, in which at least one extinguishing medium container that can be coupled to the vehicle by a coupling device is held available, in a controlled manner based on navigation data.

12. The system according to claim 1, wherein the central unit is designed for transmitting navigation control signals from the central unit to the vehicle, the vehicle is designed and/or configured for navigating based on the transmitted navigation control signals, and the central unit is designed for navigating the vehicle in a remote-controlled manner by transmitting navigation control signals to the vehicle.

13. An unmanned vehicle for initiating a fire extinguishing action, comprising:
a vehicle sensor unit that is designed for detecting a fire parameter $K_F$ of a vehicle monitoring region,
a vehicle communication unit for a signal exchange with a central unit having a central fire alarm system, or with a stationary fire detector, wherein the vehicle communication unit is designed for receiving an instruction signal $S_I$ that represents a reference fire status $Z_R$ for a fire detector monitoring region of the stationary fire detector, and a target location and/or a target region, and a navigation control unit, wherein the navigation control unit is designed for navigating the vehicle to the target location and/or to the target region, preferably in an autonomous manner, based on the received instruction signal $S_I$, wherein the vehicle is configured for detecting the fire parameter $K_F$ in the form of a verification fire parameter $K_V$ of the fire monitoring region, at the target location or in the target region by the vehicle sensor unit, configured for determining a verification fire status $Z_V$ by evaluating the verification fire parameter $K_V$, and designed and/or configured for initiating a fire extinguishing action if the verification fire status $K_V$ was determined, wherein the vehicle comprises a fire extinguishing unit for extinguishing a fire, wherein the vehicle is designed for carrying out a fire extinguishing action with the aid of the fire extinguishing unit, wherein the fire extinguishing unit comprises a nozzle, which is designed for discharging and spraying an extinguishing medium for extinguishing a fire, and an externally accessible output connector for making available extinguishing medium, wherein said output connector can be coupled to a mating connector of a stationary extinguishing device in order to make available extinguishing medium to the stationary extinguishing device, and wherein the fire extinguishing unit comprises a controllable triggering unit having a controllable valve, which is designed for controlling an extinguishing medium flow to the nozzle and/or the output connector, wherein the vehicle is designed for generating a triggering signal for the triggering unit and for controlling the triggering unit by the triggering signal such that the triggering unit releases an extinguishing medium flow to the nozzle and/or the output connector when the triggering unit is activated by the triggering signal, wherein the vehicle is designed for transmitting a signal, which represents the triggering time, at which the triggering unit releases the extinguishing medium flow, and/or a triggering period of the released extinguishing medium flow, to the central unit.

14. The vehicle according to claim 13, wherein the vehicle is designed for re-generating the triggering signal such that the triggering unit once again releases an extinguishing medium flow to the nozzle or the output connector if the re-detected fire parameter $K_F$ represents a fire, a preliminary fire stage and/or a smoldering fire.

15. The vehicle according to claim 14, wherein the re-generated triggering signal is generated by the vehicle in such a way that the triggering unit releases an extinguishing medium, which differs from the previously released extinguishing medium, to the nozzle or the output connector.

16. A method for initiating a fire extinguishing action, comprising the following steps:

receiving an instruction signal $S_I$ by a vehicle communication unit of an unmanned vehicle, wherein a vehicle sensor unit of the vehicle is designed for detecting a fire parameter $K_F$ of a vehicle monitoring region, and wherein the instruction signal $S_I$ represents a reference fire status $Z_R$ for a fire detector monitoring region of a stationary fire detector, and a target location or a target region;

navigating the vehicle to the target location or to the target region in an autonomous manner, based on the instruction signal $S_I$ received by the vehicle;

detecting the fire parameter $K_F$ in the form of a verification fire parameter $K_V$ of the fire detector monitoring region, by the vehicle sensor unit;

determining a verification fire status $Z_V$ by evaluating the verification fire parameter $K_V$ by the vehicle; and initiating a fire extinguishing action by the vehicle if the verification fire status $K_V$ was determined;

wherein the method further comprises the following additional step, which is carried out prior to the reception of the instruction signal $S_I$: transmitting the corresponding instruction signal $S_I$ to the vehicle communication unit of the vehicle by a signal transmitting unit of a central unit.

17. The method according to claim 16, wherein the navigation to the target location is realized in such a way that the vehicle monitoring region sufficiently overlaps with the fire detector monitoring region at the target location, the vehicle determines the reference fire status $Z_R$ in the form of a verified reference fire status $Z_{VR}$ if the reference fire status $Z_R$ and the verification fire status $Z_V$ at least sufficiently match, and the vehicle initiates a fire extinguishing action if the reference fire status $Z_R$ was determined in the form of a verified reference fire status $Z_{VR}$.

18. The method according to claim 16, wherein the fire extinguishing action is carried out by a fire extinguishing unit of the vehicle.

19. The method according to claim 18, including the following additional step: discharging extinguishing medium for extinguishing a fire by the fire extinguishing unit by a nozzle of the fire extinguishing unit and for a predefined extinguishing period.

20. The method according to claim 18, including the following additional steps: coupling an externally accessible output connector of the fire extinguishing unit to a mating connector of a stationary extinguishing device; and transferring extinguishing medium from the vehicle to the stationary extinguishing device in order to extinguish a fire.

21. The method according to claim 19, including the following additional steps: re-detecting a fire parameter $K_F$ by the vehicle sensor unit after the predefined extinguishing period and once again discharging extinguishing medium if the re-detected fire parameter $K_F$ represents a fire, a preliminary fire stage and/or a smoldering fire.

22. The method according to claim 16, including the following additional step: determining a location of the fire by the vehicle sensor unit of the vehicle when the vehicle is at the target location or in the target region.

23. The method according to claim 22, including the following additional step: navigating the vehicle to an optimal location for discharging extinguishing medium based on the location of the fire, wherein the fire extinguishing action is initiated when the vehicle is at the location for discharging extinguishing medium.

24. A method for initiating a fire extinguishing action, comprising the following steps:

receiving an instruction signal $S_I$ by a vehicle communication unit of an unmanned vehicle, wherein a vehicle sensor unit of the vehicle is designed for detecting a fire parameter $K_F$ of a vehicle monitoring region, and wherein the instruction signal $S_I$ represents a reference fire status $Z_R$ for a fire detector monitoring region of a stationary fire detector, and a target location or a target region;
navigating the vehicle to the target location or to the target region in an autonomous manner, based on the instruction signal $S_I$ received by the vehicle;
detecting the fire parameter $K_F$ in the form of a verification fire parameter $K_V$ of the fire detector monitoring region, by the vehicle sensor unit;
determining a verification fire status $Z_V$ by evaluating the verification fire parameter $K_V$ by the vehicle; and
initiating a fire extinguishing action by the vehicle if the verification fire status $K_V$ was determined;
wherein the method further comprises the following additional steps, which are carried out prior to the transmission of the instruction signal $S_I$: detecting a reference fire parameter $K_R$ of the fire detector monitoring region by a fire detector sensor unit of a fire detector; determining the reference fire status $Z_R$ by evaluating the reference fire parameter $K_R$ by the fire detector; transmitting a fire detector signal $S_B$ representing the reference fire status $Z_R$ from the fire detector to a central unit; and transmitting the instruction signal $S_I$ to the vehicle if the fire detector signal $S_B$ transmitted by the fire detector represents a reference fire status $Z_R$ that requires verification.

* * * * *